United States Patent [19]
Ulichney

[11] Patent Number: 5,495,345
[45] Date of Patent: Feb. 27, 1996

[54] IMAGING SYSTEM WITH TWO LEVEL DITHERING USING COMPARATOR

[75] Inventor: Robert A. Ulichney, Stow, Mass.

[73] Assignee: Digital Equipment Corporation, Maynard, Mass.

[21] Appl. No.: 961,573

[22] Filed: Oct. 15, 1992

[51] Int. Cl.$^6$ .................................................. G03F 3/08
[52] U.S. Cl. ....................... 358/457; 358/461; 358/466; 358/456
[58] Field of Search ........................... 358/457, 32, 443, 358/466, 164, 453, 461, 463, 166, 456, 160, 138; 382/54, 52, 50; 348/564, 625, 574

[56] References Cited

U.S. PATENT DOCUMENTS

| | | |
|---|---|---|
| H996 | 11/1991 | McWaters et al. . |
| 4,835,599 | 5/1989 | Sigel ........................................ 358/30 |
| 4,975,786 | 12/1990 | Katayama et al. . |
| 4,975,861 | 12/1990 | Fujimoto . |
| 5,014,333 | 5/1991 | Miller et al. . |
| 5,130,701 | 7/1992 | White et al. . |
| 5,170,152 | 12/1992 | Taylor . |
| 5,196,924 | 3/1993 | Lumelsky et al. ........................ 358/32 |
| 5,201,013 | 4/1993 | Kumagai .................................... 382/50 |
| 5,239,597 | 8/1993 | Chung et al. ............................. 382/54 |
| 5,268,774 | 12/1993 | Eschbach ................................. 358/466 |
| 5,307,426 | 4/1994 | Kanno et al. ............................ 358/461 |
| 5,317,418 | 5/1994 | Lin .......................................... 358/445 |
| 5,374,963 | 12/1994 | Willis ...................................... 348/564 |

OTHER PUBLICATIONS

Lawrence Gilman Roberts "Picture Coding Using Pseudo–Random Noise", IRE Transactions on Information Theory Feb. 1962 pp. 145–154.
Stuart C. Wells, Grant J. Williamson, Susan E. Carrie "Dithering for 12–Bit True–Color Graphics", IEEE Computer Graphics & Applications Sep. 1991 pp. 18–29.
Frattarola, G. and S. Edelson "Images as Opcodes", Edsun Laboratories 1990 pp. 1–14.
Glass, L. B. "Digital Video Interactive", BYTE May 1989 pp. 283–289.
Luther, Arch Digital Video in the PC Environment, New York: Intertext Publications, McGraw–Hill 1989 pp. 192–195.
Sigel, C., R. Abruzzi, J. Munson "Chromatic Subsampling for Display of Color Images", Digital Equipment Corporation Albuquerque, N.M. 1989 pp. 158–161.
Wan, s. J., K. M. Wong, and P. Prunsinkiewicz "An Algorithm for Multidimensional Data Clustering" ACM Trans. on Math. Software Jun. 1988 vol. 14, No. 2, pp. 153—162.
Heckbert, P. S. "Color Image Quantization for Frame Buffer Display", Computer Graphics Jul. 1982 vol. 16, No. 3, pp. 297–307.
Ulichney, R. Digital Halftoning, MIT Press 1987 Ch. 6&8, pp. 340 & 341.
Ulichney, R. "Imaging System with Multilevel Dithering Using Two Memories", Patent Application, Attorney Docket #PD92–0026 Oct. 1992 179 pages.

(List continued on next page.)

*Primary Examiner*—Paul Ip
*Attorney, Agent, or Firm*—Arthur W. Fisher; Denis G. Maloney; Lindsay G. McGuinness

[57] ABSTRACT

This invention relates to an image processing system which relies upon quantization and dithering techniques to enable an output device, which has a given number of output levels, to accurately reproduce a image which is generated by an input device, which has a greater or equal number of input levels. Generally, neither the number of input nor output levels need to be a power of two. The present invention is implemented in a number of different embodiments. These embodiments generally rely upon an image processor which, depending on the particular implementation, includes memory devices and an adder, a comparator, or a bit shifter. Additional embodiments use an image adjustment system to refine the raw input levels of the input device, in order to create an improved output image. Also, the particular embodiments of the image processors can be used in connection with imaging systems having bi-tonal, monochromatic, or color input and output devices.

13 Claims, 49 Drawing Sheets

OTHER PUBLICATIONS

Ulichney, R., Bahl, P. "Imaging System With Multilevel Dithering Using Single Memory", Patent Application, Attorney Docket #PD 93-0077 Oct. 1992 181 pages.

Ulichney, R. "Imaging System With Multilevel Dithering Using Bit Shifter", Patent Application, Attorney Docket #PD93-0078 Oct. 1992 179 pages.

Ulichney, R. "Imaging System With Image Adjustent System", Patent Application, Attorney Docket #PD93-0079 Oct. 1992 180 pages.

Ulichney, R. "Void and Cluster Apparatus and Method for Creating Dither Templates", Patent Application, Attorney Docket #PD92-0295 Oct. 1992.

FIGURE 3A

Number of
Template Levels = 2
M=N=2

Number of
Template Levels = 4
M=N=2

Number of
Template Levels = 8
M=N=4

Number of
Template Levels = 16
M=N=4

Number of
Template Levels = 32
M=N=8

| 10 | 21 | 13 | 19 | 11 | 20 | 12 | 18 |
| 26 | 0  | 29 | 7  | 27 | 1  | 28 | 6  |
| 14 | 16 | 8  | 23 | 15 | 17 | 9  | 22 |
| 30 | 4  | 24 | 2  | 31 | 5  | 25 | 3  |
| 11 | 20 | 12 | 18 | 10 | 21 | 13 | 19 |
| 27 | 1  | 28 | 6  | 26 | 0  | 29 | 7  |
| 15 | 17 | 9  | 22 | 14 | 16 | 8  | 23 |
| 31 | 5  | 25 | 3  | 30 | 4  | 24 | 2  |

FIGURE 3F

Number of
Template Levels = 64
M=N=8

| 20 | 43 | 27 | 39 | 23 | 40 | 24 | 36 |
| 52 |  1 | 59 | 15 | 55 |  2 | 56 | 12 |
| 28 | 33 | 17 | 47 | 31 | 34 | 18 | 44 |
| 60 |  9 | 49 |  5 | 63 | 10 | 50 |  6 |
| 22 | 41 | 25 | 37 | 21 | 42 | 26 | 38 |
| 54 |  3 | 57 | 13 | 53 |  0 | 58 | 14 |
| 30 | 35 | 19 | 45 | 29 | 32 | 16 | 46 |
| 62 | 11 | 51 |  7 | 61 |  8 | 48 |  4 |

FIGURE 3G

| | | | | | | | |
|---|---|---|---|---|---|---|---|
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |

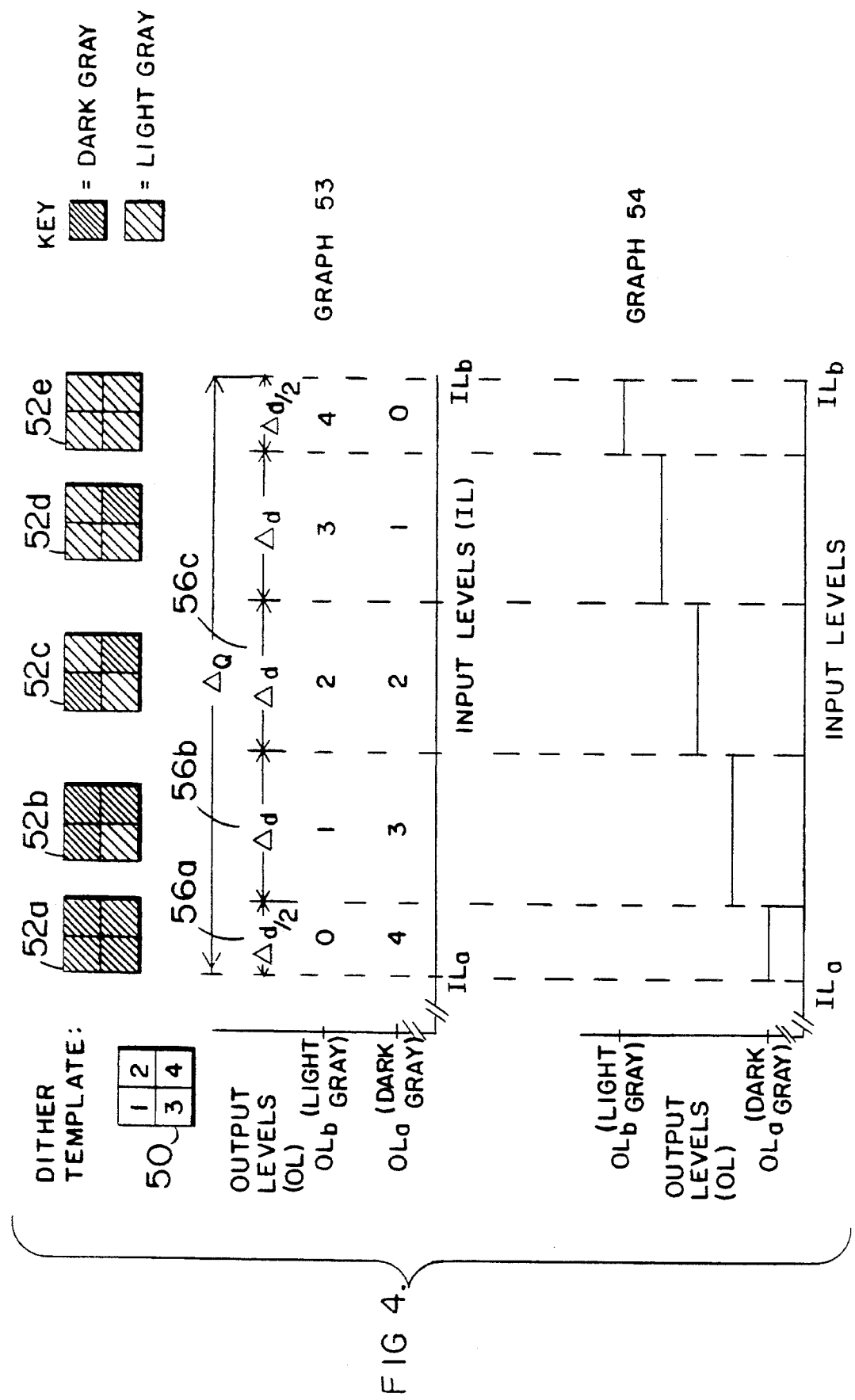

| | | | | | | | |
|---|---|---|---|---|---|---|---|
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |

| | | | | | | | |
|---|---|---|---|---|---|---|---|
| 31 | 53 | 31 | 53 | 31 | 53 | 31 | 53 |
| 74 | 10 | 74 | 10 | 74 | 10 | 74 | 10 |
| 31 | 53 | 31 | 53 | 31 | 53 | 31 | 53 |
| 74 | 10 | 74 | 10 | 74 | 10 | 74 | 10 |
| 31 | 53 | 31 | 53 | 31 | 53 | 31 | 53 |
| 74 | 10 | 74 | 10 | 74 | 10 | 74 | 10 |
| 31 | 53 | 31 | 53 | 31 | 53 | 31 | 53 |
| 74 | 10 | 74 | 10 | 74 | 10 | 74 | 10 |

FIGURE 9C d[x',y']

| 10 | 74 | 10 | 74 | 10 | 74 | 10 | 74 |
| 53 | 31 | 53 | 31 | 53 | 31 | 53 | 31 |
| 10 | 74 | 10 | 74 | 10 | 74 | 10 | 74 |
| 53 | 31 | 53 | 31 | 53 | 31 | 53 | 31 |
| 10 | 74 | 10 | 74 | 10 | 74 | 10 | 74 |
| 53 | 31 | 53 | 31 | 53 | 31 | 53 | 31 |
| 10 | 74 | 10 | 74 | 10 | 74 | 10 | 74 |
| 53 | 31 | 53 | 31 | 53 | 31 | 53 | 31 |

FIGURE 11

| Range of Input Levels | Total Number of Inputs | Perceived Output Levels | |
|---|---|---|---|
| 0 through 10 | 11 | 0.00 | TRUE LEVEL |
| 11 through 31 | 21 | 0.25 | (dithered average) |
| 32 through 53 | 22 | 0.50 | (dithered average) |
| 54 through 74 | 21 | 0.75 | (dithered average) |
| 75 through 95 | 21 | 1.00 | TRUE LEVEL |
| 96 through 116 | 21 | 1.25 | (dithered average) |
| 117 through 138 | 22 | 1.50 | (dithered average) |
| 139 through 159 | 21 | 1.75 | (dithered average) |
| 160 through 180 | 21 | 2.00 | TRUE LEVEL |
| 181 through 201 | 21 | 2.25 | (dithered average) |
| 202 through 223 | 22 | 2.50 | (dithered average) |
| 224 through 244 | 21 | 2.75 | (dithered average) |
| 245 through 255 | 11 | 3.00 | TRUE LEVEL |

| | | | | | | | |
|---|---|---|---|---|---|---|---|
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |
| 1 | 2 | 1 | 2 | 1 | 2 | 1 | 2 |
| 3 | 0 | 3 | 0 | 3 | 0 | 3 | 0 |

| 48 | 80 | 48 | 80 | 48 | 80 | 48 | 80 |
|---|---|---|---|---|---|---|---|
| 112 | 16 | 112 | 16 | 112 | 16 | 112 | 16 |
| 48 | 80 | 48 | 80 | 48 | 80 | 48 | 80 |
| 112 | 16 | 112 | 16 | 112 | 16 | 112 | 16 |
| 48 | 80 | 48 | 80 | 48 | 80 | 48 | 80 |
| 112 | 16 | 112 | 16 | 112 | 16 | 112 | 16 |
| 48 | 80 | 48 | 80 | 48 | 80 | 48 | 80 |
| 112 | 16 | 112 | 16 | 112 | 16 | 112 | 16 |

FIGURE 22C
d<x',y'>

| 16 | 112 | 16 | 112 | 16 | 112 | 16 | 112 |
|----|-----|----|-----|----|-----|----|-----|
| 80 | 48  | 80 | 48  | 80 | 48  | 80 | 48  |
| 16 | 112 | 16 | 112 | 16 | 112 | 16 | 112 |
| 80 | 48  | 80 | 48  | 80 | 48  | 80 | 48  |
| 16 | 112 | 16 | 112 | 16 | 112 | 16 | 112 |
| 80 | 48  | 80 | 48  | 80 | 48  | 80 | 48  |
| 16 | 112 | 16 | 112 | 16 | 112 | 16 | 112 |
| 80 | 48  | 80 | 48  | 80 | 48  | 80 | 48  |

FIGURE 24

| Range of Input Levels | Total Number of Input | Perceived Output Levels | |
|---|---|---|---|
| 0 through 15 | 16 | 0.00 | TRUE LEVEL |
| 16 through 47 | 32 | 0.25 | (dithered average) |
| 48 through 49 | 32 | 0.50 | (dithered average) |
| 80 through 111 | 32 | 0.75 | (dithered average) |
| 112 through 143 | 32 | 1.00 | TRUE LEVEL |
| 144 through 175 | 32 | 1.25 | (dithered average) |
| 176 through 207 | 32 | 1.50 | (dithered average) |
| 208 through 239 | 32 | 1.75 | (dithered average) |
| 240 through 271 | 32 | 2.00 | TRUE LEVEL |
| 272 through 303 | 32 | 2.25 | (dithered average) |
| 304 through 335 | 32 | 2.50 | (dithered average) |
| 336 through 367 | 32 | 2.75 | (dithered average) |
| 368 through 383 | 16 | 3.00 | TRUE LEVEL |

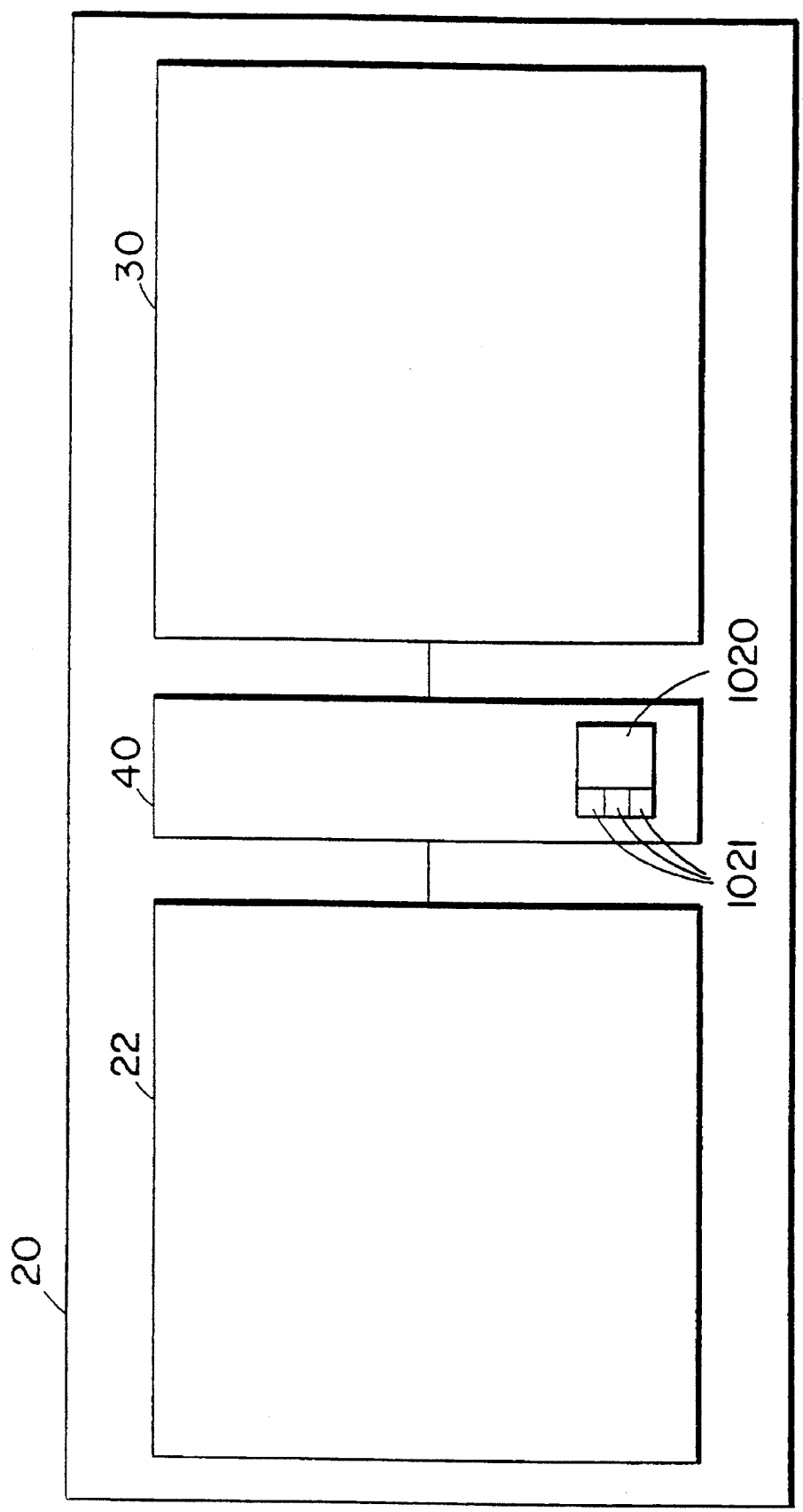

FIGURE 33

| Twos-complement Representation | Binary Code | Unsigned Interpretation | Shifted Representation |
|---|---|---|---|
| -128 | 1000 0000 | 128 | 0 |
| -127 | 1000 0001 | 129 | 1 |
| ... | ... | ... | ... |
| -1 | 1111 1111 | 255 | 127 |
| 0 | 0000 0000 | 0 | 128 |
| 1 | 0000 0001 | 1 | 129 |
| ... | ... | ... | ... |
| 126 | 0111 1110 | 126 | 254 |
| 127 | 0111 1111 | 127 | 255 |

(BASED ON FIG. 6)

(BASED ON FIG. 12)

(BASED ON FIG. 15)

(BASED ON FIG. 19)

IMAGING SYSTEM WITH TWO LEVEL DITHERING USING COMPARATOR

FIELD OF THE INVENTION

This invention relates to an apparatus and method for translating an input image to an output image in an imaging system using quantization and dithering techniques.

BACKGROUND OF THE INVENTION

As is known in the art, an image processing system is often used to translate and feed input signals representative of an image in an input device to output signals representative of that same image in an output image. For example, a video camera may register a given input image, which is subsequently transferred to an output device, such as a video screen, or a printer. Often the input device may have a greater capacity to represent the different colors or gray scale shades of the input image than the output device. If the input device can represent more colors than the output device, an image processing system may be employed for converting the greater number of input colors to a lesser number of output colors, to make the output image appear as visually similar to the input image as possible. Four such methods of converting input images to output images are 1) histogram based methods, 2) chrominance subsampling, 3) hardware color mixing, and 4) dithering.

With a histogram based technique, a processor is used to collect histogram statistics on the input image data, and the statistical information is used to compensate the image data. Thus, the histogram technique requires two passes of the entire input image data; the first to acquire the histogram statistics and the second to compensate the data. This results in a system which has the drawback of being too slow for those applications in which speed is important. In addition, in cases where the colors change gradually over a wide area, considerable contouring of the image can occur, resulting in a less desirable output image.

Chrominance subsampling, on the other hand, typically requires specialized hardware, such as unconventional frame buffers and very fast and expensive upscaling and color space conversion hardware. Due to the unique hardware requirements of the chrominance subsampling technique, it is not practical to implement in a general computing environment. In addition, the image quality suffers in areas of high chrominance detail.

The third technique, hardware color mixing, requires that the image data must be preprocessed off line with a multiple pass algorithm. Thus, like the histogram based technique, this approach is also slow. Additionally, the resulting image file is device dependent, resulting in the requirement of unique hardware, a drawback similar to that of the chrominance subsampling technique.

The fourth technique for converting the greater number of input colors to a lesser number of output colors, dithering, is based on using the available set of output colors in a judicious arrangement so that the illusion of a greater number of output colors is provided. Additionally, the arrangement of the output colors through the dithering technique is designed to assure that a pleasing output image is produced.

One such dithering technique is reported in Ulichney, R. "Digital Halftoning" The MIT Press (1987), hereinafter referred to as "Ulichney". In Ulichney, equation 9.5 provides the following:

$$I_k<x,y> = <1/(2^k-1)> \times int\{<(2^k-1)\ J<x,y>> + D<x,y>\}$$

where:

$I_k<x,y>$ is the output value of the image at position x,y of the output image;

K is the number of bits used to represent the output value $I<x,y>$;

$J<x,y>$ is the input value of the image at position x,y of the input image, normalized to a range between 0 and 1;

$D<x,y>$ is the dither matrix value at position x,y of the dither matrix, normalized to a range between 0 and 1;

$int\{x\}$ is a truncate function in which after any mathematical operations within the brackets are performed and a final value is determined, any amount remaining after the decimal point is truncated so that the remaining value is an integer. For example, $int\{5.3\}=5$, and $int\{27,999\}=27$;

One drawback to this dithering approach is that the equation only permits dithering to powers of 2, rather than any number. Also, the equation requires that the input must be scaled to a range between 0 and 1, but does not give any indication of how that scaling is to be done, or how the values of the dither matrix are to be spaced to achieve symmetric dithering.

SUMMARY OF THE INVENTION

This invention relates to an apparatus and a method for processing images in an imaging system, which translates the input levels of an input device to corresponding output levels of an output device. In accordance with the invention, the output device is a bi-tonal device, meaning that it has the capacity to represent only two levels, such as black and white. On the other hand, the number of input levels of the input device may be any number, it does not need to be a power of two, however it does need to be greater than two.

The image processing apparatus includes a memory device for storing dither template values. The memory device is responsive to an x,y address of a given input cell of the input device, such that the address causes the memory device to output a stored, dither template value which corresponds to the address of the input cell.

The image processor apparatus further includes a comparator. The comparator compares the given dither template value, output by the memory device, to the actual input level of the given input cell. As a result of that comparison, the image processor produces as an output level which corresponds to the input level.

Alternate embodiments of the invention include an image processing system which includes the image processor using the memory device and the comparator. Yet another embodiment of the invention includes the method of processing input and output levels using the memory device and the comparator.

One advantage of the invention is that any number of input levels can be used, provided only that the number of input levels is equal to or greater than two. It is not necessary that the number of input levels be a power of two. This, of course, provides greater system flexibilty.

Another advantage of the invention is that the implementation of the invention is accomplished with commonly available computer hardware; no specialized hardware is required. In one embodiment, the image processor uses the memory device and the comparator.

Yet another advantage of the invention is that the apparatus operates very fast, insofar as the production of the corresponding output level by the image processing apparatus requires only the memory look up and a comparison.

Other objects, features, and advantages of the invention will be further appreciated and better understood upon consideration of the following detailed description of the preferred embodiment, presented in conjunction with the accompanying drawings.

BRIEF DESCRIPTION OF THE DRAWINGS

FIGS. 3A–3G illustrate a number of dither templates of varying sizes and levels.

FIG. 4 includes two, correlated graphs showing a number of input levels mapped to two output levels.

FIGS. 9A–9C show the modification of the dither template values of a particular dither template as it is processed through the quantizer LUT of FIGS. 6 and 7.

FIG. 11 is a table of exemplary input levels processed by the image processor of FIG. 6, and their corresponding total number of perceived output levels, and an indication whether the given, perceived output level is a true level, or a dithered average.

FIGS. 22A–22C show the modification of the dither template values of a particular dither template as it is processed through the system data generator of FIGS. 19 and 20.

FIG. 24 is a table of exemplary input levels processed by the image processor of FIG. 19, and their corresponding total number of outputs, perceived output levels, and an indication whether that perceived output is a true level, or a dithered average.

FIG. 25 is an imaging system, similar to the one in FIG. 1 and in accordance with the present invention, including within the image processor an image adjustment system.

FIG. 33 is a table of exemplary values showing a two's compliment representation, a binary code, an unsigned interpretation, and a shifted representation.

DETAILED DESCRIPTION OF THE PREFERRED EMBODIMENTS

A. General

Figure 1:
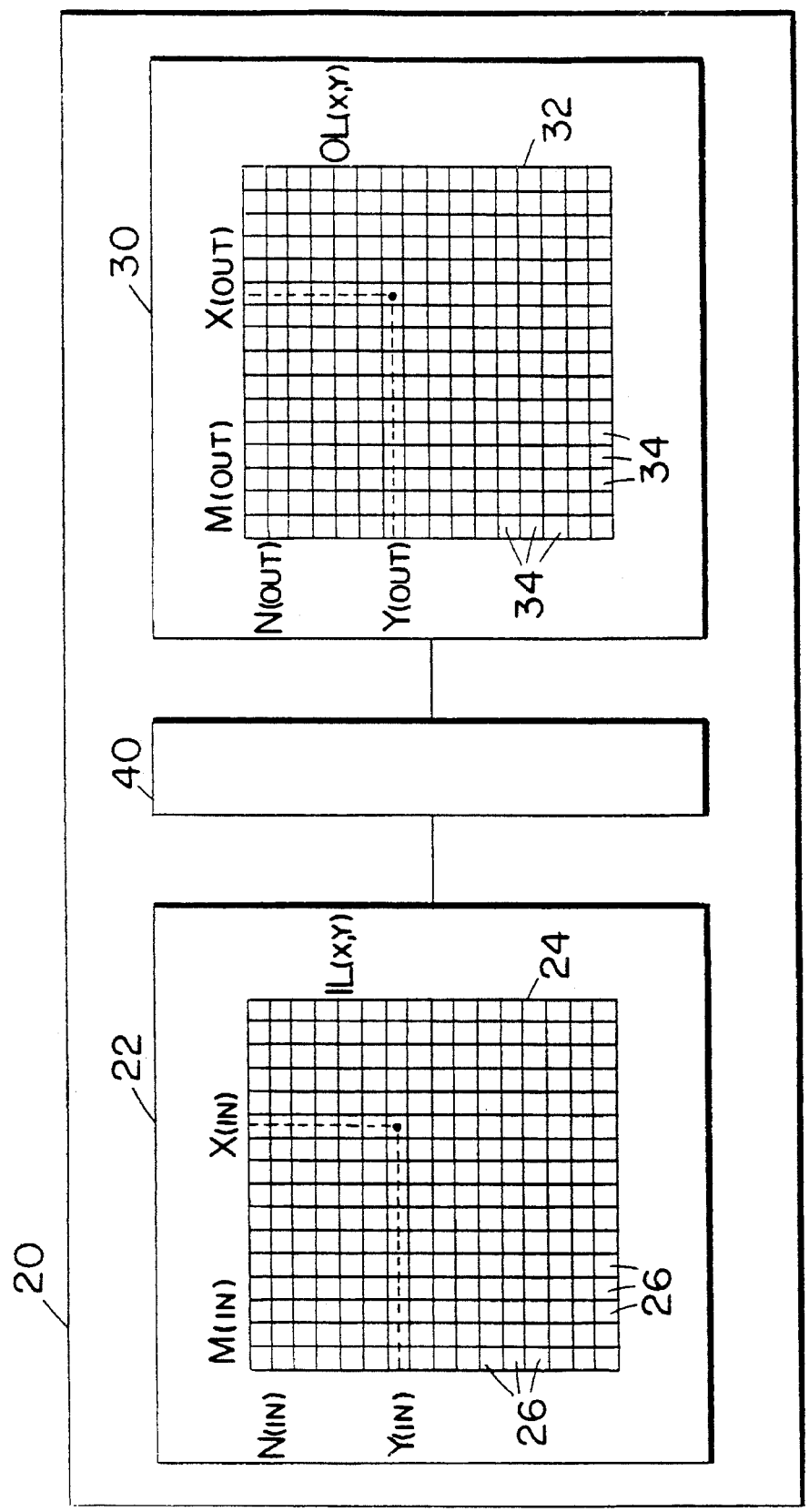
FIG. 1 is a block diagram illustration of an imaging system, in accordance with an embodiment of the present invention, including an input device, an image processor, and an output device.

FIG. 1 presents a block diagram illustration of the general environment in which one embodiment of the image processing apparatus and technique of the present invention is applied. Imaging system 20 includes input device 22 which has an input image array 24 with a dimension $M_{in} \times N_{in}$. Input array 24 is made up of a number of individual input cells 26, represented by the small rectangles of input array 24, and each such input cell 26 is addressable by an $x_{in}$ (column) and $y_{in}$ (row) coordinate.

Still referring to FIG. 1, imaging system 20 also includes output device 30, which likewise has an output image array 32 having dimensions $M_{out} \times N_{out}$. Also, output array 32 is made up of a number of individual output cells 34, represented by the small rectangles within output array 32, and each such output cell 34 is addressable by an $x_{out}$ (column) and $Y_{out}$ (row) coordinate.

In this detailed description, a number of input and output devices will be discussed. First, an input or output device may be one which is capable of producing only a bi-tonal image. By definition, a bi-tonal image is one in which there is only one component for representing the image, and that component has only two shades. Typically the shades are black and white, though they need not be.

Second, an input or output device may be a monochrome device, which is characterized by having one component used for defining the luminance of the image. This type of system may have black and white shades, as well as intermediate shades of a gray.

Third, an input or output device may classified as color system, a classification which can be further divided into two sub groups. The first sub group is made up of luminance/chrominance systems, which have one component which defines the luminance of the image, and two components which together define the characteristics of the hue and saturation of the image. The second sub group of color systems are so-called "RGB" systems, representing the color primaries, red, green, blue. In such a system there is a first component which defines the amount of red of the image, a second component defining the amount of green, and a third component defining the amount of blue. Together these three components define the luminance and chrominance of the image.

It should be noted that in imaging systems generally it is possible to couple one type of input device with a different type of output device. In other words, a luminance/chrominance type color input device may be coupled to an RGB type output device, for example. Techniques for modifying the data, which is in one format in the input device, for presentation in a different format in the output device are shown in U.S. Patent Application of Robert Ulichney, entitled "Method and Apparatus for Mapping a Digital Color Image From a First Color Space to a Second Color Space", filed on Jun. 26, 1990 and having the Ser. No. 07/545,384, which is hereby incorporated by reference.

Referring back to FIG. 1, input cells 26 and output cells 34 are the cells in which the black and white, gray scale shades, and colors of the input or output images are represented. However, having noted the different types of input and output devices, in order to discuss these devices generally, it is convenient to use the term "level" in place of the use of the terms "black and white", "gray scale shades", or "colors". Thus, except where the discussion requires distinction, this detailed description shall use the term "level(s)" to identify the input or output images of bi-tonal, monochrome, or color systems.

The input levels of input device 22 are designated "IL", where IL can range from 0 to <the number of input levels ("NIL") −1>. Likewise, each output cell 34 is capable of outputting a level which is designated "OL", where OL can range from 0 to <the number of output levels ("NOL") −1>.

In a particular implementation of the multi-level imaging system of the present invention, input device 22 could be a video camera, which detects an image. That image is registered in input array 24, with the IL of each input cell 26 being represented by "IL<x,y>", where IL<x,y> is the input level at a particular $x_{in}$, $y_{in}$ address in input array 24. In such an application, input cells 26 are the individual pixels of the input image. In this same implementation, output device 30 could be a video monitor in which output cells 34 of output array 32 represent the output pixels of the video screen on which the input image is viewed. That image is represented in output array 32, with the OL of each output cell 34 being represented by "OL<x,y>", where OL<x,y> is the output level at a particular $x_{out}$, $y_{out}$ address in the array. Likewise output cells 34 are the individual output pixels of the output image.

Still referring to FIG. 1, the dimensions of input array 24, $M_{in} \times N_{in}$, and the output array 32, $M_{out} \times N_{out}$, are identical. Accordingly, there is a one to one correspondence between each input cell 26 and each output cell 34. Although in some imaging systems the input images may be initially registered into an input array, the dimensions of which are different than the dimensions of the output array, there are known cropping and scaling techniques which can be used to alter the input image so that the dimensions of the input and output arrays are identical. Accordingly, the application of the embodiment of the present invention is in an environment in which the size of $M_{in} \times N_{in}$ is the same as the size of $M_{out} \times N_{out}$. Additionally, the input address, $x_{in}, y_{in}$ is the same as the output address $x_{out}, y_{out}$, and will hereinafter simply be referred to as x,y.

The multi-level image processing system of the present invention is typically applied in an environment in which the NOL is fewer than the NIL; however, it may also be applied in an environment in which NOL is equal to NIL. In those instances in which NIL is greater than NOL, the purpose of the system is to map the greater NIL to the lesser NOL. Except with respect to certain embodiments of the invention discussed below, neither NIL nor NOL need to be a power of 2. This affords the imaging system with a greater degree of flexibility.

To accomplish the mapping of input levels to output levels, input device 22 is coupled to output device 30 through image processor (IP) 40, which translates all IL<x,y> values to corresponding OL<x,y> values. This translation involves quantization and dither templates, both of which will be further discussed below. Before focusing upon a specific embodiment of the invention, it is helpful to first consider how an image processor, such as IP 40, can generally map input levels to output levels.

Figure 2A:
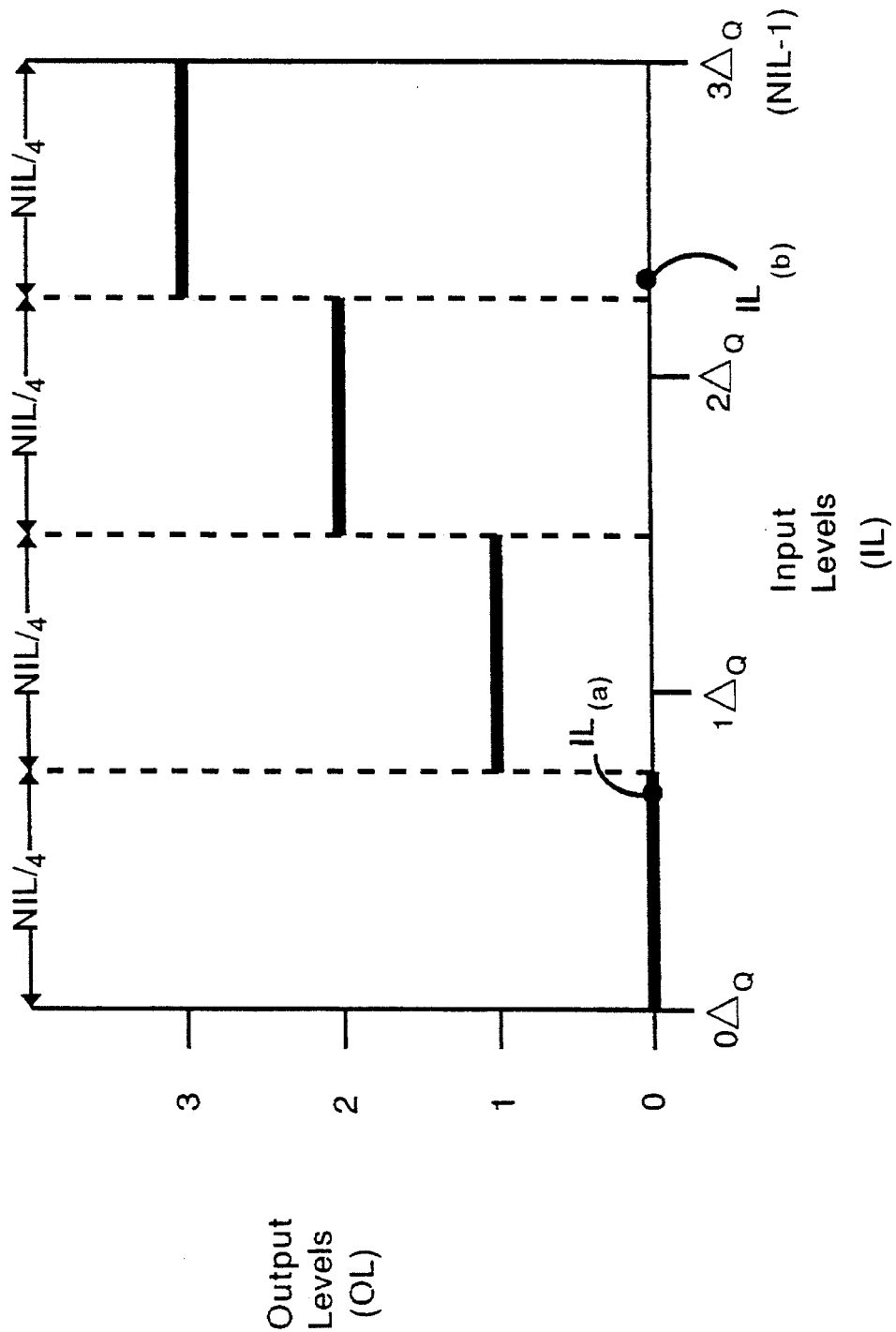
FIG. 2A is a graph showing one method of quantizing input levels with respect to output levels.

Referring to FIG. 2A, a graph having any number of input levels, IL, and 4 output levels is provided. In this example, the smallest output level, OL=0, is mapped directly to the smallest input level, which on the graph is designated $0\Delta_Q$. Additionally, the largest output level, OL=3, is mapped directly to the largest input level, which on the graph is designated $3\Delta_Q$. By virtue of the direct mapping of smallest to smallest and largest to largest, there are no input levels less than $0\Delta_Q$ that also map to OL=0, and no input levels greater than $3\Delta_Q$ that map to also map to OL=3. Having made this assignment at the two extremes of the graph, the interior portion of the axis on which the input levels are graphed is then evenly divided by $1\Delta_Q$ and $2\Delta_Q$, with $1\Delta_Q$ being assigned a direct mapping to OL=1 and $2\Delta_Q$ being assigned a direct mapping to OL=2.

Moreover, in the quantization approach shown in FIG. 2A, when determining the input levels which are mapped to a given output level, there is no adjustment of the NIL and NOL by any factor in order to provide an even distribution so that all input levels are mapped to their closest output level. Rather, quantization is achieved by simply dividing NIL by NOL. Accordingly, each range of input levels mapped to a given output level is equal, and in this instance those ranges are equal to NIL/4 as shown on the graph.

Although it may appear that this quantizer approach is symmetric, because all ranges of input levels are equal, the approach will actually result in quantization error, because certain input levels will not necessarily be mapped to their closest assigned output level. For example, referring to $IL_{(a)}$ it would be mapped to OL=0, even though it is apparent from the graph that it is actually closer to $1\Delta_Q$, which is the input level assigned to OL=1. Likewise, referring to $IL_{(b)}$ it would be mapped to OL=3, even though it closer to $2\Delta_Q$, which is the input level assigned to OL=2.

Thus this straight quantization approach, in which the number of input levels which are mapped to a given output level is determined by a direct division of NIL by NOL, provides an uneven distribution of input levels around the assigned output levels resulting in quantization error. An imaging system based on this quantization error will produce a less desirable output image than one which evenly distributes the input levels around the assigned output levels. The image processing system of the present invention does evenly distribute the input levels around the assigned output levels to reduce the quantization error.

Figure 2B:
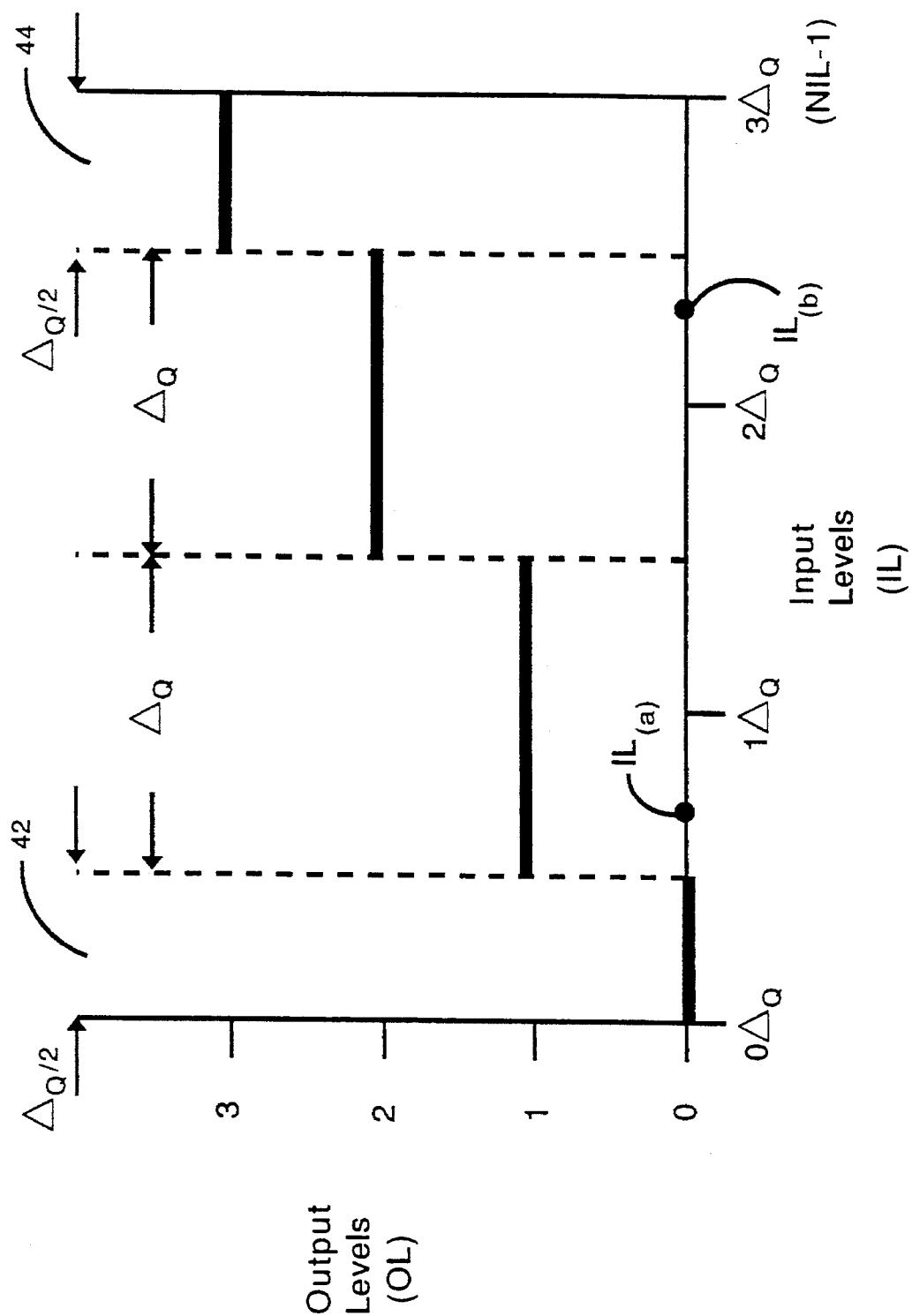
FIG. 2B is a graph showing a method of quantizing input levels with respect to output levels which is in accordance with an embodiment of the present invention.

Referring to FIG. 2B for a general description of the method by which this is done, a graph is provided in the same basic format as shown in FIG. 2A. In FIG. 2B, the smallest output level, OL=0, is mapped directly to the smallest input level, which on the graph is designated $0\Delta_Q$, and the largest output level, OL=3, is mapped directly to the largest input level, which is designated $3\Delta_Q$. Again, between the extreme input levels the axis is evenly divided by $1\Delta_Q$ and $2\Delta_Q$, with $1\Delta_Q$ assigned to OL=1 and $2\Delta_Q$ assigned to OL=2.

Unlike the approach taken in connection with FIG. 2A, the image processing technique of the present invention adjusts the NIL and NOL by a factor that eliminates the quantization error and provides an even distribution of input levels with respect to output levels. In this approach, NIL and NOL are both reduced by one before the division which determines the number of input levels which are mapped to a given output level. Accordingly, quantization is accomplished by first calculating $\Delta$hd Q, where:

$$\Delta_Q = (NIL-1)/(NOL-1) \quad \text{(Equation I)}.$$

Through this equation, $\Delta_Q=(NIL-1)/(4-1)=(NIL-1)/3$, in the given example.

Next, the image processing technique refines the distribution of the input levels which appear at either end of the x axis, so that there is symmetry of all input levels around their related $\Delta_Q$ assignment, $0\Delta_Q$ through $3\Delta_Q$. This is accomplished by dividing $\Delta_Q$ in half, and using that quotient to determine the span of the first and last range of input levels which are mapped to the smallest and largest output levels, respectively. In between the two end ranges, $\Delta_Q$ determines the span of the range of input levels which are mapped to output levels falling between the smallest and largest output levels.

Supposing, for example that the NOL in FIG. 2B was 256. Using Equation I, $\Delta_Q$ is equal to (256−1)/(4−1), or 85. Thus, in FIG. 2B, the resulting mapping of input levels to output levels would be:

TABLE A

| IL | OL |
|---|---|
| 0 through 42 | maps to 0 |
| 43 through 127 | maps to 1 |
| 128 through 212 | maps to 2 |
| 213 through 255 | maps to 3 |

As seen from Table A with NIL=256, IL can range from 0 through 255; and with NOL=4, OL can range from 0 through 3. Also in Table A it can be seen that $\Delta_Q/2$, or 85/2=42.5, determines the span of input levels, rounding to 43, that are mapped to the smallest output level, namely 0 through 42 map to OL=0. In between this first range and the last range, which is 213 through 255, are spans of input levels which are equal to such as 43 through 127, being mapped to OL=1, and 128 through 212 being mapped to OL=2. In this respect, the value of will determine the range of input levels which are covered by any given output level, except that at the ends of the full range of input levels, the number of levels covered is equal to $\Delta_Q/2$, as shown in graph segments 42 and 44 of FIG. 2B.

This adjustment of NIL and NOL before quantization provides a symmetric distribution of input levels around their respective output levels. As shown in FIG. 2B, $IL_{(a)}$, which is in the same position on the graph as it is on FIG. 2A, is mapped to OL=1 because it is closer to $1\Delta_Q$, which is assigned to OL=1. Likewise, $IL_{(b)}$ is mapped to OL=b 2 1 given that it is closer to $2\Delta_Q$, which is assigned to OL=2. Accordingly, the quantization technique assures both that there is a direct mapping of the smallest output level to the smallest input level, and the largest output level to the largest input level, and that there is a symmetric distribution of the input levels around the closest assigned output level.

Thus far the multi-level, image processing technique of the present invention has relied upon a quantization method for mapping a greater number of input levels to the lesser number of output levels. The technique of the present invention further combines quantization with the use of a dither template so that even though output device 30 can only output a given number of "true" levels, output device 30 provides the illusion that it is capable of outputting "intermediate" levels, as well as the true levels. The meaning of "true" and "intermediate" levels will be further discussed below.

Referring now to FIGS. 3A through 3F, a number of dither templates are illustrated. A dither template is a grouping of elements arranged in a particular order, with each such element being taken from the set of whole numbers that range from 0 to <the number of template levels ("NTL") −1>. Each such template can be defined by reference to: its size, which is given as an $M_{tmp} \times N_{tmp}$ array; its NTL; and the order of elements in the array. For example, referring to FIG. 3C, the size of the array is $M_{tmp} = N_{tmp} = 4$, which is a 4×4 array. The NTL is 8, meaning that the value of the elements in the array range from 0 through <8−1>, or 0 through 7. And the order of the elements is as shown in FIG. 3A. "T<x',y'>" will hereinafter be used as the term which defines a given dither template by reference to the order of its elements, understanding that once the order of the elements is known, the $M_{tmp} \times N_{tmp}$ size, and the NTL can be easily determined by reference to the row-column arrangement and the actual value of the elements.

Although a given dither template has a certain $M_{tmp} \times N_{tmp}$ size array, in many instances it is possible to map that array into a larger memory array, $M_{mm} \times N_{mm}$, by "tiling", or repeating, the smaller template pattern across the larger memory array. For example, FIG. 3B includes a dither template having a size $M_{tmp} = N_{tmp} = 2$, NIL=4, with the elements ordered as shown. Even though this template is arranged as a 2×2, it can be mapped into a larger memory array, such as an 8×8 array. Referring now to FIG. 3G, it can be seen how the smaller, 2×2 dither template of FIG. 3B is tiled into the larger 8×8 memory array so that the larger array preserves the basic dither template pattern.

It should be noted that one limitation to the ability to tile a smaller dither template into a larger dither template memory is that the size of the dither template must divide evenly into the size of the dither template memory. Stated differently, $M_{mm}$ must be evenly divisible by $M_{tmp}$ and $N_{mm}$ must be evenly divisible by $N_{tmp}$. For example, the 2×2 template evenly divides into the 8×8 memory array; however, a 3×3 template would not. The significance of tiling the dither pattern into a larger memory array will be discussed below.

Finally with respect to dither templates, it should also be noted that the term "T<x',y'>" will be used to define not only the order of an original, small, dither template, but also the order of a dither template which is the result of tiling the small dither template into a larger memory array.

Having discussed quantization and dither templates, it can now be shown how these two techniques are combined in image processor 40 to provide the visual impression that output device 30, shown in FIG. 1, is able to output a greater number of output levels than it actually can. In other words, through the image processing technique, output device 30 can produce the illusion that it can output more levels than simply the "true" levels that it is actually capable of outputting. In this manner, output device 30 can render an output image which is closer in fidelity to the original input image. Furthermore, output devices employing the image processing technique will produce a more visually pleasing output image.

Referring now to FIG. 4, quantization and dither templates are combined to produce perceived output levels using dither template 50 where M=N=2 and NTL=4 is used. In FIG. 4 are two graphs, Graph 53 and Graph 54, each having the x axis segment including a number of input levels ranging from $IL_a$ through $IL_b$. The y axis segment includes two output levels, $OL_a$ and $OL_b$. For the purpose of this example, it is assumed that $OL_a$ is dark gray, and $OL_b$ is light gray, in which case $OL_a$ and $OL_b$ are defined as the two, true, output levels which output device 30 is capable of providing. However, it will be clear to those skilled in the art that $OL_a$ and $OL_b$ can be any levels, and that dark gray and light gray are used here only to provide a simple example of how the multi-level image processing technique works.

Included also in FIG. 4 are representations of five different dither patterns, 52a through 52e, that can be achieved using the two input levels and dither template 50. Even though output device 30 can only output two levels, through shading the individual cells with dark gray or light gray in a pattern which is determined by the dither template, intermediate levels are effectively produced. In other words, even though output device 30 can only truly output dark gray and light gray, the technique of the present invention achieves the illusion of intermediate colors by causing the eye to perceptually average the two true colors because they are judiciously distributed across the dither template.

It should be noted that although in the examples discussed in connection with FIGS. 4 and 5 it will be stated that the dither template itself is shaded, in actual implementations of the present invention in an imaging system it is the output array, such as a video monitor screen, and not the dither template, that is shaded. On the other hand, in connection with the more detailed discussion of IP 40 below, it will be explained that the specific values that appear in the cells of the dither template are indirectly mapped to specific cells in an output array, such as output array 32 of FIG. 1. And, those cell values are instrumental in determining the shading of the output array. Given this association, for the purpose of a simplified explanation in connection with FIGS. 4 and 5, the cells of the template will be treated as if they can be shaded, while the more specific explanation of the role of the template will be presented below.

Still referring to Graph 53, the input levels falling between $IL_a$ and $IL_b$ are themselves divided into ranges, $\Delta_d$, which are determined on the basis of the NIL, the NOL, and the NTL of a particular implementation. Each of these variables are instrumental in determining the division of input ranges which are necessary for the faithful reproduction of the output image. In one embodiment, the division of ranges, $\Delta_d$, is:

$$\Delta_d = \Delta_Q/(NTL) \qquad \text{(Equation II)}.$$

Accordingly, in Graph 53 $\Delta_d$ is shown to span groups of intermediate input values which fall between $IL_a$ and $IL_b$. At either end of the input levels, however, there is an Offset which is applied in order to assure that there is a symmetric distribution of input levels around output levels. In the embodiment shown on FIG. 4, $$\text{Offset} = \Delta_d/2 \quad \text{(Equation III)}.$$

This offset is similar to the offset discussed above in connection with the apportioning of input levels around a given $\Delta_Q$ at either end of the full range of input levels.

Still referring to FIG. 4, the first dither pattern 52a is one in which all of the cells of the dither template are shaded dark gray. Accordingly, section 56a of Graph 53 shows 4 cells shaded dark gray, and 0 of the cells shaded light gray. The second dither pattern 52b is one in which 3 of the cells are dark gray, while 1 of the cells is light gray; therefore, section 56b of Graph 53 shows 3 dark gray cells and 1 light gray cell. The third dither pattern 52c shows 2 cells shaded dark gray and 2 shaded light gray, with a corresponding representation in section 56c of Graph 53. The other two dither template patterns, and their corresponding graphic representations are likewise shown in FIG. 4.

Also included on FIG. 4 is Graph 54, which is associated with Graph 53, as indicated by the dashed lines connecting the graphs. Like Graph 53, Graph 54 includes the same input levels, $IL_a$ through $IL_b$, on the x axis. The full range of input levels are covered by $\Delta_Q$, and the intermediate levels are subdivided into smaller $\Delta_d$ ranges, as shown. In addition, the y axis of Graph 54 includes the two true output levels of output device 30, $OL_a$(dark gray) and $OL_b$(light gray).

From FIG. 4 it is graphically shown how intermediate levels are produced by the combination of quantization and the dither template. Namely, in between the true output levels, $OL_a$(dark gray) and $OL_b$(light gray), there are three intermediate levels. These levels are what would be seen by one looking at the dither template if it is shaded in the various patterns, 52a through 52e, discussed in connection with FIG. 4.

Dark gray and light gray are the result of the shading of all of the template cells with the two true colors, respectively. On the other hand, when 3 template cells are shaded dark gray and 1 is light gray, the intermediate level perceived by one looking at the template will be a shade of gray falling between dark gray and light gray, but visually closer to dark gray. On the other hand, when 3 cells are shaded light gray and 1 is shaded dark gray, the intermediate level will also be a shade of gray falling between dark gray and light gray, but will be visually closer to light gray.

As shown in Graph 54, the intermediate levels between dark gray and light gray are represented by the gradual stair step progression of the graph from dark gray to light gray. Furthermore, Graph 54 shows how the full range of input levels, $IL_a$ through $IL_b$, map into either the true output levels, $OL_a$ and $OL_b$, or the perceived intermediate levels.

Generally, the number of perceived output levels ("NPOL") that a particular output device 30 is capable of outputting, is determined by the NOL that the system is able to output, and the NTL of the dither template. The relationship is:

$$NPOL = <(NTL)(NOL-1)+1>, \text{ when } \Delta_d>1; \text{ and } NPOL = NIL, \text{ when } \Delta_d \leq 1. \quad \text{(Equation IV)}.$$

Therefore, for the example shown in FIG. 4 in which $\Delta_d>1$, the $NPOL = <4(2-1)+1> = 5$, which is confirmed by the total number of perceived output levels shown on the x-axis segment of Graph 54.

Figure 5:
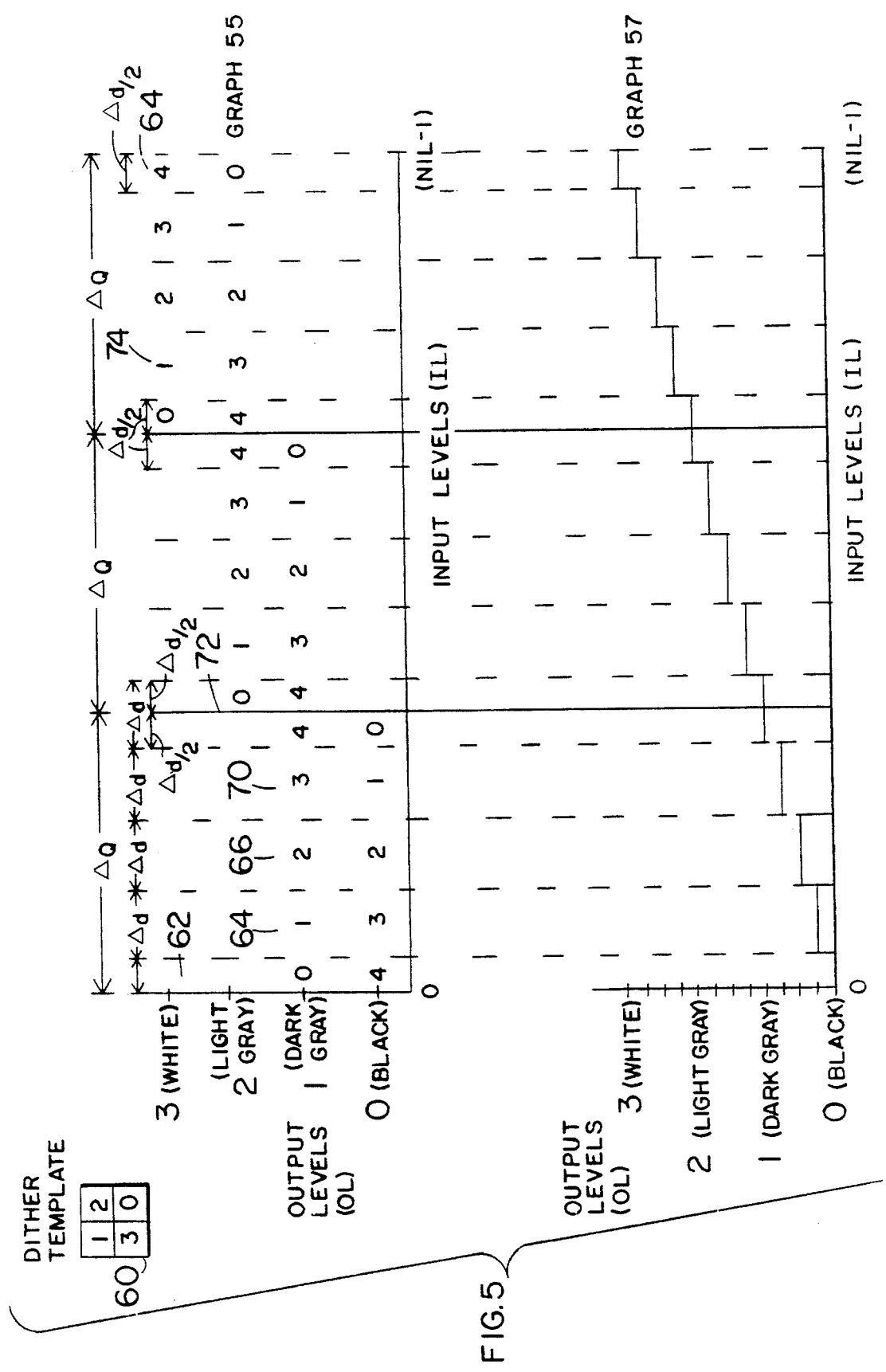
FIG. 5 includes two, correlated graphs showing a number of input levels mapped to four output levels.

Referring now to FIG. 5, a more complete example of the multi-level image processing system of the present invention is shown, combining quantization, a dither template, and the use of a greater NOL than was illustrated in FIG. 4. Similar to FIG. 4, FIG. 5 includes Graphs 55 and 57 on which the x axis of each includes a number of input levels, ranging from 0 to (NIL −1), which are the input levels which input device 22 is capable of registering. The y axis of each includes four true output levels, 0, 1, 2, and 3. As discussed above, the present invention can be applied with any number of input or output levels. The numbers chosen for purposes of this illustration, however, are relatively small so that the explanation of the principles of the embodiment of the invention can be less complex. Those principals, however, would be applied the same if a greater number of input and output levels are used.

Like FIG. 4, FIG. 5 has dither template 60 where $M_{tmp}=N_{tmp}=2$ and NTL=4. Each input level is included within the span of a given $\Delta_Q$, which is determined in accordance with Equation I, above. Likewise, each of the input levels is included within the span of a given $\Delta_d$, which is determined in accordance with Equation II, above. At either end of the full range of input levels, it can be seen that the width of the first section 62 and the last section 64 of Graph 55 is only $\Delta_d/2$. This offset is consistent with the Offset which is determined in accordance with Equation III. Although at the two ends of the range of input levels, $IL_a$ and $IL_b$, the span of the two end sections are only $\Delta_d/2$ wide, from Graph 55 it can be seen that in the middle portions of the graph, adjoining half sections of $\Delta_d$, together form full sections which are $\Delta_d$ wide. Consequently, the combined half sections succeed in providing a symmetrical distribution of input levels around their perceived, output levels.

As shown in Graph 55, the four true levels which output device 30 is capable of outputting are: 0 - black; 1 - dark gray; 2 - light gray; and 3 - white. As with the two levels discussed in connection with FIG. 4, these levels have been arbitrarily chosen to illustrate a particular embodiment of the present invention, and any other levels could have been chosen.

Referring first to graph segment 62 on Graph 55, if the 4 cells of the dither template 60 are all shaded black, then the true level black would be visible to one looking at dither template 60. Furthermore, with the 4 cells shaded black, output array 32 would be outputting a true level, namely black. In graph segment 64, if 3 of the 4 cells are shaded black, and 1 of them is shaded dark gray, than a visually intermediate level will be perceived by looking at the shaded dither template 60. That intermediate level will be visually close to black, but will be slightly lighter than solid black, because one of the cells will be shaded dark gray. Thus the eye of the person looking at the template averages the appearance of the individual cells to perceive the intermediate level. Progressively the illusion of lighter, intermediate levels can be provided on dither template 60 as more cells are turned onto dark gray and fewer onto black, as shown in segment 70. As shown on segment 72, if all of the pixels in the template 60 are turned to dark gray, then dither template 60 would project the true level, dark gray.

Considering one other example at the far right of Graph 55, in segment 74 three cells have been shaded light gray and one has been shaded white, thereby providing the visual illusion in dither template 60 of a level that is between light gray and white. At the very end of the range of input levels, input levels within $\Delta_d/2$ of (NIL−1), are mapped to the level white. As shown on Graph 55, in segment 64, the four cells of dither template 60 have been shaded white, which is another one of the four, true, input levels.

FIG. 5 further includes Graph 57, which is associated with Graph 55 as shown by the dashed lines through the graphs.

On the x axis, Graph 57 includes the same input levels ranging from 0 to (NIL–1), which are divided into $\Delta_Q$ and $\Delta_d$ segments. Similar to Graph 54, the stair step progression of Graph 57 graphically shows that although output device 30, shown on FIG. 1, is capable of outputting only four true levels, --- 0—black; 1—dark gray; 2—light gray; and 3—white through the multi-level image processing technique of the present invention, output device 30 is capable of outputting a total of 13 perceived levels, four of which are true levels, and 9 of which are the intermediate levels which fall between the true levels. As stated above, Equation IV determines the total number of perceived levels which output device 30 is capable of outputting, which, when applied to the exemplary output device of FIG. 5 confirms that the total number of levels is 13.

To the extent that the NPOL is influenced by the NTL, as well as the NOL, there may be a motivation to choose a dither template with a very high NTL to increase the NPOL. The higher the NTL the greater the size of the M X N array of the template, which requires a larger size memory. Therefore, there is a cost associated with having a higher NTL, which must be balanced against the benefits of having more perceived levels.

B. Multilevel Dithering System with Two Memories.

Having explained how quantization and dither templates are generally used in IP 40, shown on FIG. 1, to provide the illusion of output device 30 being capable of outputting more levels than the number of true levels which it can actually output, a specific embodiment of IP 40 will now be discussed.

Referring momentarily back to FIG. 1, the overall objective of imaging system 20 is to take the IL<x,y> value of a given input cell 26 in input device 22, and translate it to an OL<x,y> value in the corresponding output cell 34 in output device 30. As shown in FIG. 1, coupled between input device 22 and output device 30 is IP 40, which accomplishes this translation.

Figure 6:
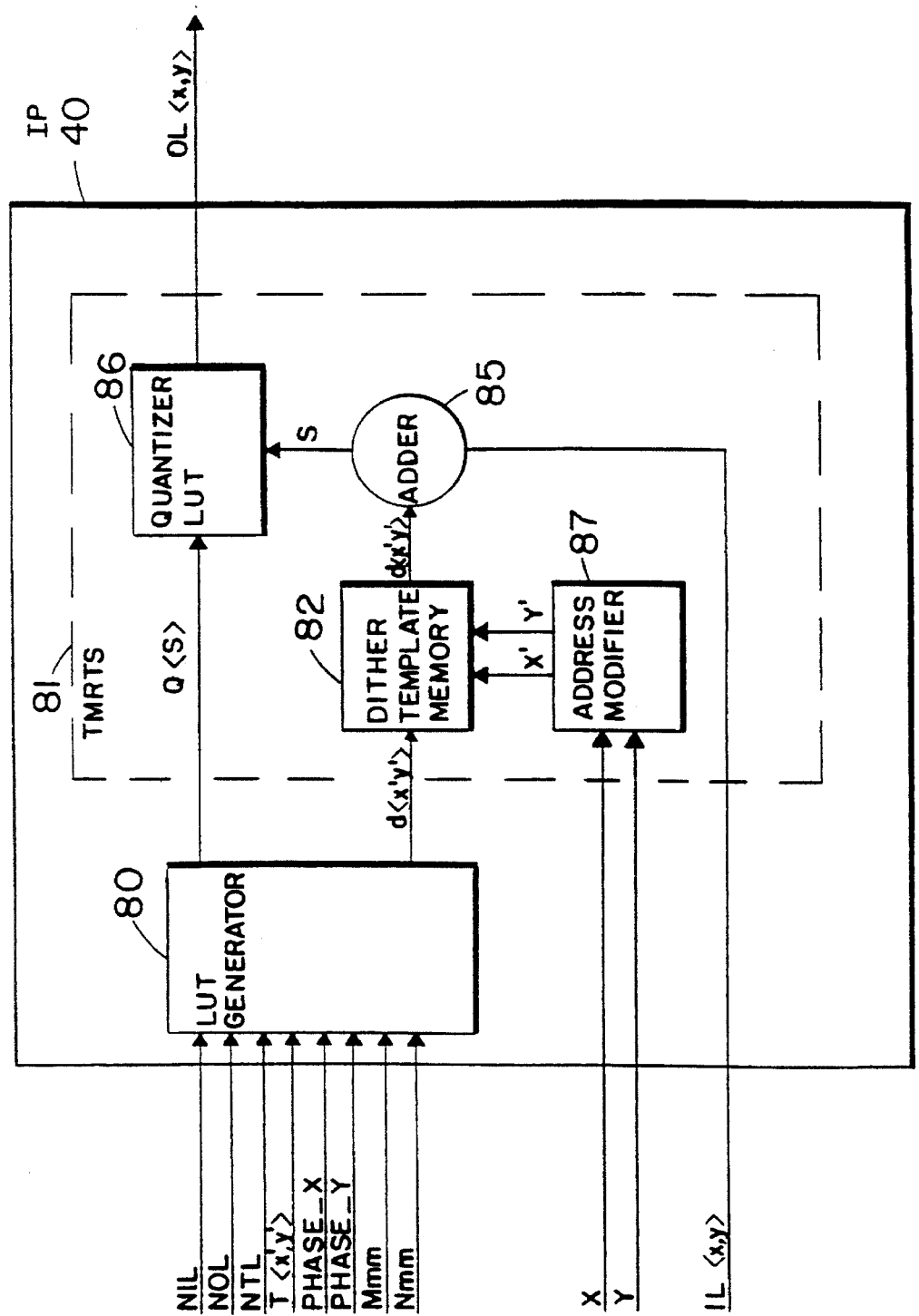
FIG. 6 is a block diagram of the image processor of FIG. 1, including a LUT generator and a two memory run time system (TMRTS).

Referring now to FIG. 6, a block diagram of IP 40 is shown to include two major block components, Look Up Table ("LUT") generator 80, and a two memory run time system 81 ("TMRTS"), which is shown in dashed lines. TMRTS 81 includes a dither template memory 82, which is initialized with values d<x',y'> by LUT generator 80. TMRTS 81 further includes an address modifier circuit 87, which is used to convert addresses x,y of an input cell 26 of input device 22, shown on FIG. 1, to addresses x',y' which are applied as an address to access the values stored in dither template memory 82. The output of dither template memory 82, d<x',y'>, are fed to an adder 85. Adder 85 is also fed an input level, IL<x,y>, for the given input cell 26, and the two values are added by adder 85 to produce a sum value, S. S is used as an address to quantizer LUT 86 to produce output values OL<x,y>, which are fed to the output device 30 of FIG. 1. As with dither template memory 82, quantizer LUT 86 is initialized with values Q<S> from LUT generator 80.

In this particular embodiment of the invention, LUT generator 80 determines values which are stored in the dither template memory 82 and quantizer LUT 86. LUT generator 80 does not necessarily need to run at any particular speed since it computes these values before imaging system 20 starts translating input pixels to output pixels during real time operation. Instead, after LUT generator 80 determines and stores the values in the memory and look up tables, it will resume activity only if some of the imaging system 20 parameters change.

On the other hand, in this particular implementation, TMRTS 81 is the portion of IP 40 which does operate in real time, and during operation it is constantly receiving input values, IL<x,y>, from input array 24, shown in FIG. 1, and processing them into corresponding output values, OL<x,y> in output array 34.

IP 40, and in particular, LUT generator 80 is fed by signals corresponding to: the number of input levels, NIL; the number of output levels, NOL; the number of dither template levels, NTL; the dither template order, T<x',y'>; phase_x and phase_y values; and the dimensions of the dither template memory, $M_{mm} \times N_{mm}$. Address modifier 87 of IP 40 is fed the x and y address values for a given input cell, x,y, and adder 85 is fed the actual input level of the given input cell at the x, y address, IL<x,y>. With this information IP 40 will compute the appropriate OL<x,y> for the corresponding IL<x,y>.

It should be noted that one of the sets of variables input into IP 40, namely phase_x, phase_y, has not yet been discussed. Briefly, phase_x and phase_y are the variables which define the two dimensional spatial shift of the dither matrix relative to a particular dither matrix arrangement immediately prior to the shift. The method by-which these variables determine the shift and the importance of the shift will be further detailed below.

Figure 7:
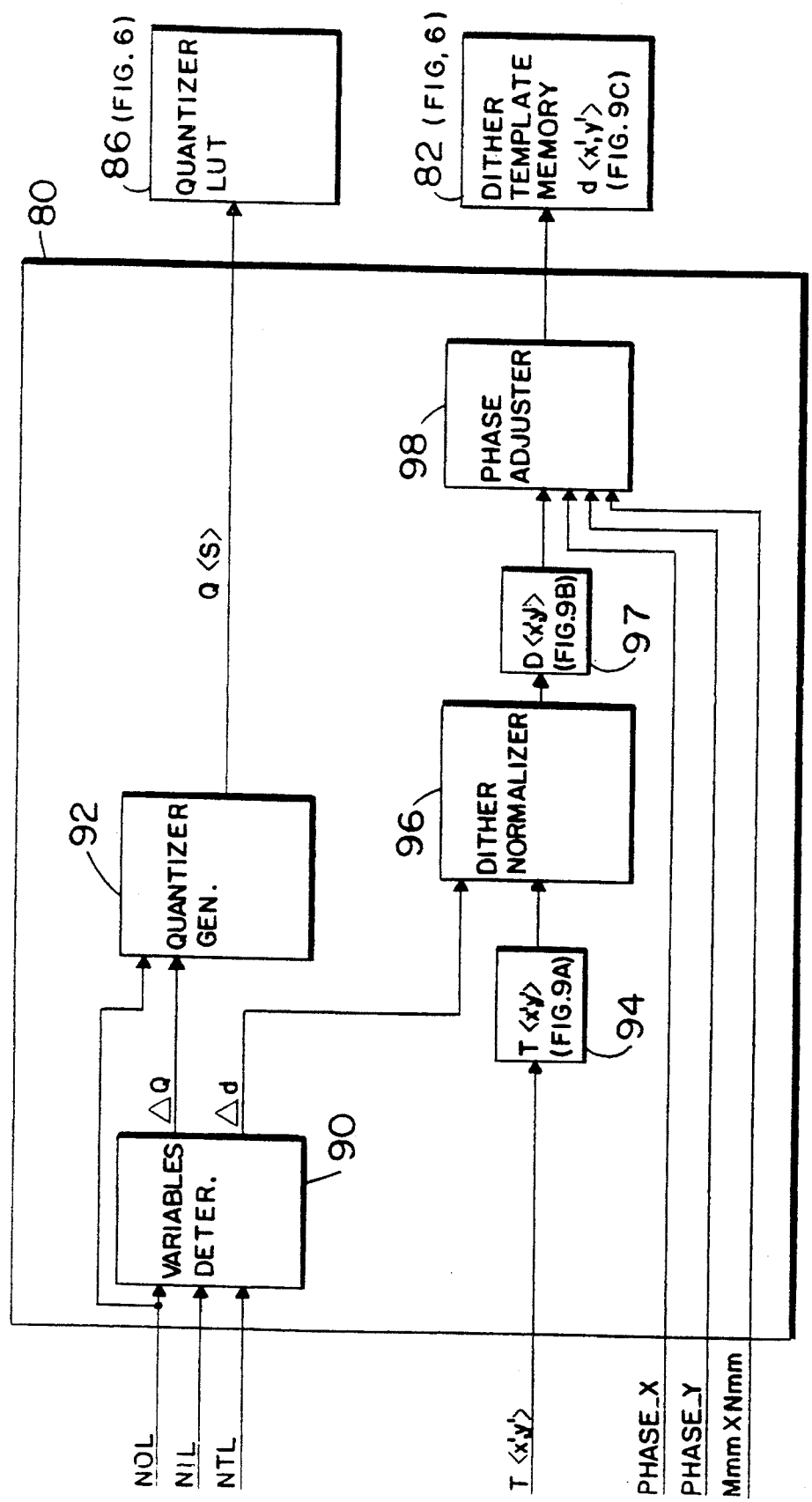
FIG. 7 is a block diagram of the LUT generator shown on FIG. 6, coupled to a quantizer LUT and a dither template memory.

Referring now to FIG. 7, LUT generator 80 is shown to include a variables determiner circuit 90 which is fed by signals corresponding to NOL, NIL, and NTL to provide data signals representing: $\Delta_Q$, the number quantization levels, and $\Delta_d$, the subdivisions of the quantization levels. The variables determiner circuit 90 uses any conventional arithmetic circuit to provided these values by solving Equations I and II, above.

The signals corresponding to NOL and $\Delta_Q$ are fed to quantizer generator 92. Quantizer generator 92 uses these signals to produce a table of values Q<S> which is stored in quantizer LUT 86, shown in FIG. 6.

The LUT generator 80 is shown to further use a memory device, which could be the same memory device used for dither template memory 82, for the temporary storage of a suitable dither template. One embodiment of the invention, incorporates the dither template shown in a copending patent application entitled "Void and Cluster Method for Generating Dither Arrays", the inventor of which is Robert Ulichney (Ser. No. 07/961,244 ) the contents of which is hereby incorporated by reference. The referenced application was filed on the same date as this application and it has also been assigned to the same assignee, Digital Equipment Corporation, as this application.

Dither template values, T<x',y'>, are shown stored on FIG. 7 as reference numeral 94. They are fed to dither normalizer 96 which adjusts the dither template values so that they are made to be symmetrically distributed in a manner which is detailed below.

The output from the dither normalizer 96 as stored is shown by reference numeral 97, and these values are fed into phase adjuster circuit 100 along with phase_x, phase_y, and $M_{mm} \times N_{mm}$ signals. Phase adjuster 100 processes the values by spatially shifting the elements within the dither matrix. Thus, the elements of the dither matrix which have a particular location within the matrix prior to phase adjustment, are adjusted to a different location within the dither matrix on the basis of the phase_x and the phase_y values. The resulting values, d<x' ,y'> are then stored in dither matrix memory 82, shown on FIG. 6.

In order to illustrate how LUT generator 80 operates, a simple example will be developed through which actual values will be assigned to the various input signals to see how those values are processed through IP 40. As discussed above, relatively small numbers are used for the purpose of illustrating the principles underlying the embodiment of this invention; however, larger input values would work in the same manner illustrated. In addition to FIG. 7, FIG. 8 includes a flow diagram showing the steps of the process, and the flow diagram of FIG. 8 will be referred to in conjunction with the discussion of FIG. 7.

In this example, it will be assumed that the following input signals are provided to LUT generator 80 by imaging system 20.

TABLE B

| | | |
|---|---|---|
| NIL = 256 | | |
| NOL = 4 | | |
| NTL = 4 | | |
| Element ordering is: | 1 | 2 |
| | 3 | 0 |
| $M_{mm}$ = 8 | | |
| $N_{mm}$ = 8 | | |
| Phase_x = −1 | | |
| Phase_y = −1 | | |

It should be noted that although a preferred dither template was referred to above, a relatively simple dither template has been used in this particular example for purposes of providing a less complicated discussion of the principles underlying the embodiment of the invention. However, the use of the more complex dither template would be in accordance with the same principles.

Referring back to FIG. 7, variables determiner 90 receives NIL, NOL, and NTL and uses that information to compute the values for $\Delta_Q$ and $\Delta_d$. The computation of $\Delta_Q$ is accomplished in accordance with Equation I, such that in this particular example, $\Delta_Q$=(256−1)/(4−1)=85 (Step 110, FIG. 8). Similarly, the computation of $\Delta_d$ is accomplished in accordance with Equation II, such that $\Delta_d$=85/4=21.25 (Step 112, FIG. 8).

As shown in FIG. 7, the $\Delta_Q$ value is output by variables determiner 90 to quantizer generator 92, which determines the values which are then stored in quantizer LUT 86. Quantizer generator 92 uses $\Delta_Q$ to determine the different values of Q<S>, where particular Q<S> values are output by quantizer LUT 86 in response to any "S" value input into quantizer LUT 86 by adder 85, as shown in FIG. 6 (Step 116, FIG. 8). The generation of S by adder 85 will be further discussed below. The equation employed by quantizer generator 92 to produce Q<S> is:

For each OL={0 through (NOL−1)}, Q<S>=OL, for those values of S that satisfy: int {(OL) ($\Delta_Q$)+0.5}≦S<int {(OL+1) ($\Delta_Q$)+ 0.5}   (Equation V).

Using the values given in Table B and Equation V, quantizer generator 92 would compute and store the following values in quantizer LUT 86.

TABLE C

| | | |
|---|---|---|
| For S from: | 0 through 84, | OL < x, y > = 0; |
| | 85 through 169, | OL < x, y > = 1; |
| | 170 through 254, | OL < x, y > = 2; |
| | 255 through 339, | OL < x, y > = 3. |

In this particular implementation, quantizer LUT 86 has address locations from 0 through 339. The storage of the OL values at those particular address locations is in accordance with Table C, such that at address locations 0 through 84, the output value 0 is stored. Thus, the number of unique S values that map to the given output level 0 is 85. At address locations 85 through 169, the value 1 is stored, so that the number of unique S values that map to the given output level 1 is also 85. The same is true of the other two sets of values, in which the number of unique S values that map to the output levels 2 and 3 are likewise 85.

Although the method by which adder 85 produces the S values has not yet been detailed, it will be shown through the discussion below that, in a given implementation, adder 85 will produce a finite number of unique S values. This is because in a given implementation the number of possible values which are summed together by adder 85 are finite. Understanding this fact in combination with the Equation V, the definition of $\Delta_Q$ can now be refined.

More particularly, $\Delta_Q$ is the average value of the number of unique S values which can be produced by adder 85 in a given implementation and which map to a single, given output level. In order to determine what that average value is in any particular implementation, it is necessary to determine the finite numbers of possible addends to be added by adder 85, and compute all of the possible S values. After the total number of possible, unique S values are determined, then they must be mapped to their respective output levels. In any given implementation there is also a finite number of output levels, and each possible, unique S value will map to one of those output levels. Therefore, the definition of $\Delta_Q$ is refined to represent the average value of the number of unique S values that map to a single, given, output level, if all possible S values were produced by adder 85 and mapped to their corresponding output level in quantizer LUT 86.

Additionally, $\Delta_Q$ is a real number, and Equation V shows that the number of unique S values that map to any single, given, output level does not differ by more than 1. In the particular example provided in connection with Table C, $\Delta_Q$, as the average value of the number of unique S values that map to a single, given output level, is equal to 85. Although in this particular example all such numbers were equal to 85, such that the average is 85, in other implementations, the number of unique S values that map to different, given output levels may not always be the same. As indicated by Equation V, however, they will differ by no more than one.

During the operation of IP 40, as an S value is sent to quantizer LUT 86 by adder 85, shown in FIG. 6, the S value provides an address to the memory device of quantizer LUT 86, and the corresponding output value at that address is then provided as OL<x,y>. For example, if S is equal to 273, quantizer LUT 86 would output an OL equal to 3. On the other hand, if S is equal to 93, quantizer LUT 86 would output an OL equal to 1. Having OL<x,y> output as soon as the appropriate address is accessed in quantizer LUT 86 contributes substantially to the speed of the overall imaging system.

Continuing with the discussion of the block components, FIG. 7 shows the order of the dither template, T<x',y'>, as another input into LUT generator 80. As explained in connection with the discussion of FIG. 3G, above, in those instances in which the dimension of the dither template is smaller than the dimension of the memory, it is possible to tile the dither template into the memory so that the entire memory space is filled with the dither pattern (Step 120, FIG. 8).

In this particular instance, the dither template, shown in Table B, has a 2×2 dimension, while the dither template memory is 8×8. Therefore, imaging system 20 would have tiled the smaller dither template into the larger dither template memory so that in the embodiment shown, the T<x',y'> presented as an input to LUT generator 80 is the fully expanded dither pattern. On the other hand, if instead of using the 2×2 dither template shown in Table B, an 8×8 dither template was used, no such tiling would be necessary, as the dither template would fit within the dither template memory without repetition.

Figure 8:
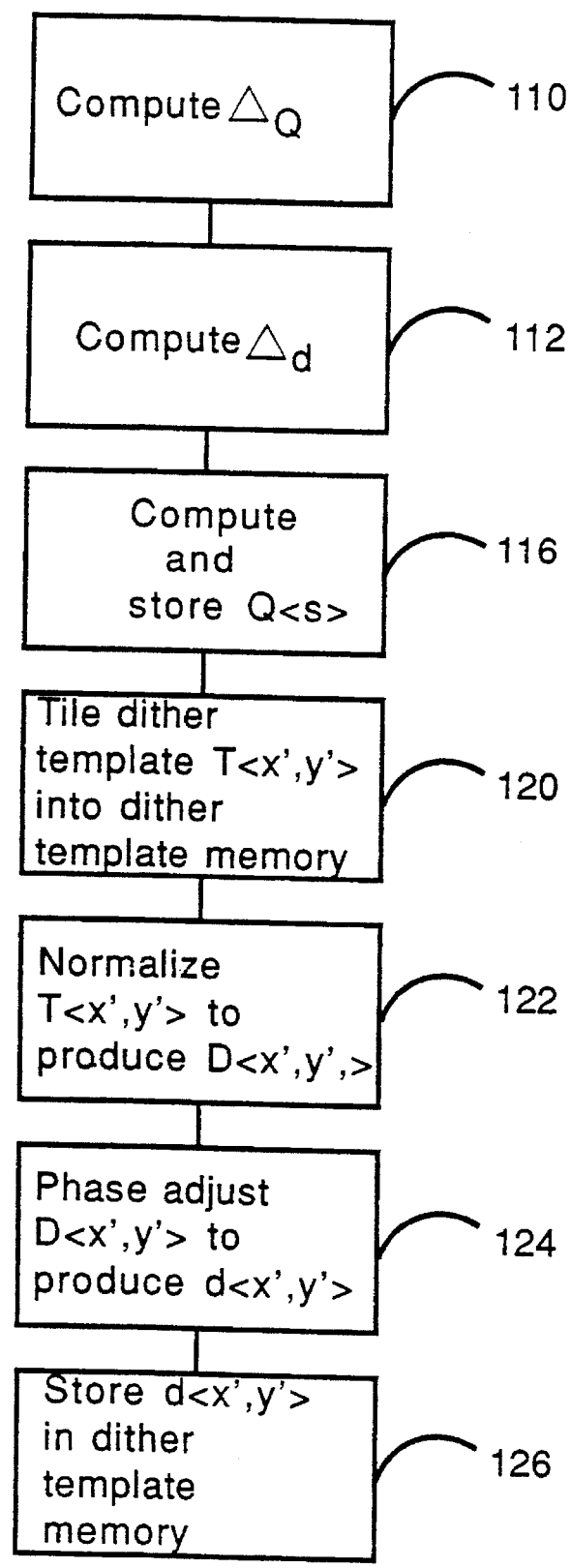
FIG. 8 is a flow diagram describing the process by which quantized values and dither template values are produced by the quantizer LUT of FIGS. 6 and 7.

As shown on FIG. 7, the numerical values of the elements in the dither template, T<x',y'> are next processed by dither normalizer 96 (Step 122, FIG. 8). Through dither normalizer the dither matrix values are adjusted to be symmetrically distributed between 0 and the average value of the number of unique S values which can be produced by adder 85 and which map to a single, given output level. As discussed above, that average is equal to $\Delta_Q$, which is determined in accordance with the method discussed above.

As shown on FIG. 7, dither normalizer 96 uses the values $\Delta_d$, which is output by variables determiner 90. Dither normalizer 96 combines the values for T<x',y'> and $\Delta_d$, and Offset in the following equation for the purpose of outputting normalized values, D<x',y'>, where:

$$D<x',y'>=int\{\Delta_d\,(T<x',y'>+\tfrac{1}{2})\} \qquad \text{(Equation VI)}.$$

It should be noted that Equation VI is derived from the equation: D<x',y'>=int{<(T<x',y'>)($\Delta_d$)>+Offset}. This equation, however, can be simplified into Equation VI using the expression for Offset provided in Equation III. Accordingly, dither normalizer uses the simplified Equation VI, and does not need to have Offset separately computed.

Using the specific values of this example, when the given T<x',y'> values shown in FIG. 9A are processed by dither normalizer 96 using Equation VI, the resulting D<x',y'> values are shown in FIG. 9B. As seen by comparing the values in FIGS. 9A and 9B, each of the original dither template values has been adjusted so that they are symmetrically distributed within the range that extends from 0 through the value of $\Delta_Q$, which in this example is 85. Thus, the value 0 is adjusted to 10; the value 1 is adjusted to 31; the value 2 is adjusted to 53; and the value 3 is adjusted to 74.

Next, the D<x',y'> values are processed by phase adjuster 98, which uses the values for phase_x, phase_y, $M_{mm}$, and $N_{mm}$, to provide a two dimensional, spatial shift of the elements within the dither matrix (Step 124, FIG. 8). Thus, each of the elements of the dither matrix which have a particular location within the matrix prior to phase adjustment, are adjusted to a different location within the dither matrix on the basis of the phase_x and the phase_y values.

In the embodiment shown on FIG. 7, the D<x',y'> values, phase_x, phase_y, $M_{mm}$, and $N_{mm}$ are combined in the following equation for the purpose of outputting d<x',y'>, which is the final value that is stored in dither template memory 82, shown on FIG. 6. The equation is:

$$d<x',y'> = D<(x'+\text{phase\_}x) modulo(M_{mm}),$$
$$(y'+\text{phase\_}y) modulo(N_{mm})>,$$

where:

A modulo (B)=the remainder resulting from A/B (Equation VII).

After the values for D<x',y'>, as shown in FIG. 9C, are processed by phase adjuster 98 along with the values for phase_x, phase_y, $M_{mm}$, and $N_{mm}$, the final values, d<x',y'>, are stored in dither template memory 82 (Step 126, FIG. 8). FIG. 7 shows phase adjuster 98 inputting d<x',y'> into dither template memory 82, and FIG. 9C shows what those stored values would be for the given example.

As seen by comparing FIGS. 9B and 9C, through the phase adjustment process the elements in FIG. 9B, which is the arrangement of the dither matrix elements immediately prior to the phase adjustment step, have been shifted down and to the right by one. This is because phase_x=(−1) and phase_y=(−1). If phase_x=(2) and phase_y=(3), for another example, then the dither template values would have been shifted up 2 and to the right 3.

Given that the dither matrix is designed to "wrap around", during the phase adjustment process, the elements along the right side and bottom are simply adjusted to the left side and the top, respectively. The phase adjustment process is particularly useful in connection with the implementation of dithering systems which involve color primaries, such as red, green, and blue, as will be discussed below.

Having reviewed the internal operation of LUT generator 80, and having shown how the specific values are generated and stored in dither template memory 82 and quantizer LUT 86, reference can now be made back to FIG. 6 for a further explanation of the operation of IP 40. This explanation will be provided in conjunction with the flow diagram of FIG. 10. As stated above, after table value determiner 41 fills dither template memory 82 with the d<x',y'> values and quantizer LUT 86 with Q<s> values (Step 130, FIG. 9), TMRTS 81 is prepared to determine the output levels of pixels in output device 30 which correspond to input levels of pixels in input device 22 during real time operation.

As shown on FIG. 6, during real time operation address modifier 87 receives the x,y address of a specific input cell 26 from input device 22. In response to that x,y address, address modifier 87 will adjust the x,y address because the dimension of the input array 24 is likely to be much larger than the dimension of the dither template memory (Step 132, FIG. 10). Accordingly, address modifier 87 uses the following equation to convert x to x', and y to y'.

$$x'=x\ modulo\ M;\ y'=y\ modulo\ N\ (Equation\ VIII).$$

It should be noted that for the likely case that $M_{mm}$ and $N_{mm}$ are powers of 2, address modifier 87 would simply use the low order bits of x and y. After this conversion, address modifier 87 will feed a modified address x',y' into dither template memory 82, in which d<x',y'> values have already been stored by phase adjuster 98.

Figure 10:
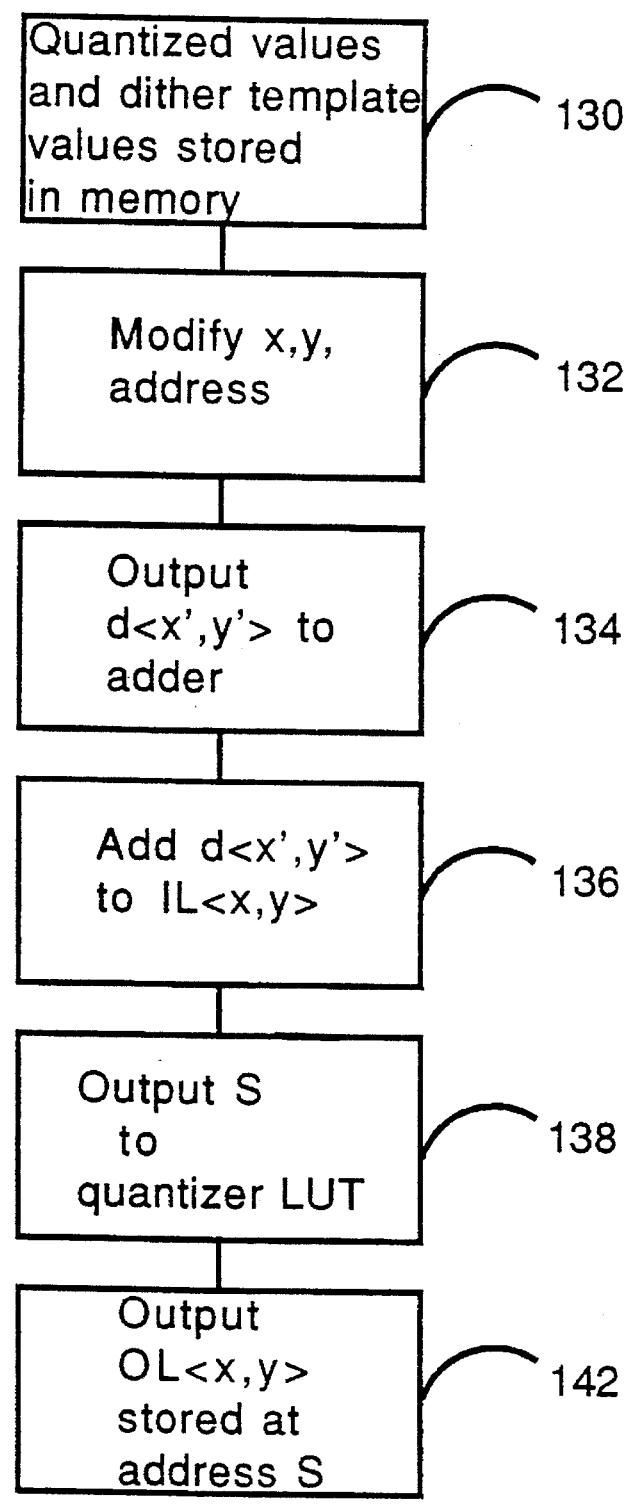
FIG. 10 is a flow diagram describing the process by which input levels are used by the image processor of FIG. 6 to produce corresponding output levels.

In response to the x',y' address, dither template memory 82 will output the corresponding d<x',y'> value stored in the row-column address corresponding to x',y' (Step 134, FIG. 10). That d<x',y'> value is sent to adder 85, which adds d<x',y'> to IL<x,y>, which is the specific input level value of the input cell 26 in input array 24, shown on FIG. 1, at address x,y (Step 136, FIG. 10). The sum of those two values is S which is forwarded to quantizer LUT 86 (Step 138, FIG. 10). As discussed above, LUT generator 80 will have already stored OL values in the locations for which S operates as an address. Accordingly, S will access a particular address location depending on the specific S value resulting in quantizer LUT 86 outputting the appropriate OL<x,y> value (Step 142, FIG. 10) to the output device 30 on FIG. 1.

At this point it can be noted that the two addends of adder 85—namely the dither template values, d<x',y'>, and the input levels, IL<x,y> —are finite numbers. In other words, in a particular implementation, there will be a finite number of possible, dither template values, and a finite number of possible input levels. Correspondingly, the addition of all possible dither template values with all possible input levels would yield a finite number of unique, possible S values.

Referring now to FIG. 11, a table is provided which shows the range of input levels for the example discussed in connection with FIGS. 6 through 11, the total number of input levels falling within those ranges, and the corresponding perceived output levels. The perceived output levels are the ones which are achieved by passing every input level from IL=0 to IL=255 in combination with every address from <x,y>=<0,0> to <7,7> through IP 40. As shown in FIG. 11, there are 4 true levels, and 9 intermediate levels which are the effective results of the dithered average. These numerical averages are meaningful in that a person viewing output device 30 would visually average the output patterns and perceive an image level equivalent to the average value indicated.

Referring back to the discussion of FIGS. 4 and 5, in those examples the cells of the dither templates are discussed as if they could actually be shaded. As stated in that portion of the discussion, this is not so. Rather, it is the cells of the output device, such as cells 34 of output array 32 shown on FIG. 1 that are actually shaded in order to produce an output image. On the other hand, through the image processing technique discussed in connection with FIGS. 6 through 11, it has been explained how the values in the dither template are indirectly mapped to the determined output levels in the output array. In other words, through the technique of the present invention, the value in a given cell in the dither template will indirectly determine the output level in a given cell in the output array. As seen by following the processing of the values, T<x',y'> is made up of the original dither template values, which eventually get modified in dither normalizer 96 and phase adjuster 98 before storage in dither template memory 82. The values stored in dither template memory 82 are then added to the input levels, IL<x,y>, and the sum, S, then operates as an address to quantizer LUT 86. Quantizer LUT 86 then outputs the appropriate level for the output cell which corresponds to the level of the input cell from which IL<x,y> originated. In this regard, although the cells of the dither template are themselves not shaded, the values in the cells of the dither template do indirectly determine the levels, or shading, of the cells of the output array in the manner discussed.

C. Two Level Dithering System with Comparator.

Although the first embodiment of the present invention has been discussed in connection with a system which can dither to any number of output levels, in the event that the number of output levels equals 2, ie. NOL=2, a different implementation of the multi-level processing system is possible. As discussed above, an output device which is capable of representing only two levels is a bi-tonal device. In this particular embodiment, there may be any number of input levels provided they are greater than two. In other words, the output device is bi-tonal, but the input devices are monochromatic, or color devices.

Figure 12:
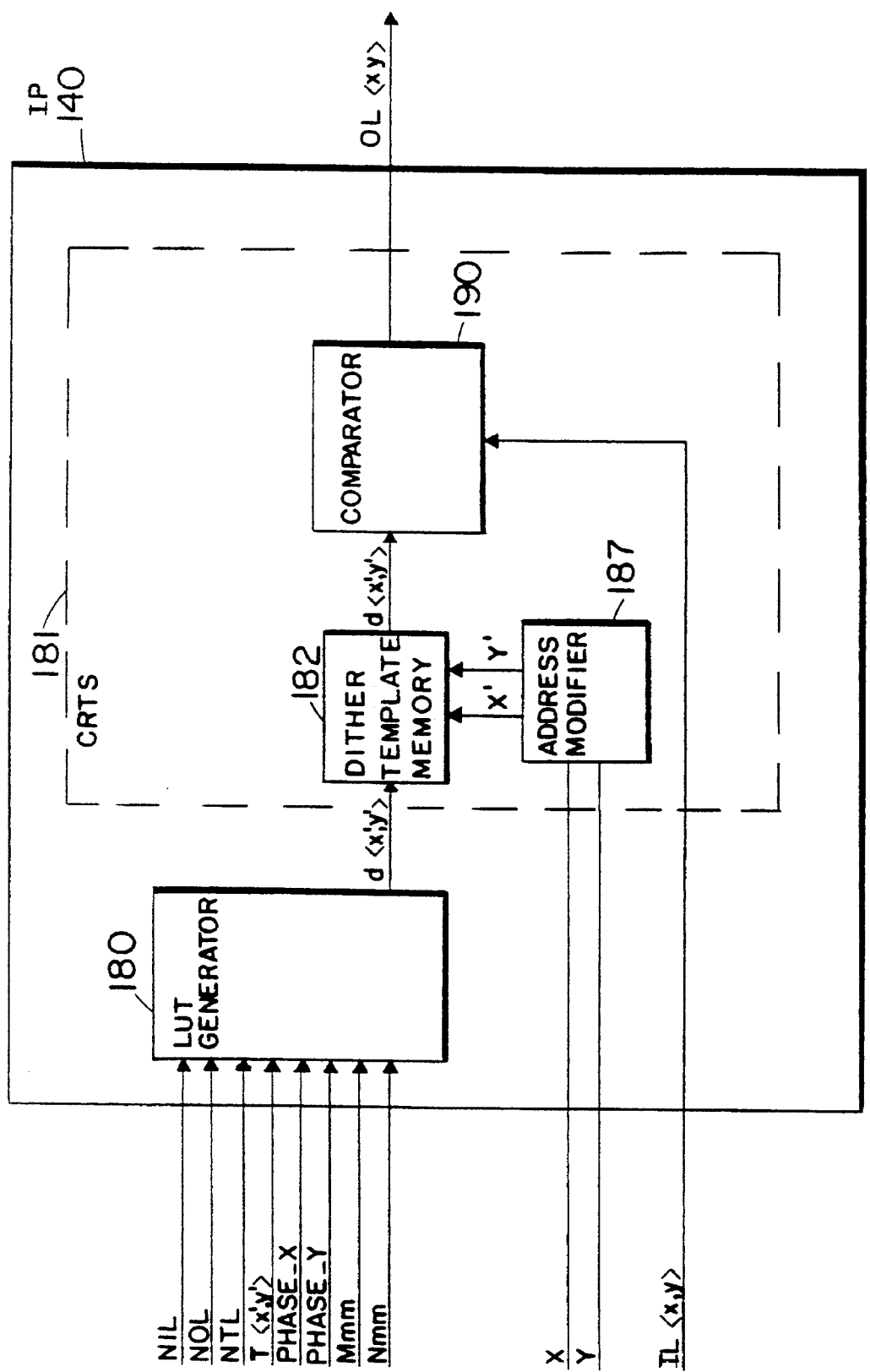
FIG. 12 is a block diagram of an alternate embodiment of an image processor, in accordance with the present invention, which includes a LUT generator and a comparator run time system (CRTS).

Referring now to FIG. 12 for the alternate embodiment of the image processor portion of the imaging system, IP 140 receives the same basic inputs, has similar components, and processes those inputs in a similar manner as IP 40, discussed in connection with FIGS. 1, and 6 through 11. Thus, FIG. 1 provides an overview of the implementation of IP 140 in an imaging system provided IP 140 was substituted in place of IP 40.

Given that the operation of IP 140 of FIG. 12 is similar to the operation of IP 40 of FIGS. 6 and 7, the discussion of FIG. 12 will not repeat the detailed discussion of FIGS. 6 and 7, but will focus upon the differences between IP 40 and IP 140. The major differences are that in place of an adder 85, there is a comparator, and the quantizer LUT 86 has been eliminated. Also, in FIG. 12, the block elements are numbered so that they correspond to their respective block elements in FIG. 6; however, the corresponding block elements in FIG. 12 are numbered in the 100's to distinguish them.

Figure 13:
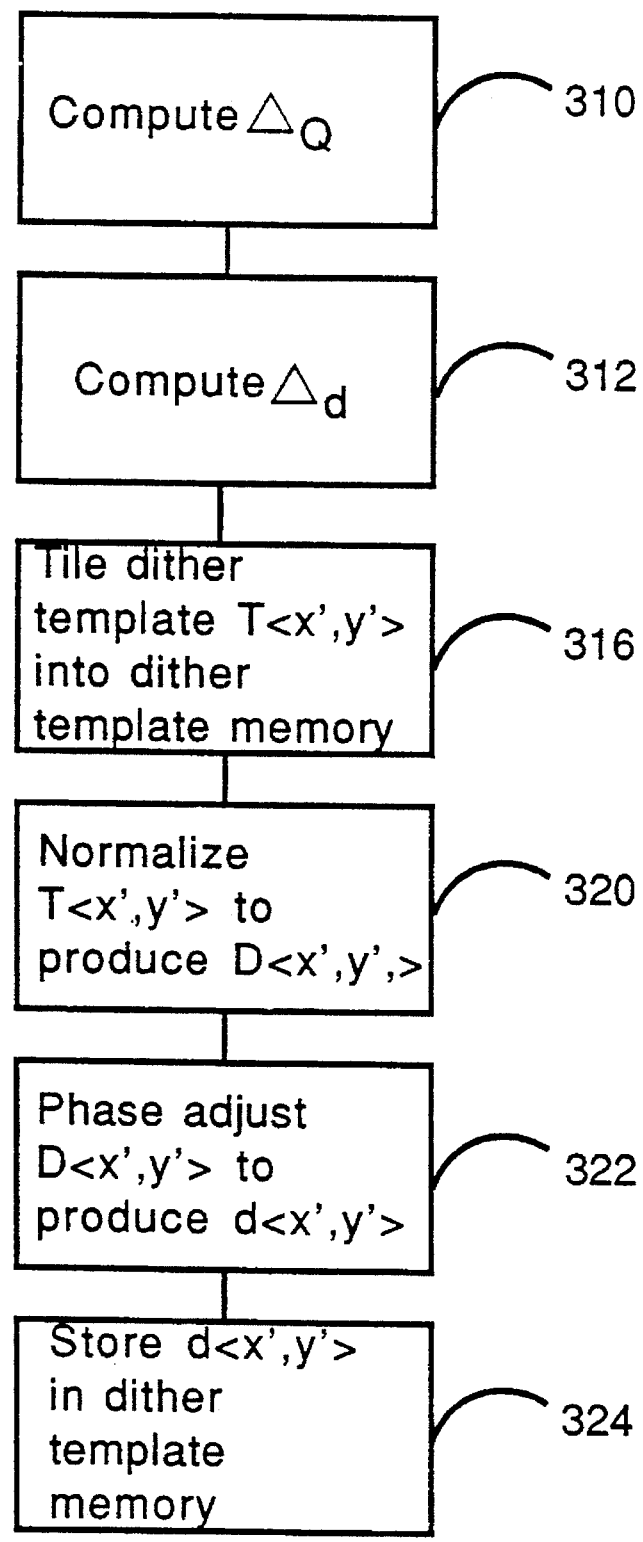
FIG. 13 is a flow diagram describing the process by which dither template values are produced by the quantizer LUT of FIG. 12.
Figure 14:
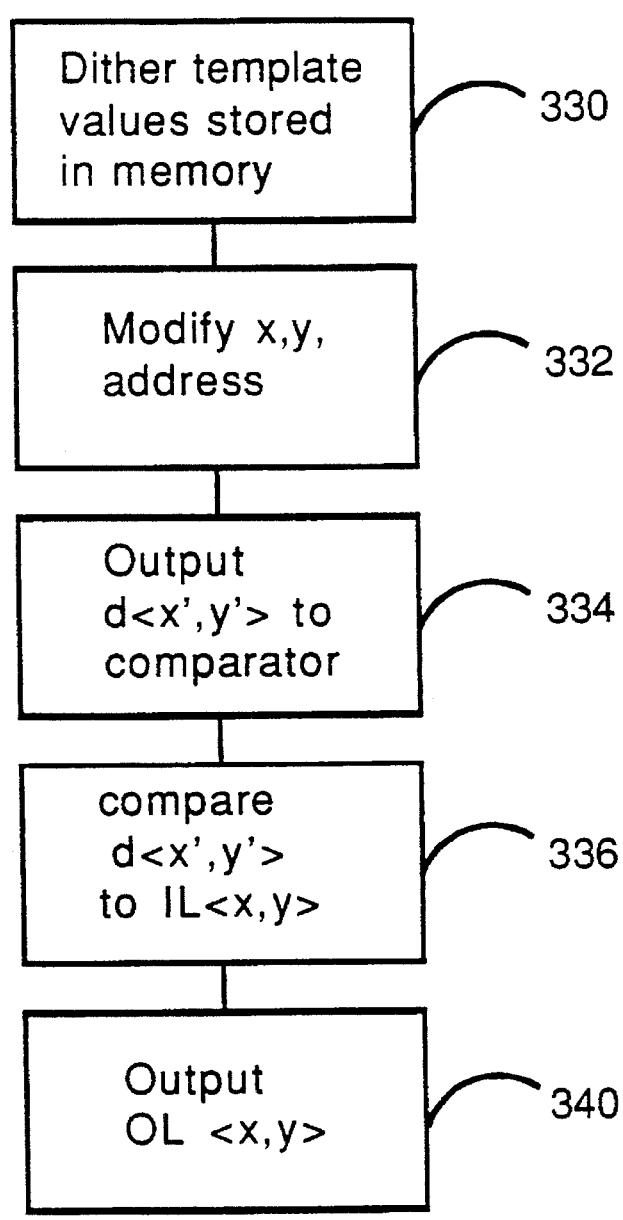
FIG. 14 is a flow diagram describing the process by which input levels are used by the image processor of FIG. 12 to produce corresponding output levels.

In addition to the block diagram of FIG. 12, flow diagrams of the method of implementing the technique in conjunction with the comparator are provided on FIGS. 13 and 14.

In FIG. 12, LUT generator 180 outputs the d<x',y'> values which are stored in dither template memory 182, and it also computes $\Delta_Q$, (Step 310, FIG. 13), and $\Delta_d$ (Step 312, FIG. 13), as explained above in connection with LUT generator 80 of FIGS. 6 and 7. Given that there is no quantizer LUT in this particular implementation, LUT generator 180 does not need to compute quantized values and fill a quantizer LUT 86, as discussed in connection with FIGS. 6 and 7.

After LUT generator 180 computes $\Delta_Q$ and $\Delta_d$, it tiles the dither template into the dither template memory 182, if necessary (Step 316, FIG. 13). LUT generator 180 normalizes the dither template values (Step 320, FIG. 13), phase adjusts the dither template values (Step 322, FIG. 13), and stores the results in dither template memory 182 (Step 324, FIG. 13). This is, of course, the same as the procedure discussed in connection with FIGS. 6 through 11.

Next, after the values are stored in dither template memory 182, the run time portion of the system, comparator run time system (CRTS) 181, is prepared to operate. With the dither template values stored in dither matrix memory 182 (Step 330, FIG. 14), address modifier 287 receives the x,y address of the input cell. Like address modifier 87 of FIG. 6, address modifier 187 will translate the address to x',y' (Step 332, FIG. 14). In response to the address, dither template memory 182 will output the accessed d<x',y'> value to comparator 190 (Step 334, FIG. 14). The IL<x,y> value is transferred to comparator 190 from another part of imaging system 20, such as input device 22 shown in FIG. 1. Comparator 190 then performs the following comparison and outputs the appropriate OL<x,y> value on the basis of that comparison (Step 336, FIG. 14). The operation performed by comparator 190 is as follows:

$$\text{If } IL<x,y> > d<x',y'>, \quad \text{then } OL<x,y> = 1, \quad \text{(Equation IX.)}$$
$$\text{else } OL<x,y> = 0.$$

Depending upon the results of the comparison, IP 140 will output the corresponding OL<x,y> (Step 340, FIG. 14).

Thus, IP 140 achieves the same output as the generally applicable IP 40, discussed in connection with FIGS. 6 through 11, provided the output image is bi-tonal, or NOL=2.

Multilevel Dithering System with Single Memory.

In yet another embodiment of the image processor, the run time portion of the system uses a single memory device. This single memory approach is faster than the embodiments which use two memory devices in the run time system, as discussed above; however, the size of the memory requirements are considerably greater. This particular implementation requires that the row dimension, $M_{mm}$, and the column dimension, $N_{mm}$, of the dither template memory 482, as shown in FIG. 15, must each be a power of 2.

Figure 15:
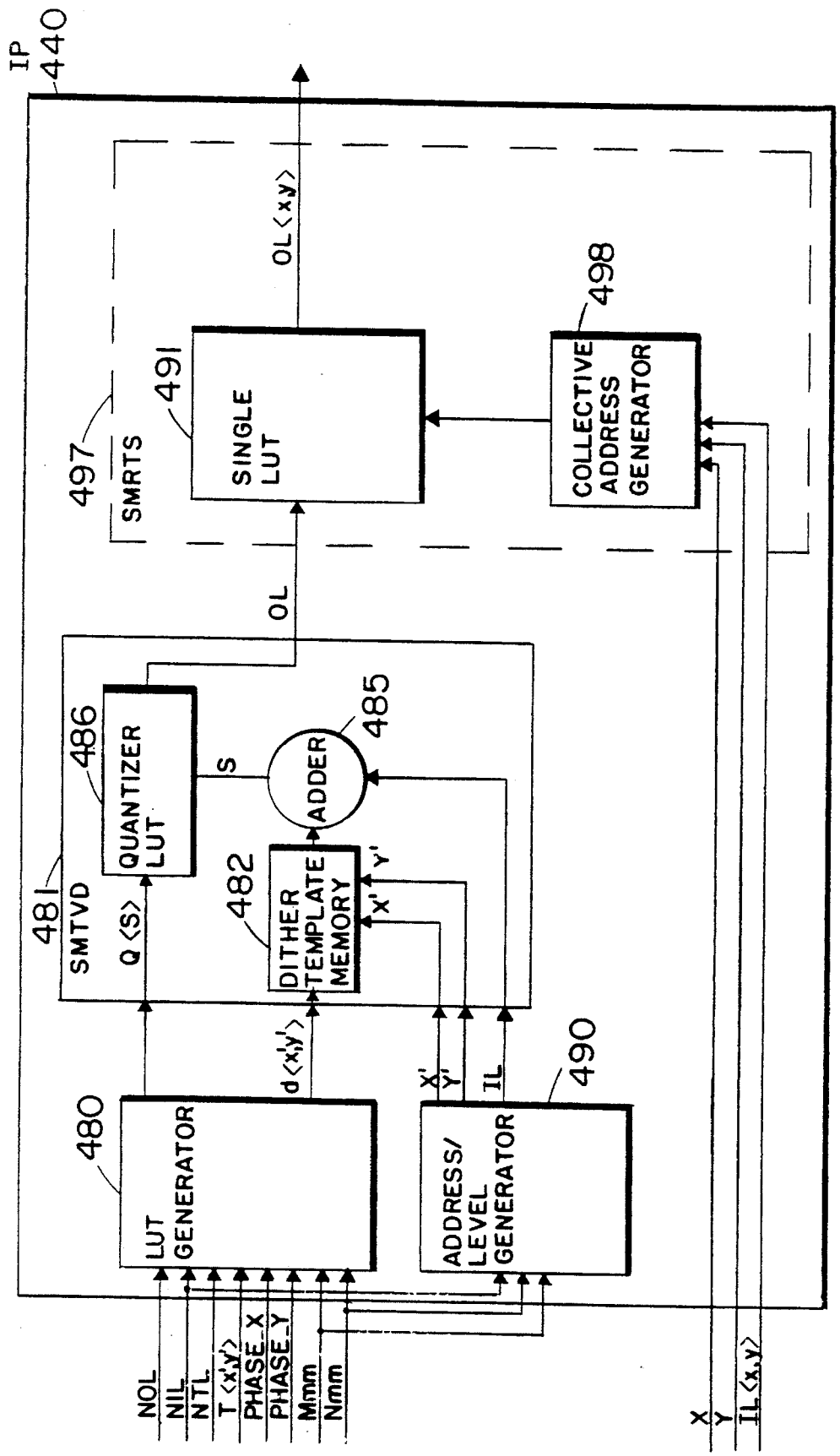
FIG. 15 is a block diagram of yet another alternate embodiment of an image processor, in accordance with the present invention, which includes a LUT generator, an address/level generator, a single memory table value determiner (SMTVD), and a single memory run time system (SMRTS).
Figure 16:
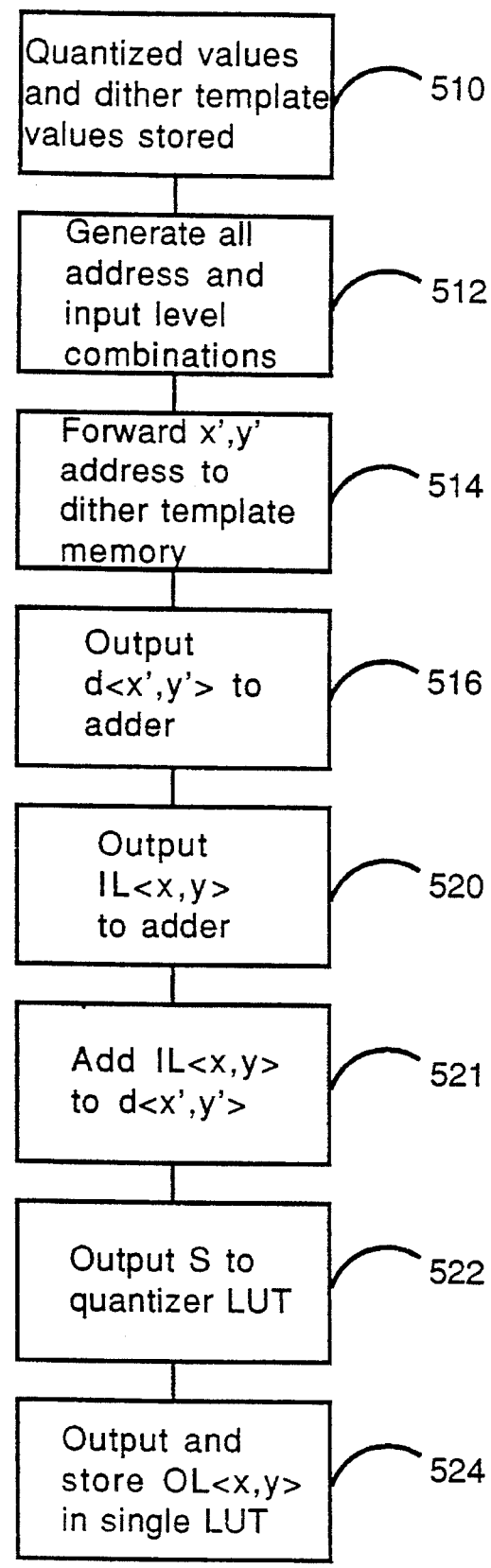
FIG. 16 is flow diagram describing the process by which quantized values and dither template values are produced by the quantizer LUT of FIG. 15.

Referring now to FIGS. 15 and 16, IP 440 includes LUT generator 480, which receives the same inputs and operates in the same manner as LUT generator 80, discussed in connection with FIGS. 6 through 11. As discussed above, FIG. 1 could provide the overview of the implementation of IP 440 in an imaging system 20, provided IP 440 is substituted in place of IP 40. IP 440 includes single memory table value determiner (SMTVD) 481, which contains the same block elements as TMRTS 81, discussed above. The block elements of FIG. 15 are numbered so that they correspond to their respective block elements in FIG. 6; however, the corresponding block elements in FIG. 15 are numbered in the 400's to distinguish them.

To the extent that the operation of LUT generator 480 and SMTVD 481 operate the same as the respective block elements discussed above, the details of their manner of operation will not be repeated. Rather, it will be understood that LUT generator 480 outputs d<x',y'> values which are stored in dither template memory 482, and LUT generator 480 outputs Q<S> values which are stored in quantizer LUT 486. The method by which these values are generated is identical to the process detailed in connection with the discussion of FIGS. 6 through 11. It should also be understood that the values for d<x',y'> and Q<S> would have been generated by LUT generator prior to the processing and outputting of values by address/level generator 490, the operation of which is to be detailed next.

After d<x',y'> and Q<S> have been stored (Step 510, FIG. 16), FIG. 15 shows address/level generator 490 receiving the inputs NIL, $M_{mm}$, $N_{mm}$ from imaging system 20 and address/level generator 490 outputs x', y' and IL. The function of address/level generator 490 is to produce all of the possible combinations of x', y' and IL values, so that the single memory device of the run time portion of the system is able to store all possible combinations of row/column addresses of dither template memory 482 and all possible input levels at those addresses.

Figure 17:
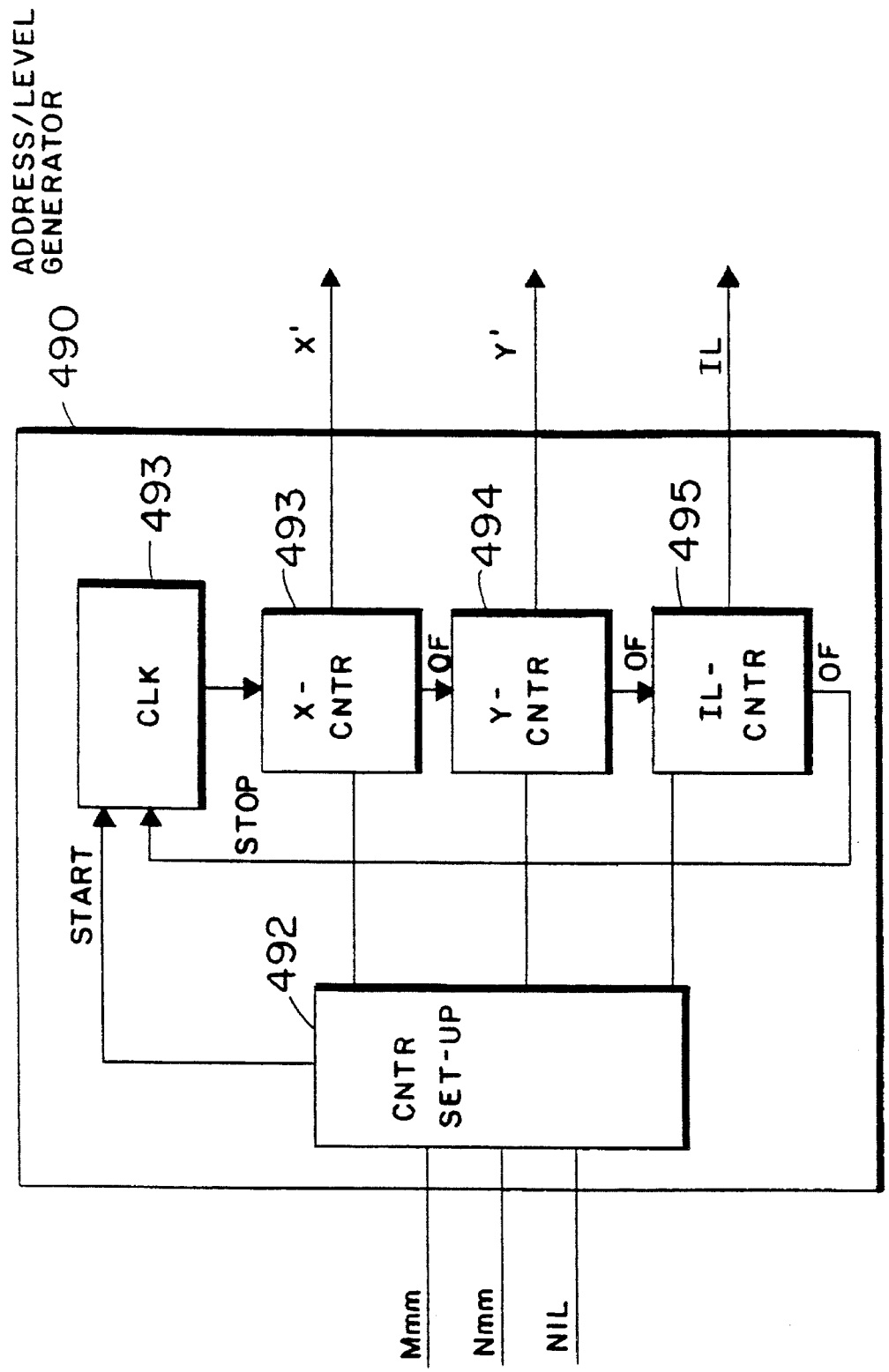
FIG. 17 is a block diagram of the address/level generator shown in FIG. 15.

Referring now to FIG. 17, an address/level generator 490 is shown including a counter set-up circuit 492. Counter set-up 492 is a circuit device which is responsive to signals which correspond to the values for $M_{mm}$, $N_{mm}$, and NIL. Counter set-up 492 makes sure that the individual counters, 493 through 495, are large enough to count to the maximum values given by $M_{mm}$, $N_{mm}$, and NIL. Also, counter set-up 492 initializes the individual counters in the beginning of the operation so that their respective initial values are zero. After initialization of the counters, counter set up 492 starts clock 496 which will begin incrementing the counters.

A simple example will show how address/level generator 490 operates. Assume that dither template memory is an 8×8 array and there are 256 input levels. Accordingly, x-counter 493 will need 3 address bits for representing the 8 columns, $M_{mm}$; y-counter 494 will need 3 address bits for representing the 8 rows, $N_{mm}$; and IL-counter 495 will need 8 bits for representing the 256 input levels, IL. After initialization, counters 493, 494, and 495 will output their respective values; namely x-counter 494 outputs x', y-counter 495 outputs y', and IL-counter 496 outputs IL. All such values are output to SMTVD 481, shown on FIG. 15, prior to the first incrementation by clock 496, and thereafter these values are output after each incrementation by clock 496.

Before the first incrementation by clock 496, x'=000, y'=000, and IL=00000000. Also before incrementation, address/level generator 490 would then transfer these values to SMTVD 481 so that it could use the inputs to compute the values to be stored in single LUT 491, shown on FIG. 15. Next, clock 496 will increment x-counter 493 by one, so that the values output by address/level generator 490 are: x'=001, y'=000, and IL=00000000. Likewise, these values are transmitted to SMTVD 481, as are all of the values for x', y', and IL after they are changed. After the second incrementation by clock 496, the outputs of address/level generator 290 are: x'=010, y'=000, and IL=00000000. Thus, the incrementation will continue until x-counter 493 reaches an output of 111, at which point it will overflow (OF) for the first time.

As shown on FIG. 15, the overflow signal of x-counter 493 is the increment signal for y-counter 495. Therefore, when x-counter overflows for the first time, it then increments y-counter 495 for the first time. At that point the outputs will be x'=000, y'=001, and IL=00000000. As clock 496 continues to increment x-counter 493, it will eventually overflow for a second time, once again incrementing y-counter 495, at which point the outputs will be x'=000, y'=010, and IL=00000000.

Through the incrementation process y-counter 495 will eventually overflow and increment IL-counter 496 for the first time, the overflow of y-counter 495 being the input for IL-counter 496 as shown in FIG. 17. After the first overflow, the outputs will be x'=000, y'=000, and IL=00000001. Finally, after IL-counter 495 is made to overflow through incrementation, its overflow will stop clock 496, and the incrementation process will be completed.

As indicated, at each stage of the incrementation process, x', y' and IL are transferred to SMTVD 481 for processing. Therefore, through the operation of address/level generator 290, all of the possible combinations of row-column addresses and all possible input levels at those addresses can be generated and forwarded to SMTVD 281 for processing (Step 512, FIG. 16.)

Referring back to FIG. 15, x' and y' are transferred to address modifier 487 by address/level generator 490. As discussed above, in connection with address modifier 87 shown in FIG. 6, the purpose of address modifier 87 is to adjust the x,y address of the input from input device 22 in the event that input array 24 of FIG. 1 is larger than the dimension of the dither template memory. In the embodiment of the image processor shown in FIG. 15, IP 440, address/level generator 490 already outputs x', y' (Step 514, FIG. 16), thereby eliminating the need for a separate address modifier. In response to x', y' dither template memory 482 outputs d<x',y'> values which are transmitted to adder 485 (Step 516, FIG. 16).

Address/level generator 490 also outputs the IL<x,y> value associated with x', y' and together the values are transmitted to adder 285 (Step 520, FIG. 16). In response, adder 285 adds the given d<x',y'> values to their corresponding IL values to form the sum, S (Step 521, FIG. 16). Similar to the discussion of FIGS. 6 through 11, S is output as the address to the look up table of quantizer LUT 486 (Step 522, FIG. 16). Accordingly, as address/level generator 490 transmits each x', y', and IL value to SMTVD 481, SMTVD 481 will output OL values, which correspond to each IL<x,y> value transmitted.

As shown in FIG. 15, the OL values output by quantizer LUT 486 of SMTVD 481 are transmitted to single LUT 491, which is a memory device. As OL values are transmitted they are stored in sequential addresses in single LUT 481 (Step 524, FIG. 16). For example, the first set of values output by address/level generator 490, before clock 496 incremented the counters, is x'= 000, y'= 000, and IL =00000000. Thus, the OL computed by SMTVD 481 in connection with this set of values would be stored in the first address location of single LUT 491, having a binary address of 00000000000000, for example. When the second set of values output by address/level generator 490 is transmitted to SMTVD 481, the computed OL would be stored in the second memory location, having a binary address of 00000000000001, and so on.

Thus far, the operation of IP 440 has addressed the computation and storage of values in the single memory device of the run time portion of the system, which is a look up table, single LUT 491. In this single memory implementation, all of the operations prior to the computing and filling of single LUT 491 with the OL values does not need to be done at any particular speed. Rather all the block elements compute the values and fill single LUT 491 prior to the time that imaging system 20, shown in FIG. 1, translates the input pixels to output pixels during real time operation. After the values are computed and stored in single LUT 491, imaging system 20 is then in a position to translate the input pixels to output pixels through the real time operation of single memory run time system (SMRTS) 497, shown as a dashed line block on FIG. 15.

Figure 18:
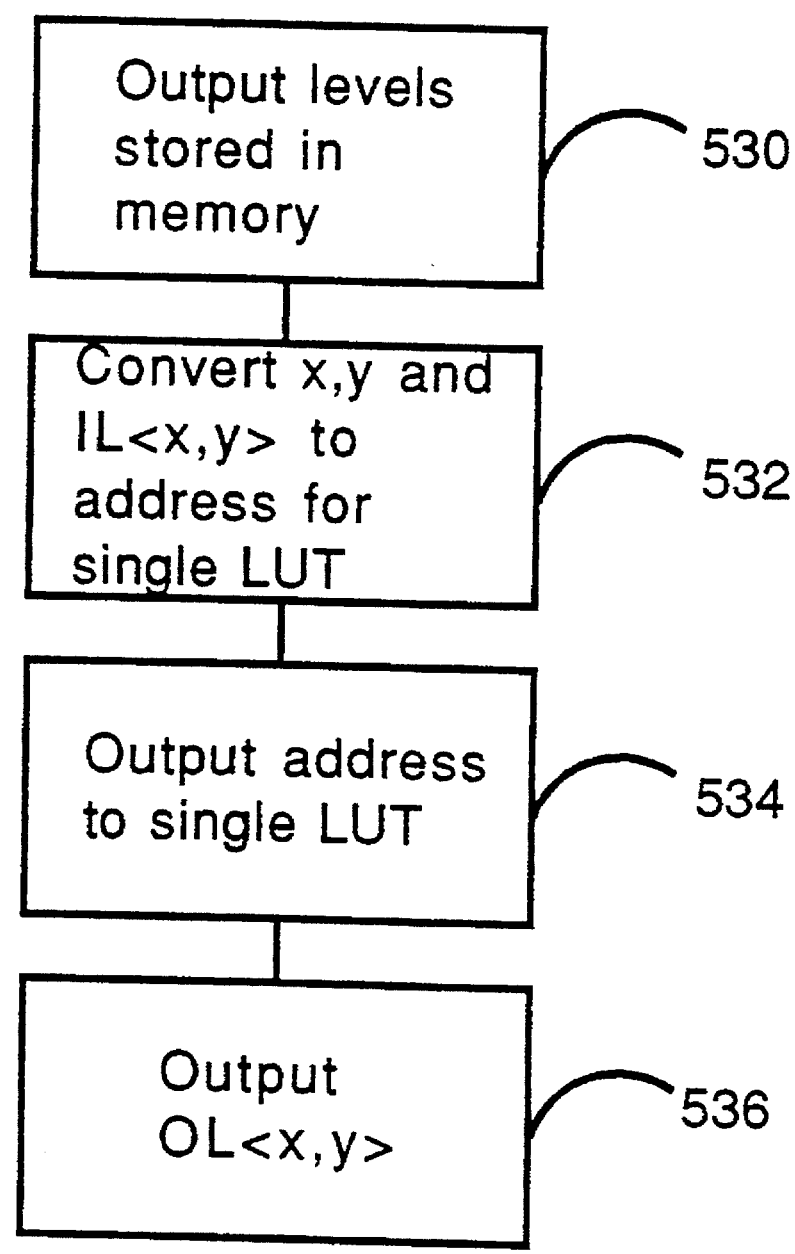
FIG. 18 is a flow diagram describing the process by which input levels are used by the image processor of FIG. 15 to produce corresponding output levels.

Along with the block elements of FIG. 15, FIG. 18 provides a flow diagram illustrating the method by which the operation of SMRTS 497 results in the outputting of output levels which correspond to the input levels transmitted to SMRTS 497. SMRTS 497 includes single LUT 491 and collective address generator 498. As discussed above, single LUT 491 is a memory device which stores all of the output levels computed by SMTVD 481 (Step 530, FIG. 18). On the other hand, collective address generator 498 receives x, y addresses and their corresponding IL<x,y> from input device 22 during real time operation. Collective address generator 498 converts this information into an address that is then used to access single LUT 491 (Step 532, FIG. 18).

More particularly, collective address generator 498 uses only the least significant bits of the x, y address which are necessary to identify an address location. For example, in the embodiments discussed above, the dither template memory is an 8×8 array, which therefore requires 3 bits for column addressing, and 3 bits for row addressing. In such a configuration, collective address generator 498 would use only the 3 least significant bits of the x address value coming from an input device, such as input device 22 shown on FIG. 1, and the 3 least significant bits of the y address value coming from the input device. In other implementations in which the dither template memory has a different size, that size would correspondingly determine the number of least significant bits of the x, y address used by collective address generator 498.

Collective address generator 498 bundles the necessary least significant bits of the x, y address together with the actual input level at that address, IL<x,y>, to produce a collective address which is then transmitted to single LUT 491 (Step 534, FIG. 18). Given that LUT generator 480, address/level generator 490, and SMTVD 481 would have collectively generated and computed output levels for all possible combinations of x, y addresses and input levels, and stored those values in single LUT 491, the address output by collective address generator 498 need only access the particular address in single LUT 491 to have it output the OL<x,y> which corresponds to IL<x,y> (Step 536, FIG. 18).

Using one implementation as an example, if the least significant bits of the x and y address are respectively 010 and 101, and IL<x,y> is 00001111, collective address generator 498 will access address 01010100001111 in single LUT 491. In addition, the storage of values in single LUT 491 will be such that at that particular address location will be the OL value computed by SMTVD 281 when address level generator 490 had transmitted to it the values: x'= 010, y'=101, and IL =00001111.

Comparing the single memory implementation to the two memory implementation discussed above, the single memory system can operate faster than the two memory system. During real time operation, SMRTS 497, shown on FIG. 15, requires only the generation of a collective address by collective address generator 498, which then operates as an address to single LUT 491. That address causes single LUT 491 to then output OL<x,y>. With respect to the two memory device implementation, during real time operation TMRTS 81, shown on FIG. 6, requires the generation of the modified address, through address modifier 87. That address accesses dither template memory 82, which in turn outputs d<x',y'> to adder 85. Adder 85 adds d<x',y'> to IL<x,y> to generate the sum, S, which accesses a memory location in quantizer LUT 86, which finally outputs OL<x,y>. Accordingly, the generation of OL<x,y> values during real time operations involves more steps, and therefore takes longer, for the two memory implementation, shown on FIG. 6, than for the single memory implementation, shown on FIG. 15.

On the other hand, the single memory implementation requires considerably more memory than the two memory implementation. For example, if in the single memory implementation, shown in FIG. 15, the x value required 3 bits of data, y required 3 bits, IL<x,y> required 8 bits, and 4 bits of data are required for the number of output levels, the memory required for single LUT 491 would be $2^{14} \times 4$ bits=65536 bits total. Assuming the same parameters for the two memory implementation, shown in FIG. 6, dither template memory 82 would require $2^6 \times 8$ bits and quantizer LUT 86 would require $2^9 \times 4$ bits, for a total of 2560 bits.

Thus, for the values of the example discussed above, the memory requirements for the two memory implementation are approximately 25 times smaller than the memory requirements for the single memory implementation; however, the two memory implementation is slower than the single memory version.

E. Multilevel Dithering System with Bit Shifter.

Thus far the embodiments of the multi-level image processing systems and techniques of the present invention have been premised upon the understanding that the input device could have any number of input levels. In such embodiments, the number of input levels are a fixed parameter given to the image processor by the imaging system, and that information, along with other information, is processed by the image processor to determine the output levels.

In yet another embodiment of the image processor, it is possible to use a bit shifter in place of the quantizer LUT. The embodiment is based on having the average number of unique "S" values which can be produced by an adder, such as adder 85 shown in FIG. 6, and which 'map to' a single output level, as the meaning of the term 'map to' is hereinbelow refined, equal to an integer power of two.

Referring momentarily back to the discussion surrounding Equation V, there it was determined that the average number of unique S values which can be produced by adder 85 and which map to a single, given output level could be determined by computing the average number of unique S values that address the same output level stored in quantizer LUT 86.

In the bit shifter implementation there is no quantizer LUT; however, there is a bit shifter which operates in place of the quantizer LUT. As will be detailed below, the output of the bit shifter is the output level produced by the. image processor. Accordingly, in the bit shifter embodiment a unique S value is considered to map to a single, given output level if, after that S value is produced by the adder and processed by the bit shifter, the resulting value of S is equal to the given output level.

For example, assume a given bit shifter is programmed to shift incoming binary data four bits to the right. The results of that bit shifter processing five S values are shown in Table D.

TABLE D

| S value | Shifted S value |
|---------|-----------------|
| 00110101 | 0011 |
| 00111111 | 0011 |
| 00110000 | 0011 |
| 11000101 | 1100 |
| 11001111 | 1100 |

In this particular example, three of the unique S values would be considered to map to the output level 0011 because their resulting value, after processing by the bit shifter, is equal to the given output level, 0011. On the other hand, two of the unique S values would be considered to map to the output level 1100 because their resulting value is equal to output level 1100.

As discussed in connection with the embodiment of the invention shown in FIG. 6, in order to determine what the average number of unique S values that map to a given, unique output level are, it is necessary to determine the finite numbers of possible addends to be added by the adder, and compute all of the possible S values. After the total number of possible, unique S values are determined, they must be processed by the bit shifter to determine the number of S values that map to a given output level. Therefore, in the bit shifter implementation, $\Delta_Q$ is understood to represent the average value of the number of unique S values that map to a single, given, output level, if all possible S values were produced by an adder and shifted by the bit shifter.

Accordingly, the term map to in the context of the bit shifter implementation is somewhat refined relative to the other specific embodiments discussed above.

Recalling that $\Delta_Q$ is defined as being equal to the average number of unique S values which can be produced by the adder and which map to a single, given output level and further recalling that the average number of unique S values which can be produced by the adder and which map to a single, given output level is equal to an integer power of two, these two features of the bit shifter implementation can be summarized in the expression:

$\Delta_Q = 2^R$, where R is the number of bits the bit shifter shifts to the right. (Equation X).

In light of Equation X, in particular embodiments of the bit shifter implementation, the bit shifter may have to have the freedom to assign the range of input levels which will be transmitted to the image processor by other components within the imaging system, such as input device 22 shown in FIG. 1.

It should be noted that although most imaging systems are designed so that the number of input levels are fixed, in the case of some imaging systems that generate synthetic graphics, the number of input levels can be set to any number. In addition, even conventional imaging systems which have a fixed number of input levels can be made to have any number of assignable levels through the implementation of an image adjustment system. As will be detailed below in the section heading "Image Adjustment System", an image adjustment system can translate any number of raw input levels to a greater or lesser number of adjusted input levels, as needed.

Before proceeding with the more detailed discussion of the bit shifter embodiment, it should be noted that if in a given imaging system Equation X can be satisfied, possibly through the implementation of an image adjustment system, then a bit shifter can substitute in place of quantizer LUT 86, shown on FIG. 6. This is because it has been found that if quantizer LUT 86 is segmented so that the number of unique S values that map to each output level is equal to a power of 2 (ie. $2^R$), then an equivalent way to achieve quantization is by shifting each given S value R bits to the right. This shifting will produce the appropriate output level value. Thus, if the system has the capabilities discussed above, the bit shifter embodiment simplifies the overall system, especially if implemented in hardware.

Referring momentarily back to FIG. 1, the objective of the bit shifter implementation is the same as the previous implementations of the image processing technique. Namely, in FIG. 1 during operation input device 22 will transfer to IP 40 the input level occurring at a given input cell, IL<x,y>, and IP 40 will translate that input level to a corresponding output level occurring at a given output cell OL<x,y>. That output level is then transmitted to an output device 30.

Figure 19:
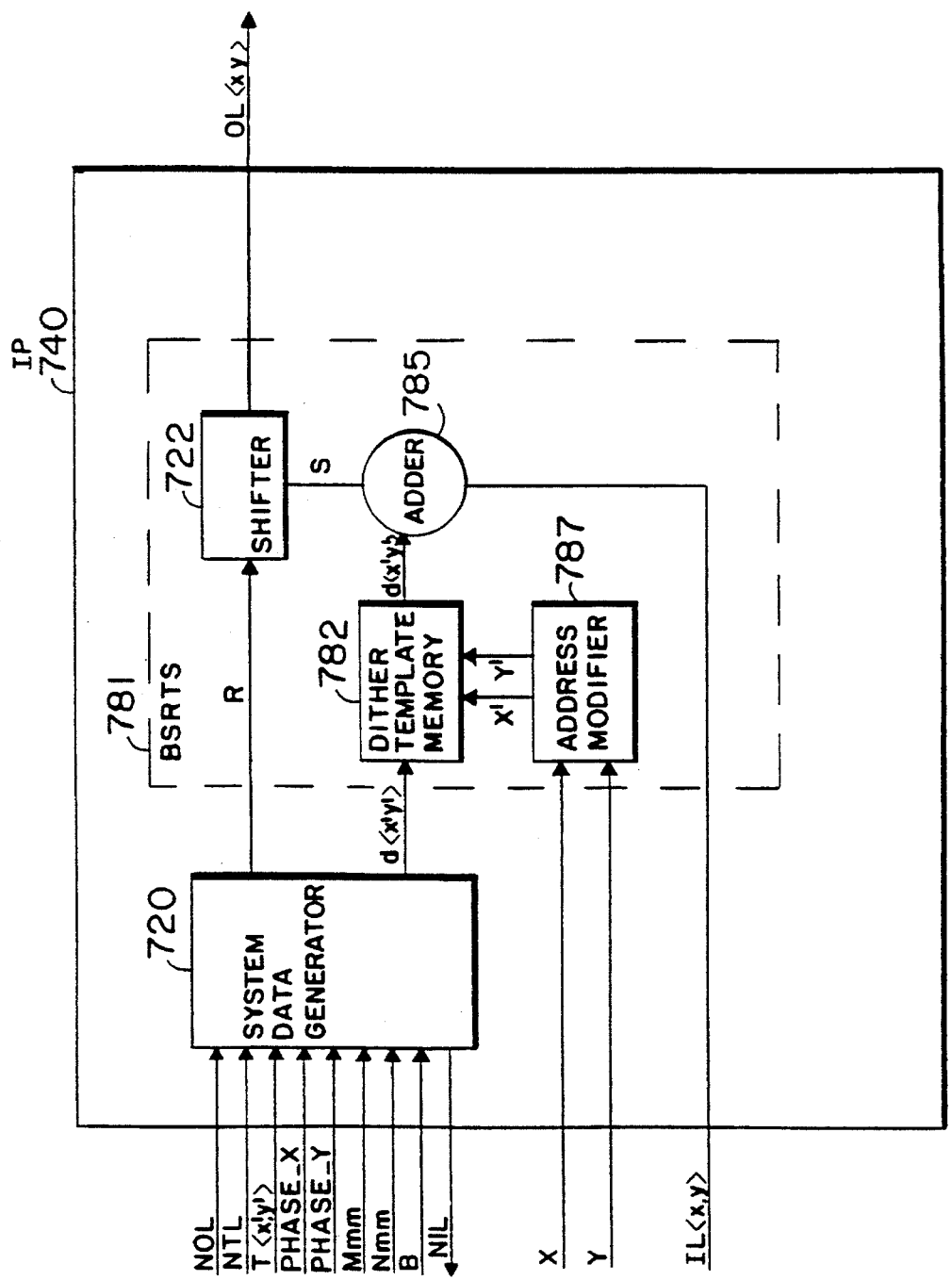
FIG. 19 is a block diagram of still another alternate embodiment of an image processor, in accordance with the present invention, including a system data generator and a bit shifter run time system (BSRTS).
Figure 20:
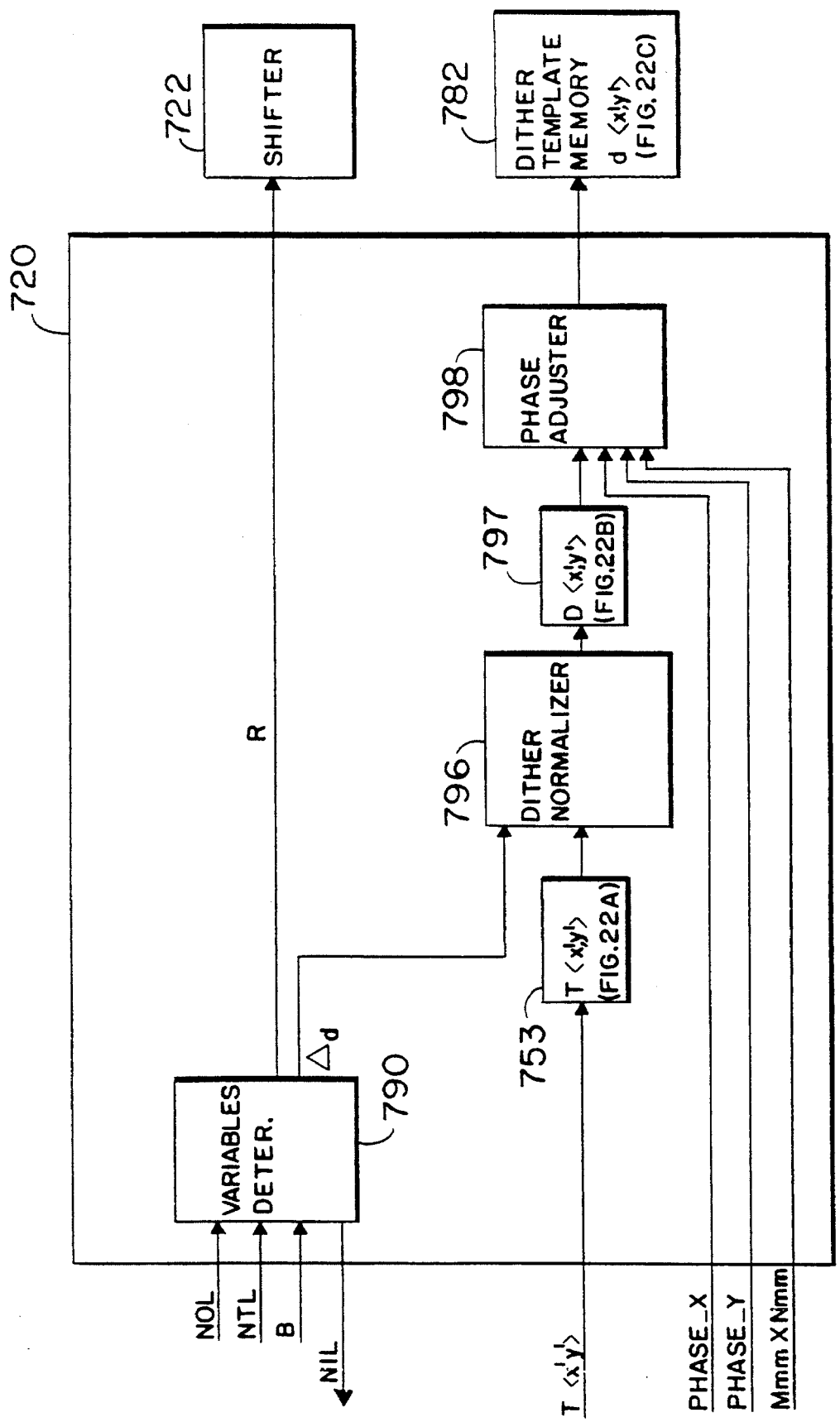
FIG. 20 is a block diagram of the system data generator shown on FIG. 19 coupled to a shifter and a dither template memory.

Now referring to FIG. 19, an alternative IP 740 is shown which could be substituted in place of IP 40 shown in FIG. 1. IP 740 includes a system data generator 720 and bit shifter run time system 781 (BSRTS), which is shown in dashed lines. As in previous embodiments of the present invention, in those instances in which there is a correlation between the reference numbers of block elements in FIGS. 19 and 20, and previously described embodiments of the invention, the reference numbers will correlate except that the reference numbers in FIGS. 19 and 20 are in the 700's. One notable difference is that the quantizer LUT 86 of FIG. 6 has been replaced with shifter 722 in FIG. 19.

BSRTS 781 includes a dither template memory 782, which is initialized with values d<x',y'> by data system generator 720. In addition, data system generator 720 also furnishes a signal "R" to shifter 722, in which R corresponds to the number of bits that numbers transmitted to shifter 722 should be shifted. In this particular embodiment, shifter 722 will shifter data R bits to the right.

BSRTS 781 further includes an address modifier circuit 787, which is used to convert addresses x,y of an input cell 26 of input device 22, shown on FIG. 1, to addresses x',y' which are applied as an address to access the values stored in dither template memory 782. The output of dither template memory 782, d<x',y'>, are fed to an adder 785. Adder 785 is also fed an input level, IL<x,y>, for the given input cell 26, and the two values are added by adder 785 to produce a sum value, S. In this particular implementation, S is then processed by shifter 785, in particular, the number S is shifted R bits to the right. The bit shifted number is then output by shifter 722 as the output level OL<x,y> which corresponds to IL<x,y>. As in prior implementations, OL<x,y> is fed to the output device 30 of FIG. 1.

In this embodiment, system data generator 720 determines the d<x',y'> values which are stored in the dither template memory 782, and the values of R and NIL. Data system generator 720 does not need to run at any particular speed since it computes these values before imaging system 20 starts translating input pixels to output pixels during real time operation. Thus, after data system generator 720 determines and stores these values, it will resume activity only if some of the imaging system 20 parameters change.

BSRTS 781 is the portion of IP 740 which operates in real time, and during operation it is constantly receiving input values, IL<x,y>, from input array 24, shown in FIG. 1, and processing them into corresponding output values, OL<x,y>, in output array 34.

IP 740, and in particular, data system generator 720 is fed by signals corresponding to: the number of output levels, NOL; the number of dither template levels, NTL; the dither template order, T<x',y'>; phase_x and phase_y values; the dimensions of the dither template memory, $M_{mm} \times N_{mm}$; and the number of bits of the input level, B. Address modifier 787 is fed the x and y address values for a given input cell, x,y, and adder 785 is fed the actual input level of the given input cell at the x, y address, IL<x,y>.

It should be noted that unlike prior implementations, in this embodiment IP 740 is not fed a signal which corresponds to the number of input levels, NIL, of the input device. Instead, data system generator 720 uses the inputs provided to it to compute the NIL, which is fed back to input device 20 of FIG. 1. With the assignment of NIL by IP 740, input device 20 will then transmit the correct range of input levels to IP 740 during real time operation.

Although it may appear initially that there are no system parameters affecting the number of input levels which the data system generator 720 may assign, in fact the number of bits, B, of the input level does force a type of limitation. More particularly, imaging system 20 of FIG. 1 will assign a number of input levels such that:

$$2^{B-1} < NIL \leq 2^B \qquad \text{(Equation XI)}.$$

Accordingly, IP 740 will assign a number of input levels which, at a minimum, takes advantage of all of the bits allocated for the input levels, but does not exceed the maximum number of levels which can be represented by the given number of bits.

By combining Equation I with Equation X it is seen that:

$$\Delta_Q = 2^R = (NIL-1)/(NOL-1).$$

Using this relationship, and Equation XI, a solution for R is provided by:

$$R = int\{\log_2 (2^B-1)/(NOL-1)\} \qquad \text{(Equation XII)}.$$

Referring now to FIG. 20, data system generator 720 is shown to include a variables determiner circuit 790 which is fed by signals corresponding to NOL, NTL, and B to provide data signals representing: R, the number of bits shifter 722 will shift incoming data to the right's $\Delta_d$, the subdivisions of the quantization levels; Offset, the dimension of the offset at the endpoints of the input levels; and NIL, the number of input levels transmitted to IP 740 by input device 20 of FIG. 1. The variables determiner circuit uses any conventional arithmetic circuit to provided these values by solving the equations discussed below.

System data generator 720 is shown to further use a memory device, which could be the same memory device used for dither template memory 782, for the temporary storage of a suitable dither template. An exemplary template will be discussed in conjunction with FIG. 22A. Dither template values, T<x'y'>, are shown stored on FIG. 20 as reference numeral 753. They are fed to dither normalizer 796 which adjusts the dither template values so that they are made to be symmetrically distributed between 0 and the average value of the number of unique S values that map to a single, given output level, if all possible S values were produced by adder 785 and shifted by shifter 722.

The output from the dither normalizer 796 as stored is shown by reference numeral 797, and these values are fed into phase adjuster circuit 798 along with phase_x, phase_y, and $M_{mm} \times N_{mm}$ signals. Phase adjuster 798 processes the values by spatially shifting the elements within the dither matrix. Thus, the elements of the dither matrix which have a particular location within the matrix prior to phase adjustment, are adjusted to a different location within the dither matrix on the basis of the phase_x and the phase_y values. The resulting values, d<x',y'> are then stored in dither matrix memory 782, shown on FIG. 6.

In order to illustrate how system data generator 720 operates, a simple example will be developed through which actual values will be assigned to the various input signals to see how those values are processed through IP 740. As with previous examples, small numbers are used for the purpose of illustrating the principles underlying the embodiment of this invention. In addition to FIG. 20, FIG. 21 includes a flow diagram, showing the steps of the process, which can be read in conjunction with FIG. 20.

In this example, it will be assumed that the following signals are provided to IP 740 by the imaging system 20 of FIG. 1.

TABLE E

| |
|---|
| NOL = 4 |
| NTL = 4 |
| Element ordering is:  1  2 |
| 3  0 |
| $M_{mm} = 8$ |
| $N_{mm} = 8$ |
| Phase_x = −1 |
| Phase_y = −1 |
| B = 9 |

As shown in FIG. 20 variables determiner 790 receives NOL and B and uses that information to compute R (Step 810, FIG. 21) using Equation XII, above. The signal representing the R value is then forwarded to shifter 722 so that it will be able to shift the numbers forwarded to it by adder 785 by R bits to the right (Step 811, FIG. 21).

In addition to determining R, variables determiner 790 also computes $\Delta_d$ (Step 812, FIG. 21), which is the range of input levels which are covered by a given output level. Variables determiner 790 computes $\Delta_d$ using the equation:

$$\Delta_d = 2^R / NTL \qquad \text{(Equation XIII.)}$$

Figure 21:
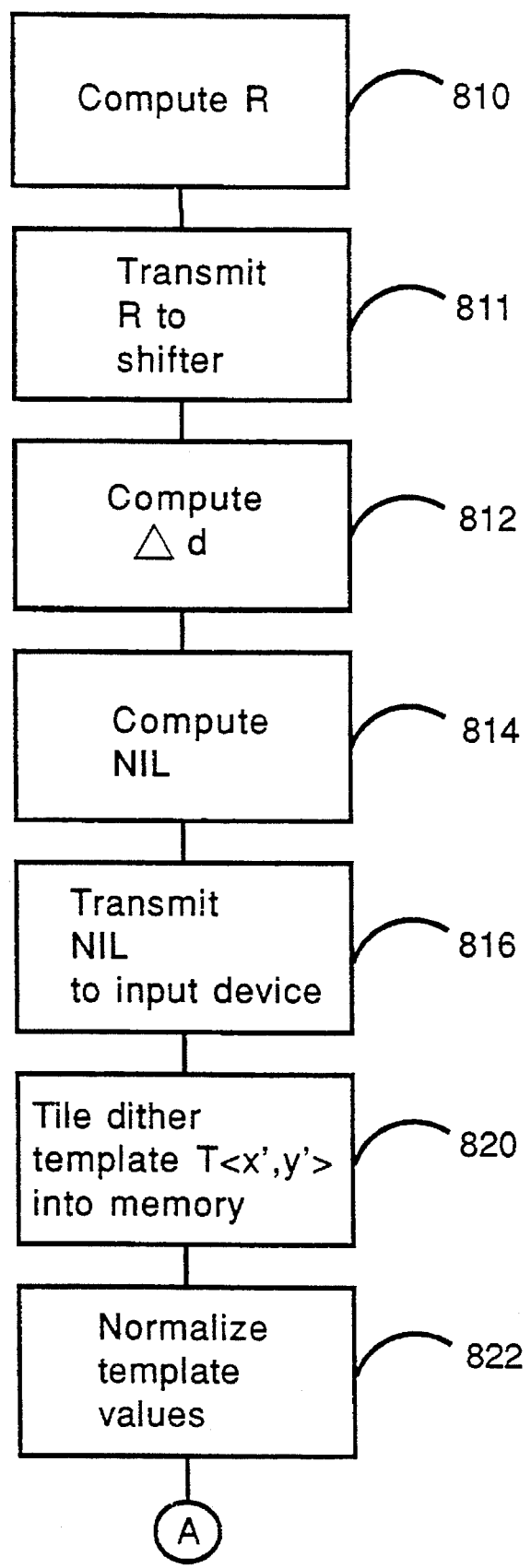
FIG. 21 is flow diagram describing the process by which an R value, an NIL value, and dither template values are produced by the system data generator of FIGS. 19 and 20.
Figure 21:
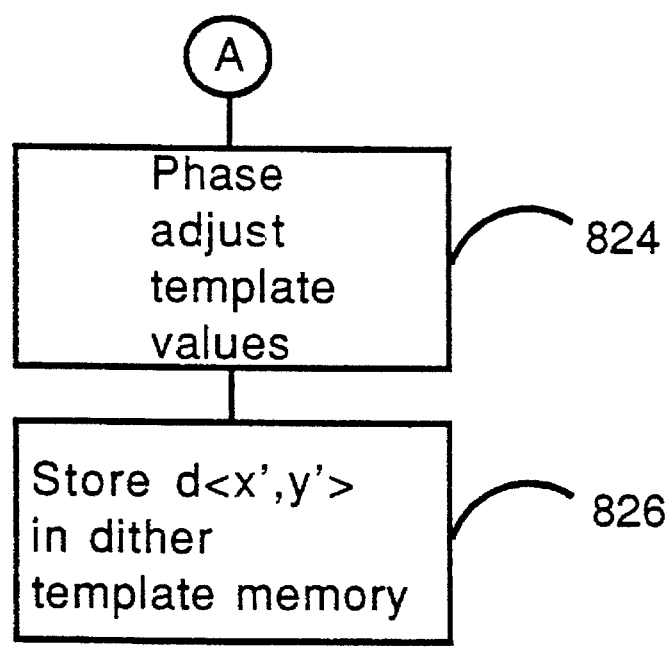

Finally, variables determiner 790 computes the NIL for input device 22 of the imaging system 20 of FIG. 1 (Step 814, FIG. 21). This is accomplished using the equation:

$$NIL = (NOL-1)2^R, \text{ if } \Delta_d > 1, \text{ and} \qquad \text{(Equation XIV.)}$$
$$(NOL-1)2^R + 1, \text{ if } \Delta_d \leq 1.$$

After this computation by variables determiner 790, NIL is transmitted back to input device 22 so that it is able to provide input levels consistent with the limits assigned by IP 740 (Step 816, FIG. 21).

Using the specific values provided in Table D and Equations XII, XIII, and XIV variables determiner 790 would compute the following values:

R=7;

$\Delta_d$=32.00; and

NIL=384, where the input levels range from 0 through 383.

Still referring to FIG. 20, system data generator 720 also receives as an input the dither template, T<x',y'>, which can be expanded to fill the entire dimension of the dither matrix memory 782, in the manner discussed above (Step 820, FIG. 21). FIG. 22A shows the dither template of Table E in its fully expanded form. As shown in FIG. 20, dither template, T<x',y'>, is combined with $\Delta_d$ in dither normalizer 796 to normalize the dither template values by symmetrically distributing the dither template values between 0 and the average value of the number of S values that map to a single, given output level, if all possible S values were produced by adder 785 and shifted by shifter 722. (Step 822, FIG. 21). In this particular embodiment, dither normalizer uses the equation:

$$D<x',y'>=int\{\Delta_d\,(T<x',y'>+1/2)\} \quad\text{(Equation XV.)}$$

The resulting dither template values after they are run through dither normalizer 796 are shown on FIG. 22B.

Finally, in phase adjuster 798 the D<x',y'> values are spatially shifted within the dither template memory, including the wrapping of the right side with the left and the bottom with the top, discussed above (Step 824, FIG. 21). Phase adjuster 798 uses the values for phase_x, phase_y, $M_{mm}$, and $N_{mm}$. At this stage of the technique, there is a two dimensional, spatial shift of the elements within the dither matrix. Thus, the elements of the dither matrix which have a particular location within the matrix prior to phase adjustment, are adjusted to a different location within the dither matrix on the basis of the phase_x and the phase_y values.

In the embodiment shown on FIG. 20, the D<x',y'> values, phase_x, phase_y, $M_{mm}$, and $N_{mm}$ are combined in the following equation for the purpose of outputting d<x',y'>, which is the final value that is stored in dither template memory 782 (Step 826, FIG. 21). The equation is:

$$d<x',y'> = D<(x'+\text{phase}\_x)modulo(M_{mm}),\quad\text{(Equation XVI)}$$
$$(y'+\text{phase}\_y)modulo(N_{mm}).$$

FIG. 223 shows what the values stored in dither template memory 782 would be for the exemplary values of Table E.

Figure 23:
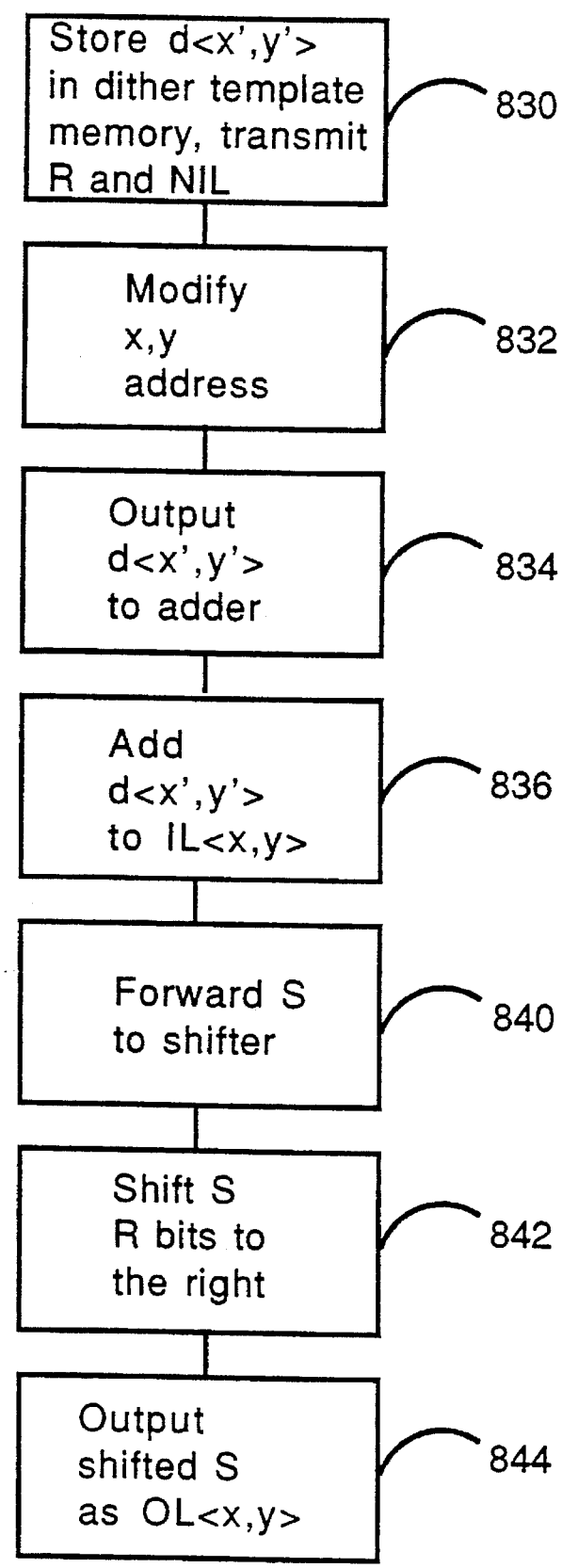
FIG. 23 is a flow diagram describing the process by which input levels are used by the image processor of FIG. 19 to produce corresponding output levels.

With the values for R, NIL, and d<x',y'> having been computed, transmitted, and stored in their respective locations within imaging system 20 (Step 840, FIG. 23), BSRTS 781 is in a position to begin receiving input levels from input device 22, shown in FIG. 1, and translating them to output levels for registration by output device 30 during real time operation. Referring back to FIG. 19, a more detailed explanation of the real time operation of IP 740 can now be provided.

During operation address modifier 787 receives the x,y address of a specific input cell 26 from input device 22, and it adjusts that address to x',y', using Equation VIII, discussed above, to access dither template memory 782 (Step 832, FIG. 23) In response to the x',y' address, dither template memory 782 will output the corresponding d<x',y'> value stored at x', y' to adder 785. (Step 834, FIG. 23). That d<x',y'> value gets added to IL<x,y> by adder 785 (Step 836, FIG. 23), and the resulting sum, S, is forwarded to shifter 722 (Step 840, FIG. 23). As indicated above, shifter 722 will then shift the binary number S, R bits to the right (Step 842, FIG. 23). The resulting shifted binary number is then output by shifter 722 as OL<x,y> (Step 844, FIG. 23). OL<x,y> is then output to output device 30 as the output level, OL<x,y>, which corresponds to the input level, IL<x,y>.

Referring now to FIG. 24, a table is provided which shows the range of input levels for the example discussed in connection with FIGS. 19 through 23. FIG. 24 shows the range of input levels, the total number of inputs, and the perceived output levels achieved by passing every input level from IL=0 to IL=383 in combination with every address from <x,y>=<0,0>to <7,7> through IP 740. As shown on FIG. 24, there are 4 true levels, and 9 intermediate levels which are the effective results of the dithered average. Similar to the discussion in connection with FIG. 11, above, these numerical averages indicate that a person viewing output device 30 would visually average the output patterns and perceive an image level equivalent to the average value indicated.

F. Image Adjustment System

In the embodiments of the imaging system 20 discussed thus far, the image processor, such as IP 40 shown on FIG. 1, receives input levels, IL<x,y>, which are translated into output levels, OL<x,y>. In yet a further embodiment of the imaging system 20 of the present invention, an image adjustment system (IAS) circuit may be used in conjunction with the previously discussed image processors, such as IP's 40, 140, 440 and 740.

The purpose of the IAS is to take the "raw" input levels, RIL<x,y>, of an input device, such as input device 22 shown on FIG. 1, and translate those raw input levels into "adjusted" input levels, simply referred to as IL<x,y>. In this context, the term "raw" refers to the input level which is input into the IAS, and the term "adjusted" refers to the input level output by IAS. Through this approach, an improved output image can be produced by the imaging system 20. Due to the method by which the IAS is implemented, the translation of the raw input levels to adjusted input levels is accomplished very quickly, as will be detailed below.

Additionally, the raw input levels are the levels that are fixed by other parameters of imaging system 20, such as the number of actual input levels produced by input device 22. On the other hand, adjusted input levels are assigned by imaging system 20, and are not dictated by other system parameters. Therefore, the adjusted input levels may be varied by imaging system 20, and the significance of this feature will be further discussed below.

Figure 26:
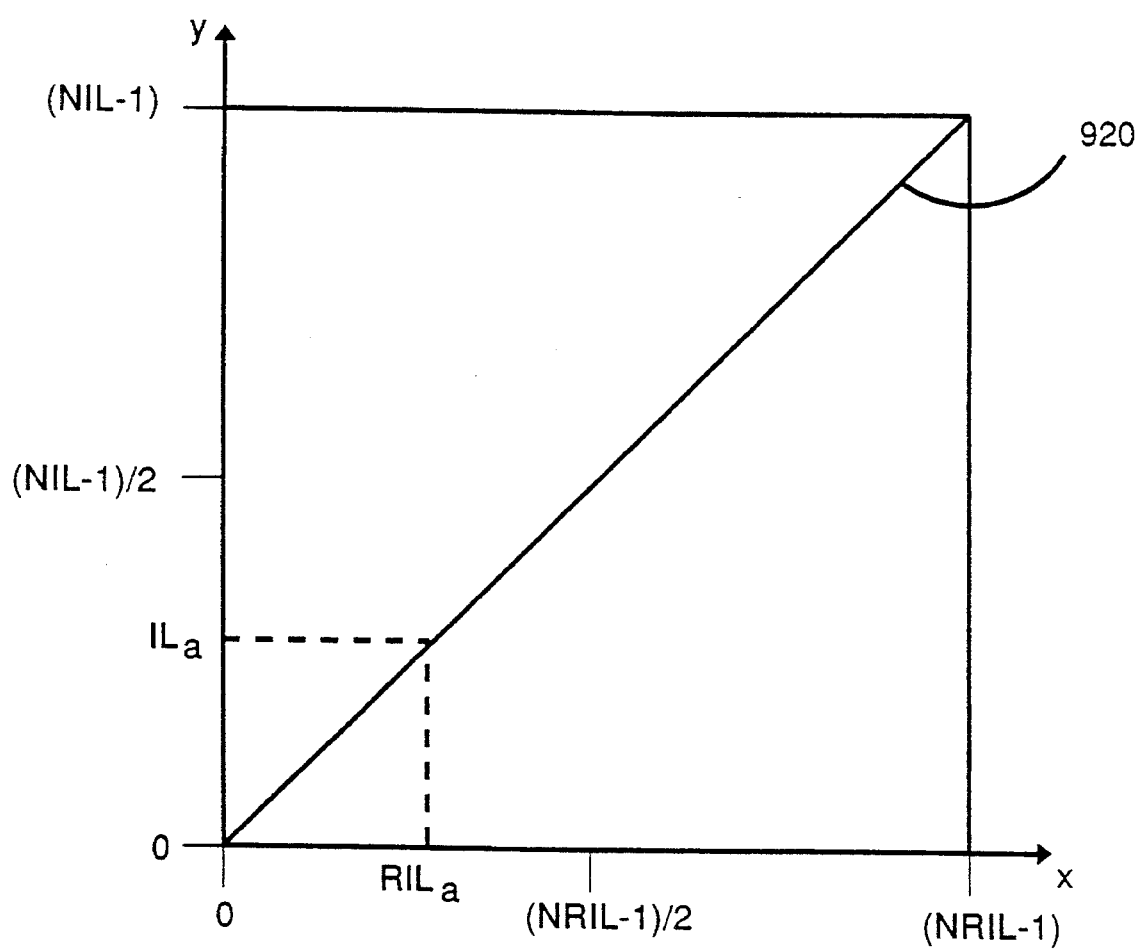
FIG. 26 is a graphical illustration of the adjustment of raw input levels to adjusted input levels by an image adjustment system, showing the identity transform function.

Referring to FIG. 25, which is based on FIG. 1, an imaging system 20 is shown to include an input device 22 coupled to an output device 30 through an IP 40. In FIG. 26, IP 40 includes IAS 1020. IAS 1020 has a number of adjustment interfaces 1021, which, in one embodiment, can be manually adjusted by an operator to refine the output image of output device 30.

For example, interfaces 1021 may be manipulated by a person to affect the way in which IAS 1020 transforms raw input levels to adjusted input levels. Changes in the settings of the user interfaces, would result in changing the output image produced in output device 30, shown on FIG. 25. In addition to the user interfaces, IAS 1020 also receives signal information from other sensors or switches in imaging system 20. Together the information provided through those signals and the signals provided by the user interfaces are used to translate RIL<x,y> values to IL<x,y> values in the manner detailed below.

Before detailing an embodiment of IAS 1020, it is necessary to first generally address the various ways by which IAS 1020 can be used to refine the raw inputs which it receives. This explanation is best provided by beginning with a graphical representation of the way in which IAS 1020 converts raw input levels to adjusted input levels. As will be detailed below, the values that are computed in the IAS 1020 are eventually stored in an adjust LUT. The adjust LUT is structured such that the input to the LUT is an RIL<x,y>, which operates as an address to the LUT. Thus, each RIL<x,y> transmitted to the adjust LUT will result in the outputting of a corresponding IL<x,y> by the adjust LUT.

FIGS. 26–35 provide graphical representations of how an input of RIL<x,y> value, shown on the x-axis, will produce an output of a corresponding IL<x,y> value, shown on the y-axis. In these graphical representations, the correspondence is determined by the positioning of the transform line shown on each of the graphs in the respective figures. Consistent with the conventional method of reading x-y graphs, the transform line determines the exact IL<x,y> value on the y-axis which corresponds to a given RIL<x,y> value on the x-axis. As will be detailed through FIGS. 26–35, changes in the positioning of the transform line have the consequence of changing the mapping of RIL<x,y> values to IL<x,y> values.

For example, FIG. 26 provides a graph in which the x-axis represents a number of raw input levels (NRIL), ranging from 0 to (NRIL-1), and the y-axis represents a number of adjusted input levels (NIL), ranging from 0 to (NIL-1). The x-axis is bisected by (NRIL-1)/2, and the y-axis is likewise bisected by (NIL-1)/2. In this particular illustration, NRIL is equal to NIL.

The graph of FIG. 26 further includes identity transform line 920, which diagonally extends across the graph and, by definition, has a "Steepness" equal to 0. Identity transform line 920 reflects that at the particular setting of the image adjustment system each RIL<x,y> value is translated to an identical IL<x,y> value. For example, $RIL_a$ equals $IL_a$, showing that each raw input level has the exact same value as its corresponding adjusted input level. Thus, this particular setting of transform line 920 defines the identity function, in which each RIL<x,y> value is translated to an identical IL<x,y> value.

Figure 27:
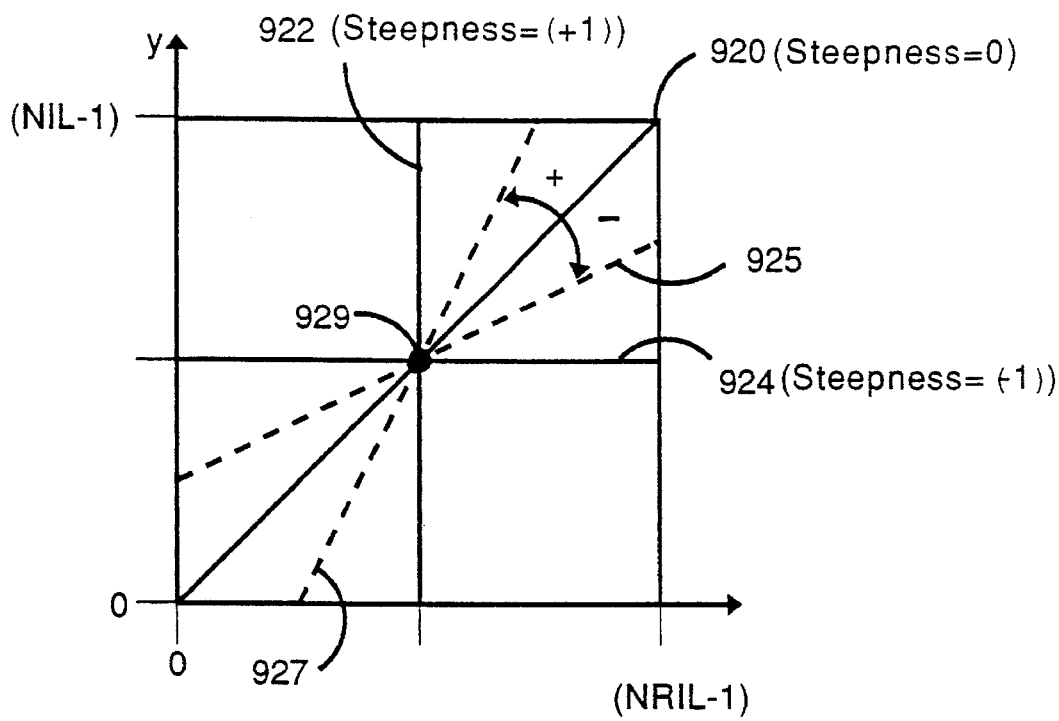
FIG. 27 is a graphical illustration of the adjustment of raw input levels to adjusted input levels by an image adjustment system, showing multiple transform lines for the purpose of defining the variable "Steepness".

Referring now to FIG. 27, a graph similar to FIG. 26 is provided. In addition to identity transform line 920, however, vertical line 922 and horizontal line 924 are provided with vertical line 922 defined as having a Steepness of (+1), and horizontal line 924 having a Steepness of (-1). The dashed transform lines 925, 927 show intermediate positive and negative Steepnesses, with identity transform line 920 being the reference line against which positive and negative Steepness is determined. As shown, the intermediate positions are achieved by pivoting transform line 920 about point 929.

Figure 29A:
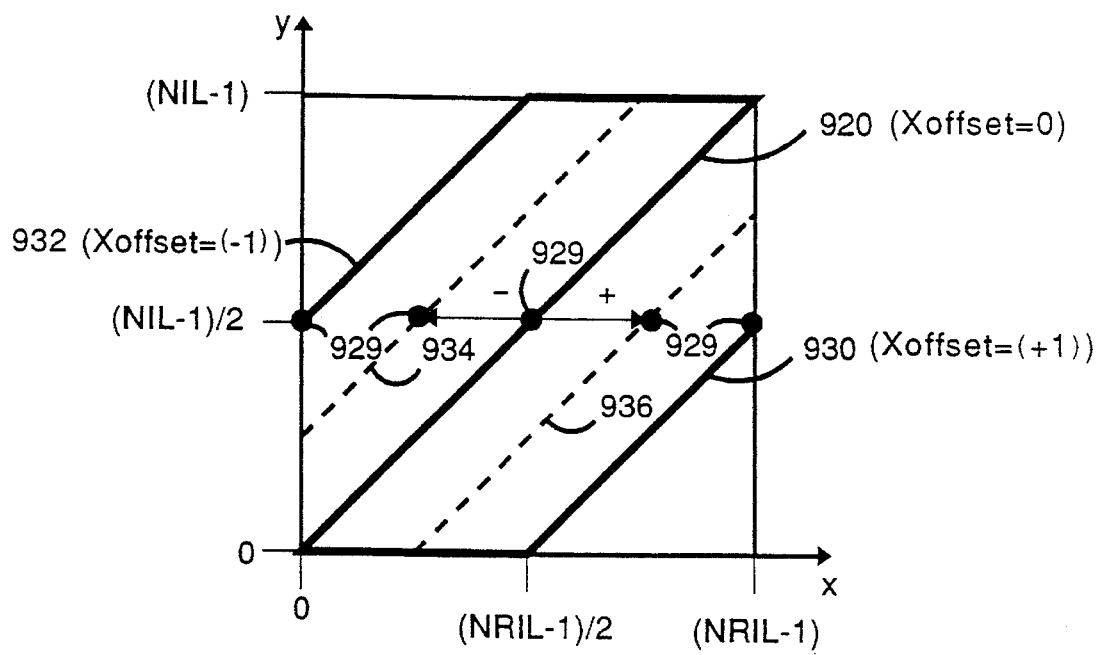
FIG. 29A is a graphical illustration of the adjustment of raw input levels to adjusted input levels by an image adjustment system, showing multiple transform lines for the purpose of defining the variable "Xoffset".
Figure 30A:
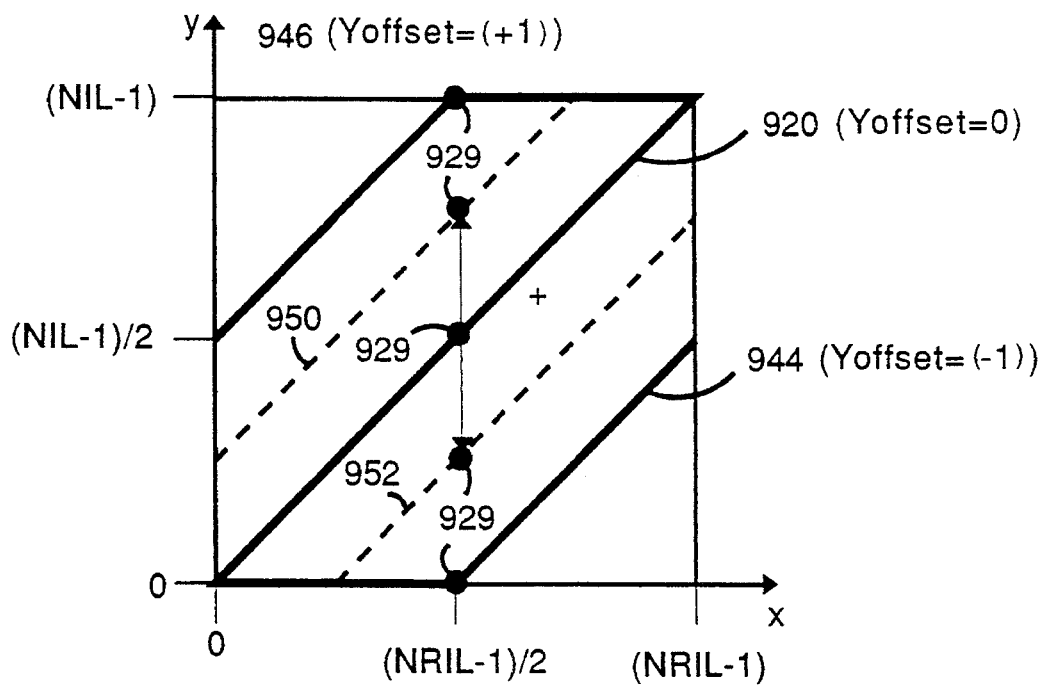
FIG. 30A is a graphical illustration of the adjustment of raw input levels to adjusted input levels by an image adjustment system, showing multiple transform lines for the purpose of defining the variable "Yoffset".

In several of the Figures, such as FIGS. 27, 29A, and 30A, there are a number of transform lines that appear on one single graph. Consequently, from the graph it appears that a given RIL<x,y> value will map to multiple IL<x,y> values. It should be noted that IAS 1020 will assign only one IL<x,y> value to any given RIL<x,y> value. Those graphs on which multiple transform lines are included are not for showing the mapping of a given RIL<x,y> value, but rather for illustrating and defining the properties of the transform line, especially by means of contrasting one line on the graph to another.

Figure 28:
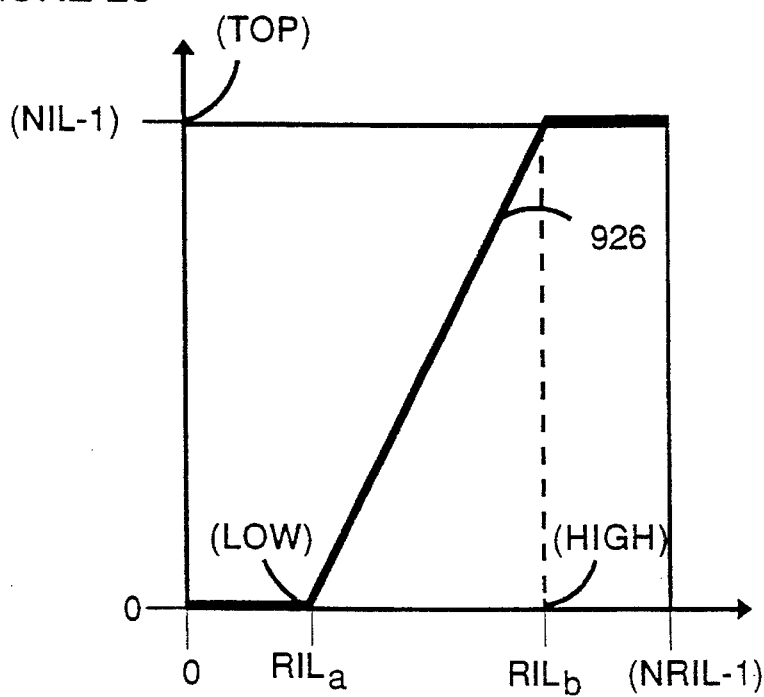
FIG. 28 is a graphical illustration of the adjustment of raw input levels to adjusted input levels by an image adjustment system, showing a particular example of the Steepness variable, as well as defining the variables "Top", "Low" and "High"

FIG. 28 includes a graph which is similar to the graph of FIG. 27; however, FIG. 28 includes transform line 926, alone. As shown, because the Steepness setting is not in the identity position, the RIL<x,y> values are not necessarily mapped to identical IL<x,y> values. For example, on the graph RIL<x,y> values ranging from 0 to $RIL_a$ are all mapped to IL=0. Also, RIL<x,y> values ranging from $RIL_b$ to (NRIL-1) are all mapped to (NIL-1). Consequently, a narrower range of values, namely $RIL_a$ to $RIL_b$, will encompass all of the IL<x,y> values from 0 to (NIL-1). FIG. 28 also graphically shows how the adjustment of the Steepness setting affects the translation of RIL<x,y> values to IL<x,y> values by IAS 1020.

In order to describe the purpose of the Steepness variable, and other variables which are discussed below, reference will be made to a number of different imaging systems which use monochrome or color input or output devices. Before doing so, it should first be noted that in color systems, the color images are made up of a number of components. For example, in a luminance/chrominance color system, such as a YUV system, Y is one of the components, which is used to represent a luminance value. Additionally, there are two chrominance components, namely U and V, which are each used to represent saturation values. Thus, the YUV color system includes three components. In another example, such as a color system in which data is represented in the RGB format, there are likewise three separate components, namely, red (R), green (G), and blue (B). Such color systems which have multiple components will have a separate image adjustment system, such IAS 1020, implemented for each one of the components. Using the YUV as an example, the Y component will have its own IAS 1020, the U component will have its own IAS 1020, and the V component will have its own IAS 1020.

Referring now to more detailed embodiments, if imaging system 20 uses a monochrome input device, the Steepness adjustment of IAS 1020 could be used to alter the contrast of the output image. For example, an input image which has low contrast because the range of all, raw input values is relatively small, may visually appear to be dull or flat. When projected on an output device, the image can be improved by adjusting the Steepness setting so that the small range of raw input levels are expanded to a wider range of adjusted input levels to give the output image a richer, sharper appearance. Thus, in the monochrome input device, the Steepness setting gives a greater or lesser degree of contrast.

On the other hand, in another example, the imaging system may use a color input device which produces data in a luminance/chrominance format, such as the YUV format discussed above. As stated, Y represents a luminance value and U and V each represent chrominance values, and each such component has its own IAS 1020. In such a color system, the Steepness setting of the image adjustment system of Y can be used to determine the contrast of the output image. On the other hand, the Steepness settings of the image adjustment systems of U and V can be used to adjust the saturation of the output image. Although the image adjustment systems for U and V are independent of one another, and therefore may have different Steepness settings, it has been found that a desirable output image is produced from having the Steepnesses of the U and V values set the same.

In still another embodiment of a color system which produces data in the RGB format, the Steepness settings for the image adjustment systems for the three components, R, G, and B, can be used to adjust the contrast of the output image. Again, although the three image adjustment systems may have separate Steepness settings, a desirable output image is produced with all three Steepnesses set the same.

Referring momentarily back to FIG. 28, three additional terms which will be significant in connection with the method by which the IAS 1020 determines the translation of raw input levels to adjusted input levels are defined. In particular, the point at which RIL<x,y> is first mapped to a non-zero number, moving from 0 to (NRIL-1) is defined as "Low". Additionally, the point at which RIL<x,y> is first mapped to (NIL-1), moving from 0 to (NRIL-1) is defined as "High". For ease of reference, (NIL-1) is also referred to as "Top". The significance of these terms will be detailed below.

FIG. 29A includes a graph which is similar to the graph of FIG. 27. FIG. 29A includes identity transform line 920, and includes the positioning of other transform lines on the graph for the purpose of defining "Xoffset". The graph of FIG. 29A shows Xoffset adjustments to the right of identity are defined as positive (+), and Xoffset adjustments to the left of identity are defined as negative (−). As shown, as Xoffset is adjusted the positioning of point 929 moves parallel to the x-axis, but retains a constant y-axis value equal to (NIL−1)/2.

As shown on FIG. 29A, identity transform line 920 is moved parallel to the x-axis to illustrate two, new transform lines 930, 932. When point 929 of transform line 930 has an x-axis value equal to (NRIL−1), transform line 930 is defined to have an Xoffset=(+1). Similarly, when point 929 of transform line 932 has an x-axis value equal to 0, transform line 932 is defined to have Xoffset=(−1). The dashed transform lines 934, 936 show intermediate positive and negative Xoffset positions.

Figure 29B:
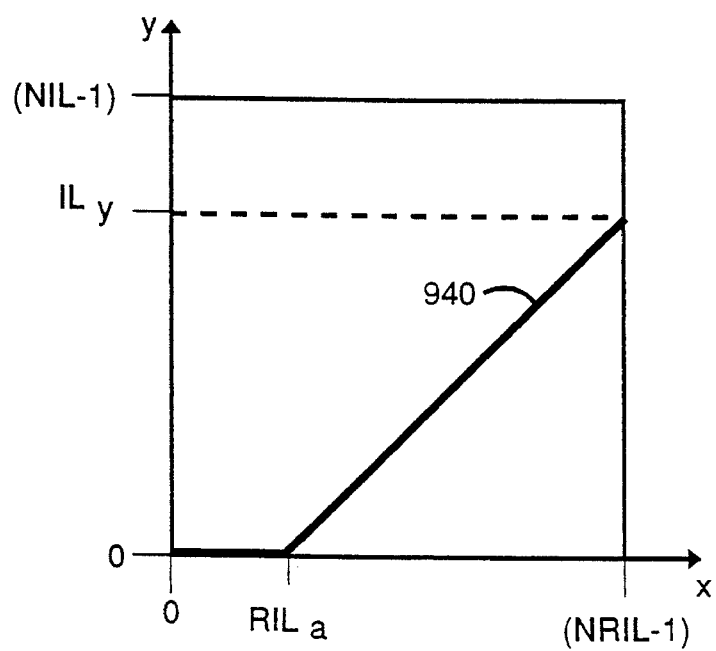
FIG. 29B is a graphical illustration of the adjustment of raw input levels to adjusted input levels by an image adjustment system, showing a particular example of the Xoffset variable.

FIG. 29B includes a graph, which is similar to FIG. 28, showing the single transform line 940. Transform line 940 is the result of adjusting the Xoffset of identity transform line 920, of FIG. 26, in the positive direction. In this instance, the RIL<x,y> values from 0 to $RIL_a$ are mapped to IL=0, while the remaining RIL<x,y> values, from $RIL_a$ to (NRIL−1), are mapped to the values between 0 and $IL_y$. Again, FIG. 29B provides a graphical illustration of how adjustments to Xoffset affect the transformation of RIL<x,y> values to IL<x,y> values.

In an imaging system 20, which uses a monochrome input device 22 for example, the Xoffset is redundant if the image adjustment system has a Yoffset. As will be discussed below, in such a system, the Yoffset is used to adjust the brightness of the monochrome image, and the Xoffset would serve no particular function. Likewise, if imaging system 20 produces data in an RGB format, Xoffset is also superfluous. In such image adjustment systems, a variable which is not needed can be set to zero.

On the other hand, as discussed above, if the input device 22 of imaging system 20 produces data in a luminance/chrominance format, such as the YUV format, then there will be a separate IAS 1020 for Y, U, and V. The Xoffset setting of the image adjustment system for the luminance, or Y value, is superfluous; however, the Xoffset settings of the image adjustment systems for U and V can be used for the purpose of achieving so called "white balance control" of the output image.

As is known in the imaging art, certain input devices are calibrated based on the assumption that the input image recorded under particular lighting conditions. For example, if a given video camera is calibrated for daylight, but is used to record an input image illuminated by an incandescent light, the image may appear too reddish. In a color system, the Xoffset settings of the image adjustment systems of the chrominance components are used to correct such color errors by adjusting the location of point 929 relative to the x-axis. Given that the chrominance components of the raw input levels are transformed on the basis of the location of point 929, Xoffset thereby determines the color translation, and is used to achieve the proper white balance control.

Similar to the foregoing graphs, FIG. 30A shows identity transform line 920, and a number of other transform lines used to define Yoffset. As shown, Yoffset adjustments upward on the graph are defined as positive (+), and Yoffset adjustments downward are defined as negative (−). As shown, as Yoffset is adjusted the positioning of point 929 of identity transform line 920 moves parallel to the y-axis, but retains a constant x-axis value equal to (NRIL−1)/2.

As shown on FIG. 30A, identity transform line 920 is moved parallel to the y-axis to illustrate two, new transform lines 944, 946. When point 929 of transform line 944 has a y-axis value equal to 0, transform line 944 is defined to have a Yoffset=(−1). Similarly, when point 929 of transform line 946 has a y-axis value equal to (NIL−1), transform line 946 is defined to have a Yoffset=(+1). The dashed transform lines 950, 952 show intermediate positive and negative Yoffset positions.

Figure 30B:
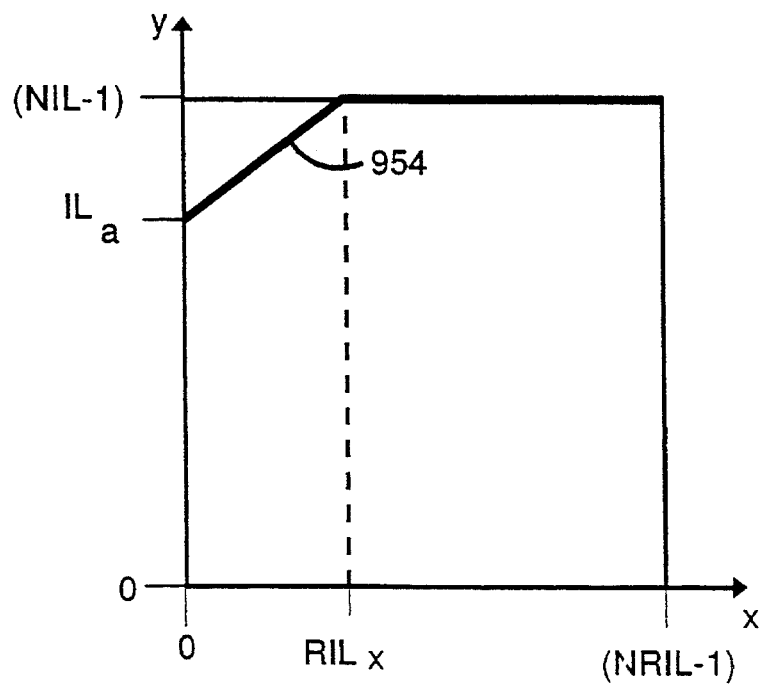
FIG. 30B is a graphical illustration of the adjustment of raw input levels to adjusted input levels by an image adjustment system, showing a particular example of the Yoffset variable.

FIG. 30B includes a graph which is similar to FIGS. 28 and 29B, including the single transform line 954. Transform line 954 is the result of adjusting the Yoffset of identity transform line 920, of FIG. 26, in the positive direction. The RIL<x,y> values on FIG. 30B ranging from 0 to $RIL_x$ are mapped to IL<x,y> values ranging from $IL_a$ to (NIL−1). The remaining RIL<x,y> values, from $RIL_x$ to (NRIL−1), are mapped to (NIL−1). FIG. 30B also provides a graphical illustration of how adjustments to the Yoffset setting affect the transformation of RIL<x,y> values to IL<x, y> values.

In an imaging system 20 having the exemplary monochrome input device, the Yoffset could be used to adjust the brightness. This is because in the monochrome system as point 929 is adjusted along the y-axis, a greater or lesser number of raw input levels are mapped to the lighter or darker adjusted input levels. Thus the brightness of the image may be adjusted by the Yoffset.

On the other hand, if imaging system 20 includes an input device 22 based on the luminance/chrominance color system, the Yoffset settings of the two image adjustment systems for the chrominance components would be superfluous, given that white balance control is achieved by adjusting the Xoffset, as described above. However, the Yoffset of the image adjustment system used for the luminance component can be used to control the brightness of the output image.

Referring again to an imaging system 20 in which color is produced in the RGB data format, the Yoffset settings of the image adjustment systems of each of the three components can be used to adjust the brightness of the output image. Again, a uniform setting for all three is preferred.

One of the features of input device 22 and output device 30 of imaging system 20, shown on FIG. 1, is that they may each have their own respective "sense". By definition, the "sense" of an input or output device is the logical meaning that the given device ascribes to the binary value 0. For example, the given "sense" of a monochrome input device will determine whether that particular input device treats the value 0 as representing the highest or lowest value, such as black or white for example. Likewise, the sense of a bi-tonal or monochrome output device determines whether it treats the value 0 as representing the highest or lowest value. A similar meaning relating to the assignment of values applies to the components of a color system.

Also, in any given imaging system 20 it is not necessarily the case that the sense of the input device is the same as the sense of the output device. In the event that the senses of the input and output devices are not coordinated in a given imaging system, the output images may be projected in the manner opposite to the manner in which they should be projected. Consequently, under such circumstances the output images may look like a photographic negative, for example.

Accordingly, IAS 1020 determines from both the input device 22 and the output device 30 what their respective senses are. In response, IAS 1020 will then determine whether it needs to reverse the sense of the input device, thereby activating a "ReverseIn" operation. IAS 1020 will also determine whether it needs to reverse the sense of the output device, thereby activating a "ReverseOut" operation.

It should be noted that the transform line modifiers discussed up to this point—Steepness, Xoffset, Yoffset—are modifiers which are manipulated through user interfaces, such as interfaces 1021 shown on FIG. 25. ReverseIn and ReverseOut, on the other hand, are responsive to instruction signals provided by components within imaging system 20, such as input device 22 or output device 30. Additionally, these signals could be provided in a file header of the data being processed by imaging system 20. ReverseIn and ReverseOut can only have one of two states, those being either an asserted (on) or de-asserted (off) state. As discussed, whether the state is asserted or de-asserted is determined on the basis of the sense of input device 22 or output device 30.

Figure 31:
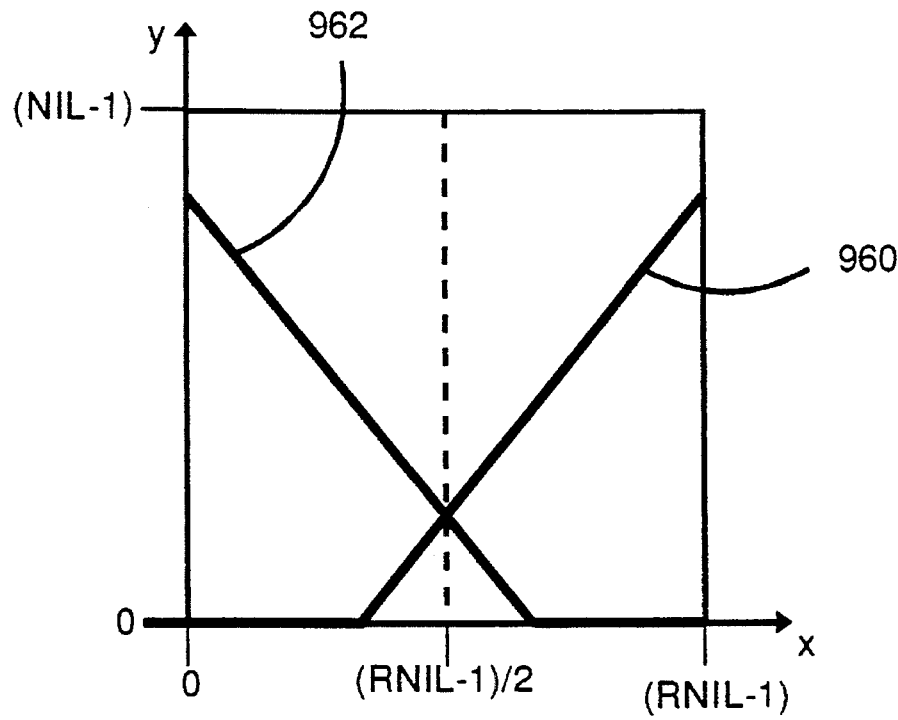
FIG. 31 is a graphical illustration of the adjustment of raw input levels to adjusted input levels by an image adjustment system, showing two transform lines for the purpose of defining the variable "ReverseIn".

Referring now to FIG. 31, the effect ReverseIn has on transforming RIL<x,y> values to IL<x,y> values is graphically shown. Transform line 960 first defines a given transform expression for mapping RIL<x,y> to IL<x,y>. FIG. 31 shows a dashed, vertical line 962 running through (NRIL−1)/2. By definition, when "ReverseIn" is asserted, transform line 960 is effectively rotated 180 degrees about vertical line 962. In this manner the sense of the data from input device 22 is reversed by the assertion of ReverseIn. In other words, through the switching of ReverseIn the binary values of the data forming the input image is reversed such that 0 becomes 1 and 1 becomes 0.

Figure 32:
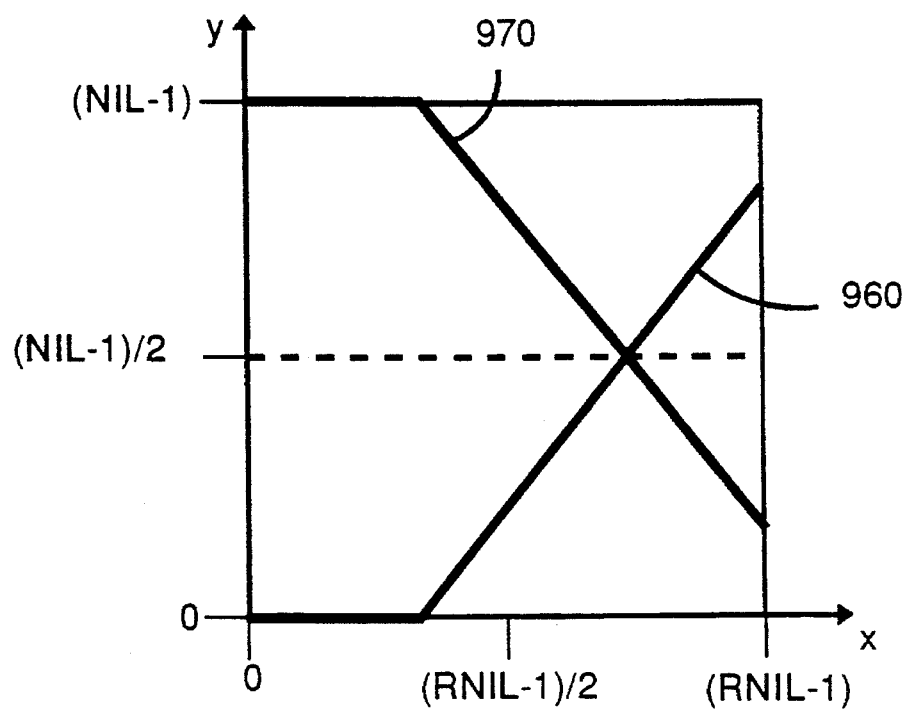
FIG. 32 is a graphical illustration of the adjustment of raw input levels to adjusted input levels by an image adjustment system, showing two transform lines for the purpose of defining the variable "ReverseOut".

A similar function is shown in FIG. 32, in which the effects of ReverseOut on transforming RIL<x,y> values to IL<x,y> values is graphically shown. In FIG. 32, transform line 960 defines the same transform expression as shown in FIG. 31 for mapping RIL<x,y> to IL<x,y>. FIG. 32 shows a dashed, horizontal line 970 running through (NIL−1)/2. By definition, when "ReverseOut" is asserted, transform line 960 is effectively rotated 180 degrees about horizontal line 970. In this manner the sense of the data of output device 30 is reversed by the assertion of ReverseOut. Similar to the effect of the ReverseIn function, through the switching of ReverseOut the binary values of the data forming the output image is reversed such that 0 becomes 1 and 1 becomes 0.

In certain imaging systems 20, it may be necessary to alter the representation of signed raw input levels to provide adjusted input levels. For example, FIG. 33 provides two methods by which signed information may be represented. In many YUV color systems, for example, the chrominance component of the image, namely the U and V information, is presented in a twos complement format. On FIG. 33, next to the twos complement representation of a given number is the binary code designation, with the unsigned representation and the sign shifted representation of the number shown beside the corresponding binary code. In the event that the representation of the RIL<x,y> value needs to be changed to provide IL<x,y>, IAS 1020 includes a sign conversion function, which is operated by "Sign Shift".

Similar to the ReverseIn and ReverseOut functions discussed above, Sign Shift is either asserted or de-asserted. Also like ReverseIn and ReverseOut, Sign Shift is not determined by a user interface, but rather is determined by an instruction signal provided by other components within imaging system 20, or by a signal provided in the file header of the data that is being processed by the system.

Figure 34:
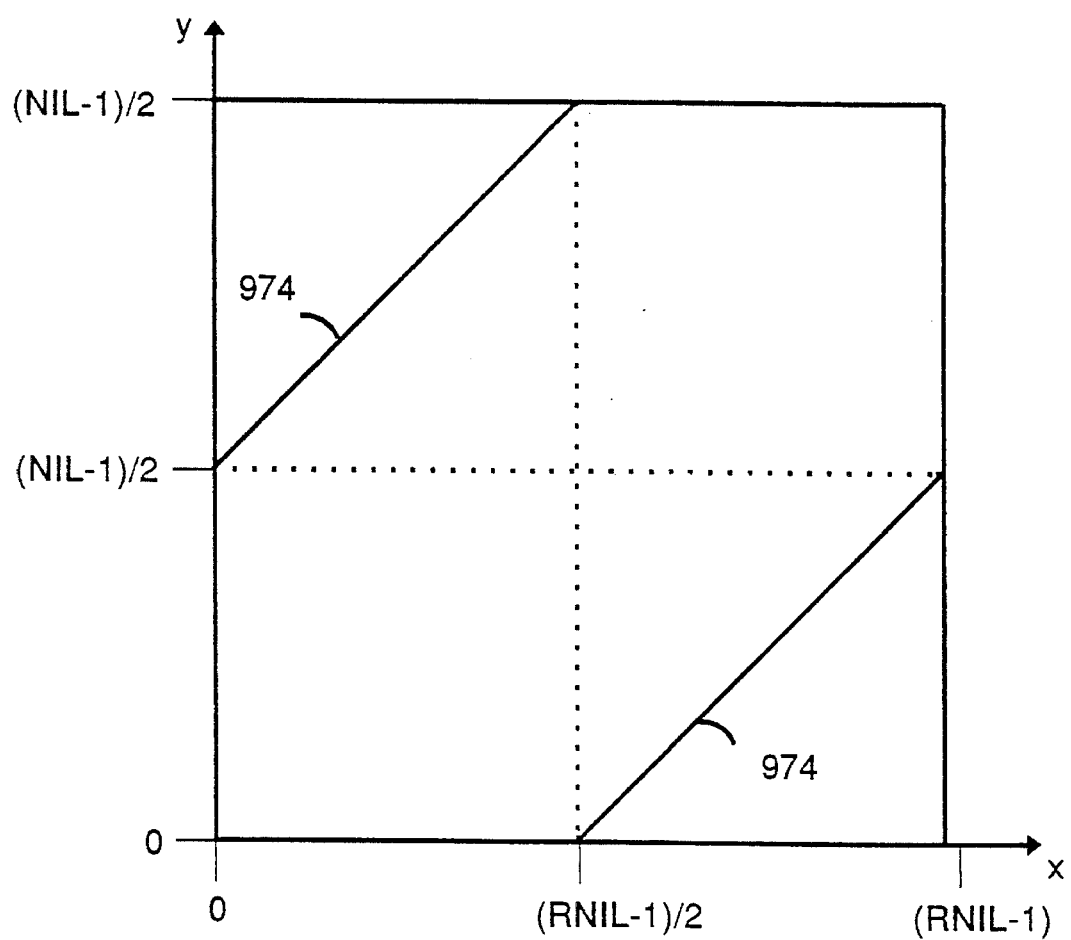
FIG. 34 is a graphical illustration of the adjustment of raw input levels to adjusted input levels by an image adjustment system, showing a transform line for defining the variable "Sign Shift".

FIG. 34 provides a graphical representation of the manner by which Sign Shift transforms RIL<x,y> values to IL<x,y> values. More particularly, line 974 of FIG. 34 shows the effects of applying the Sign Shift function to the identity transform line 920 shown on FIG. 26. Thus, with respect to the identity transform line 920, the Sign Shift function serves to map the RIL<x,y> values from 0 to (NRIL−1)/2 to IL<x,y> values from (NIL−1)/2 to (NIL−1). Additionally, RIL<x,y> values from (NRIL−1)/2 to (RNIL−1) are mapped to IL<x,y> values from 0 to (NIL−1).

Figure 35:
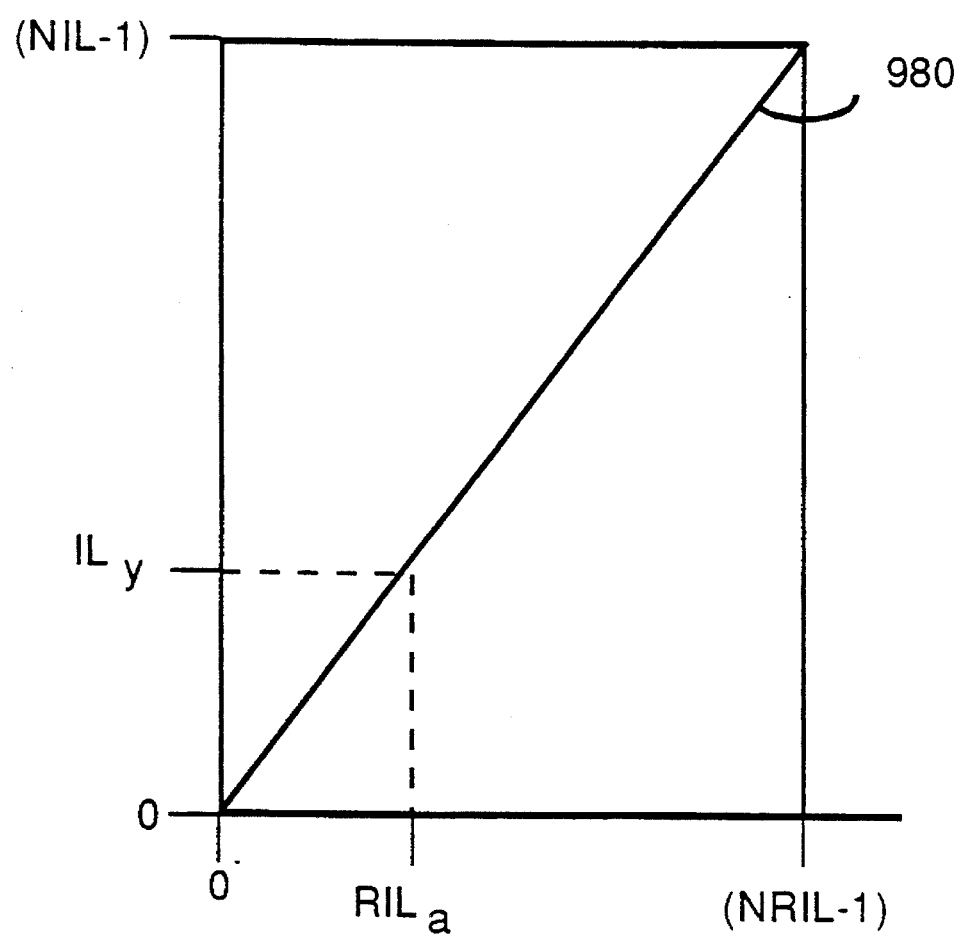
FIG. 35 is a graphical illustration of the adjustment of raw input levels to adjusted input levels by an image adjustment system, showing a transform line which illustrates the adjustment of a given number of raw input levels to a lesser number of adjusted input levels.

Finally, with respect to the translation of raw input levels to adjusted input levels, FIG. 35 shows the method by which a lesser number of raw input levels are mapped to a greater number of adjusted input levels. Unlike the transform function which was illustrated in FIG. 26 in which NRIL is equal to NIL, in FIG. 35, NRIL is less than NIL. The diagonal established by transform line 980 shows an identity-like translation of the raw input levels to adjusted input levels. Even though there are fewer raw input levels than adjusted input levels, FIG. 35 shows how the raw input levels would be mapped to a given adjusted input level.

For example, on FIG. 35 $RIL_a$ maps to $IL_y$, indicating that the raw input level does not necessarily map to an identical adjusted input level. This mapping is accomplished in IAS 1020 by means of further adjusting the transformation line by increasing or decreasing the range of adjusted input levels. As discussed above, although NRIL is a fixed system parameter, NIL is variable, and can be assigned by imaging system 20 to IAS 1020. To the extent that the value of NIL is assignable by imaging system 1020, IAS 1020 can be used to transform a greater number of raw input levels to a lesser number of adjusted input levels, or a lesser number of raw input levels to a greater number of adjusted input levels.

Also, the discussion of the bit shifter implementation, shown in FIGS. 19 and 20 above, was is based on the understanding that IP 740 could assign the range of input levels it would receive for processing. For those systems that do not have that inherent capability, it was indicated that an imaging system with a given, fixed number of input levels could have that number of input levels adjusted by means of image adjustment system.

Figure 40A:
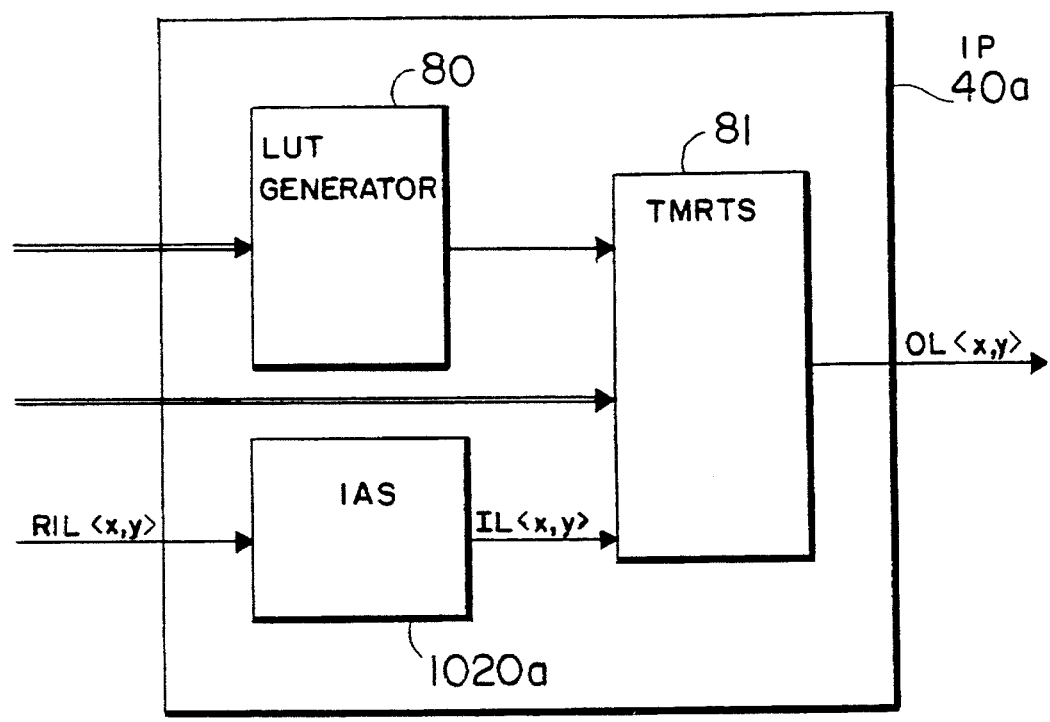
FIGS. 40A–40D are alternate embodiments of the image processors shown in FIGS. 6, 12, 15 and 19, respectively, each such image processor including an image adjustment system in accordance with the present invention.
Figure 40B:
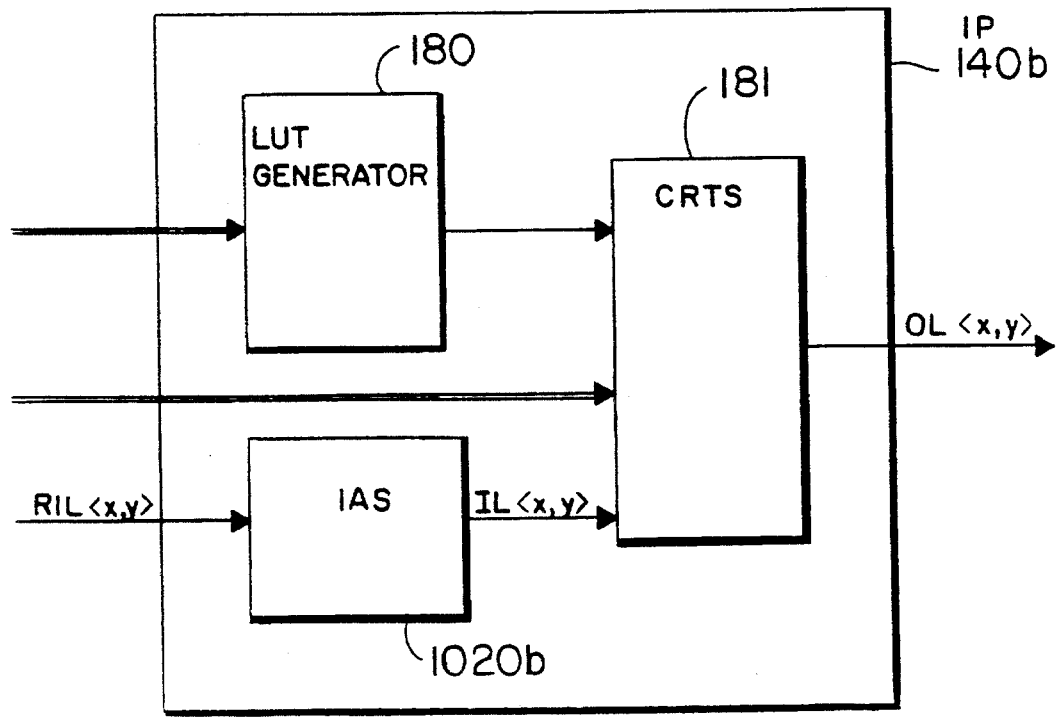
Figure 40C:
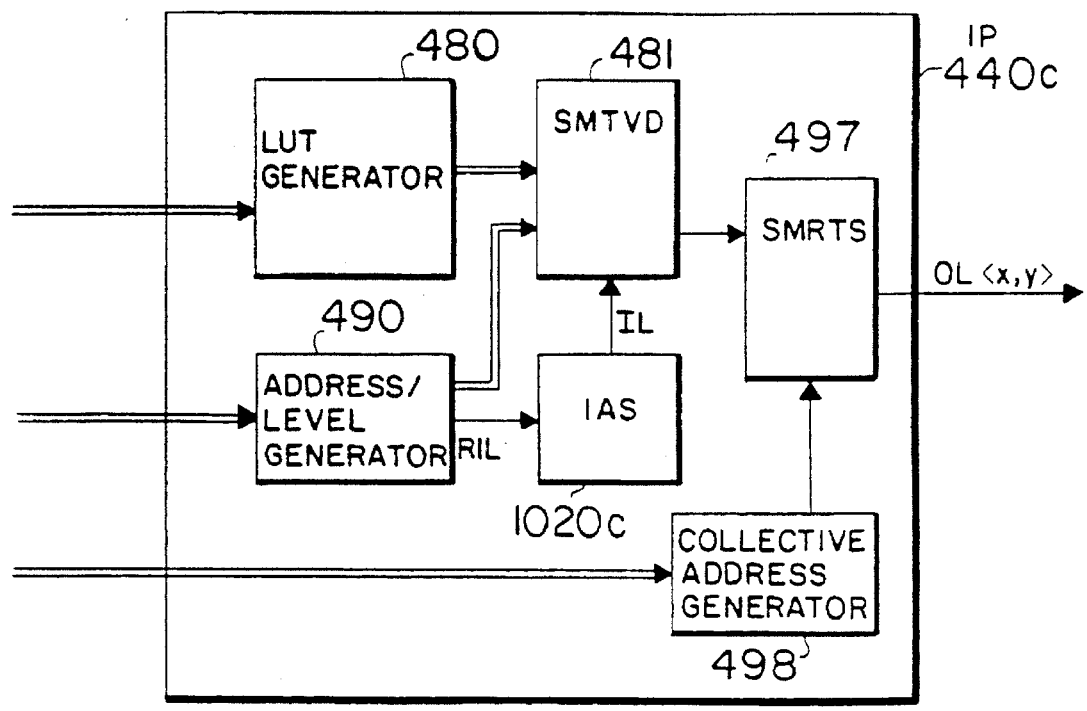
Figure 40D:
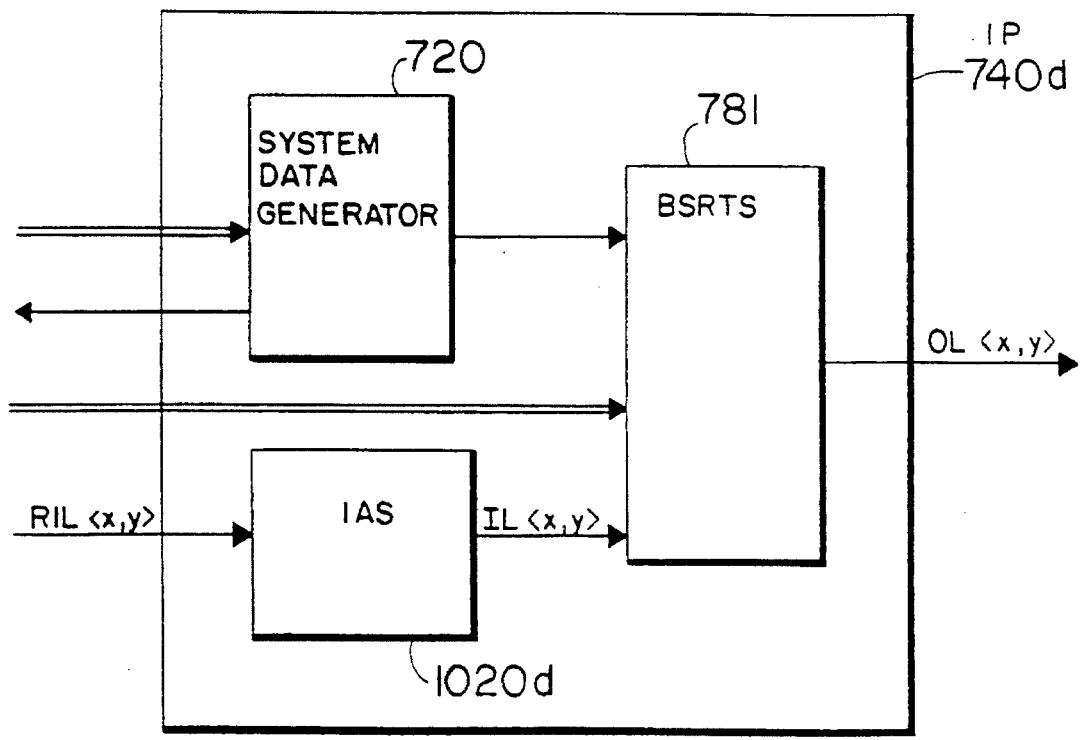

As discussed in connection with FIG. 35, IAS 1020 can be used to translate a given number of raw input levels to either a greater or lesser number of adjusted input levels. Accordingly, IP 740 of FIG. 19 could be coupled to IAS 1020 in the manner shown in FIG. 40D, so that when IP 740 determines the NIL, IAS 1020 will insure that only input levels falling within the assigned range are sent to IP 740 for processing.

Figure 36:
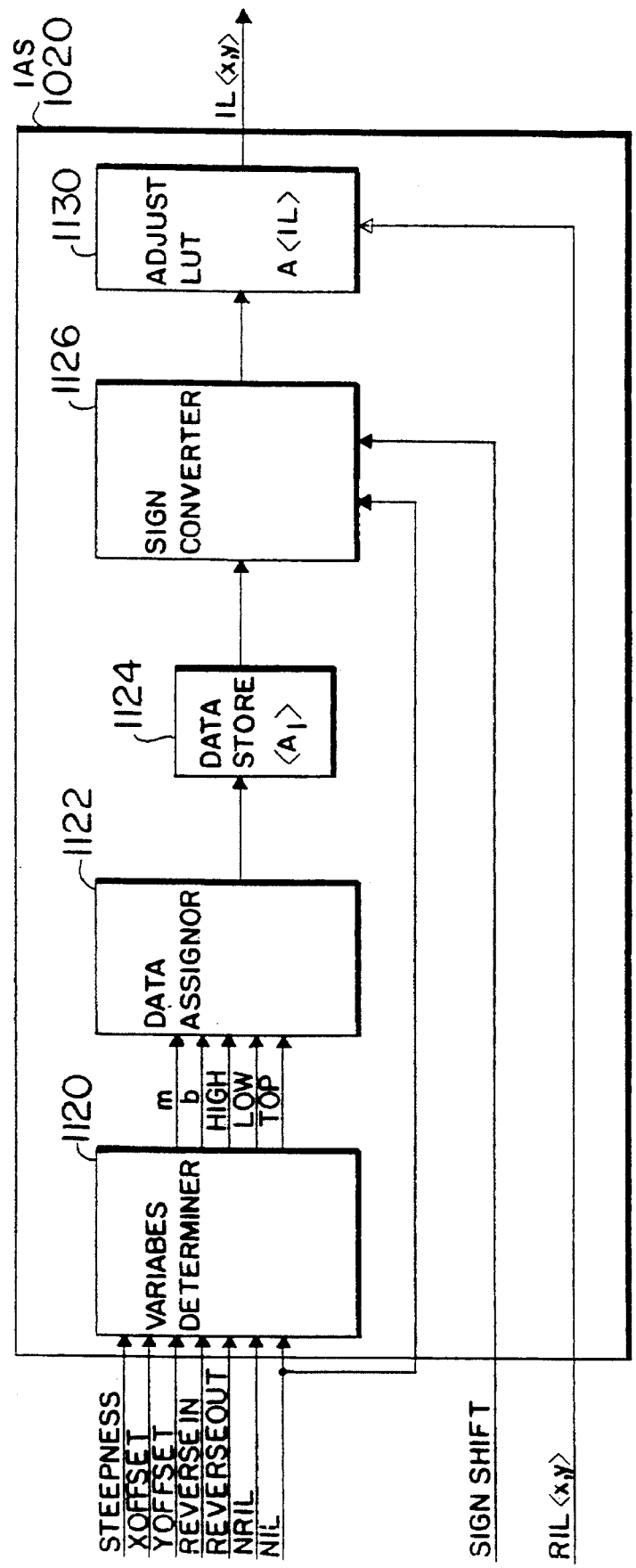
FIG. 36 is a block diagram of the image processor of FIG. 25, showing a variables determiner, data assignor, data store, sign converter, and an adjust LUT.

Having discussed the types of adjustments that can be made through the transform functions so that raw input levels are translated into adjusted input levels, an embodiment of IAS 1020 can now be addressed. Referring now to FIG. 36, IAS 1020 includes variables determiner circuit 1120, data assignor circuit 1122, data store memory 1124, and sign converter circuit 1126. IAS 1020 is shown to include adjust LUT memory 1130, in which values are ultimately stored.

In FIG. 36, variables determiner 1120 is fed by signals corresponding to: Steepness, Xoffset, Yoffset, ReverseIn, Reverseout, NRIL, and NIL. As indicated above, in one implementation the signals for Steepness, Xoffset, and Yoffset would be furnished by a user interface, such as interface 1021 shown on FIG. 25. These may be similar to the brightness or contrast dial on a standard video monitor. The other signals for variables determiner 1120, ReverseIn, Reverseout, NRIL, and NIL would be furnished by imaging system 20, or provided in a file header of data being processed. In particular, NIL is the variable discussed above which is assigned by imaging system 20, and which determines whether the number of raw input levels will be transformed to a greater or lesser number of adjusted input levels.

Variables determiner 1120 provides values corresponding to m and b, which are discussed below, and High, Low, and Top to data assignor 1122. Data assignor 1122 outputs intermediate values, which are collectively referred to as "A₁", which are stored in a memory device, such as data store 1124. The A₁ values in data store 1124 are then transferred to sign converter 1126. If the Sign Shift signal is asserted, sign converter 1126 will convert the representation of signed values stored in data store 1124. If the Sign Shift signal is not asserted, then the A₁ values stored in data store 1124 pass through sign converter 1126 without modification.

Whether sign converter 1126 converts the A₁ values or not, sign converter 1126 outputs the final table of adjusted values, A<IL>, for storage in adjust LUT 1130. Once the values A<IL> are stored in adjust LUT 1130, the raw input levels, RIL<x,y>, are used to address the LUT. Accordingly, a given RIL<x,y> will cause a corresponding, adjusted IL<x,y> to be produced by adjust LUT 1130.

As indicated above, in certain implementations involving color systems, a number of IAS's 1020 were used together so that each component of the color image had its own image adjustment system. In another embodiment, it is possible to have a single variables determiner 1120, a single data assignor 1122, and a single sign converter 1126 for processing data that is stored in an adjust LUT 1130 for the Y component, another adjust LUT 1130 for the U component, and yet another adjust LUT 1130 for the V component, for an input device based on the luminance/chrominance format. The same can be done with respect to an input device based on the RGB format. In other words, instead of duplicating the components of IAS 1020 which process the values that are stored in the LUT's, it is possible to have one set of components which compute and fill a separate adjust LUT's 1130 for each or the color components.

For example, a single variables determiner 1120, data assignor 1122, and sign converter 1126 can first process the adjusted input levels that are stored in an adjust LUT 1130 for the Y component, based on the desired contrast and brightness of the output image, as well as the senses of the input and output devices, the representation of signed raw input levels, and the desired range of input levels. Then those same components can process the adjusted input levels stored in an adjust LUT 1130 for the U component, based on the desired saturation and white balance control of the output image, as well as the senses, the representation, and the range. And finally, the same components can process adjusted input levels stored in an adjust LUT 1130 for the V component, again on the basis of the desired saturation and white balance control of the output image, and the senses, the representation, and the range.

In yet another example, a single set of variables determiner 1120, data assignor 1122, and sign converter 1126 can be used to process and store adjusted input levels in an adjust LUT 1130 for the R component, an adjust LUT 1130 for the G component, and an adjust LUT for the B component, in an imaging system in which the input device represents data in the RGB format.

With this general background on the operation of IAS 1020, reference can now be made to the flow diagrams which detail how the various signals are used by the components of IAS 1020 to fill adjust LUT 1130.

Figure 37:
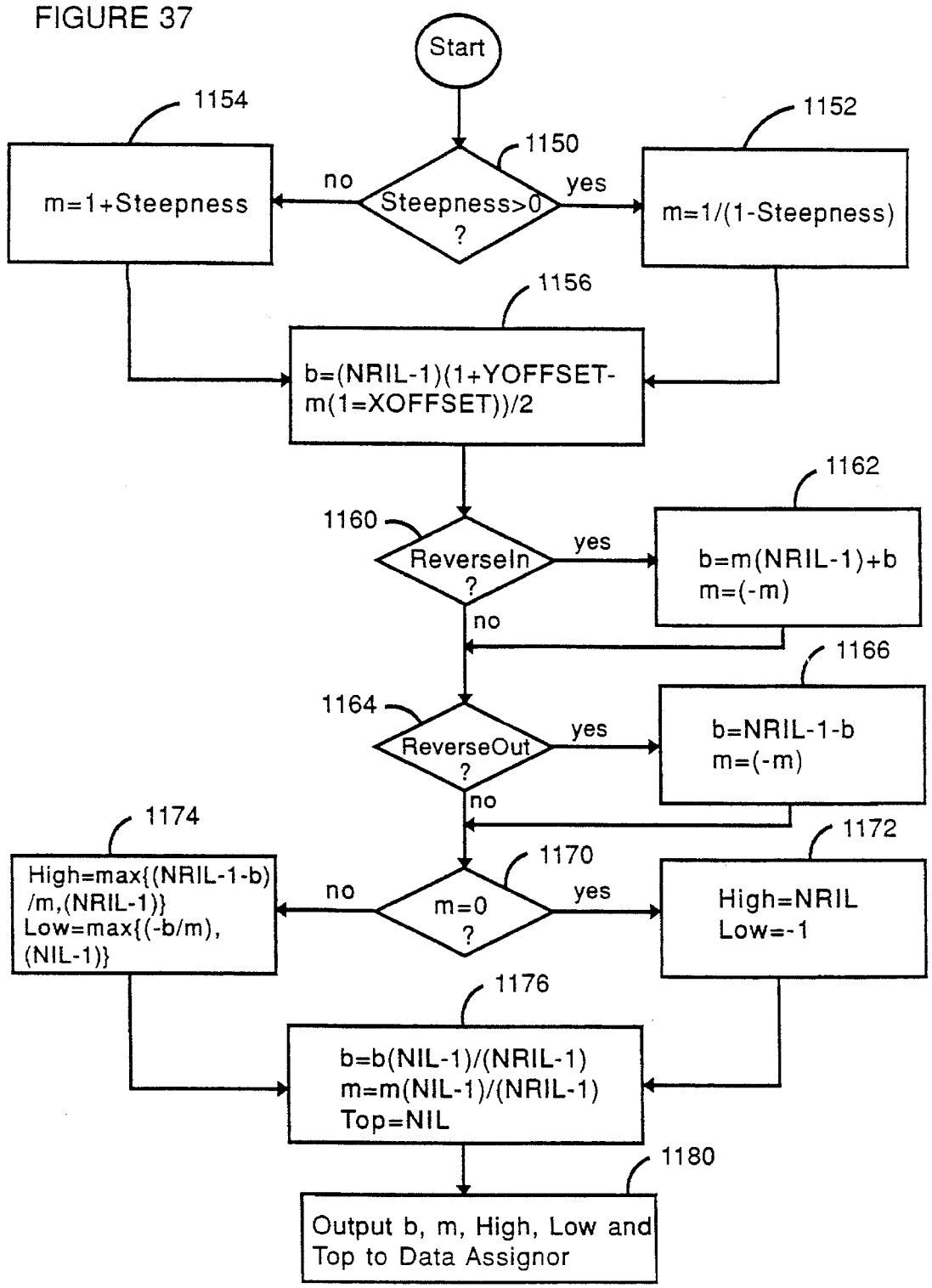
FIG. 37 is a flow diagram illustrating the process by which the variables determiner of FIG. 36 computes the variables "b", "m", "High", "Low", and "Top".

Referring now to FIG. 37, the steps of the process are shown to include a decision step 1150 with variables determiner 1120 testing the Steepness of the transform line setting to determine if it is greater than zero. If yes, the process advances to step 1152 in which the variable "m" is made equal to 1/(1−Steepness). It should be noted that although "m" has not been previously described, it is a variable which defines the slope of the transform line, such as the transform lines discussed in connection with FIGS. 26 through 32, and m is determined by variables determiner 1120. After the value of m is determined, data assignor 1122 uses that variable in the manner described herein.

Referring back to decision step 1150, if Steepness is not greater than zero, then the process advances to step 1154 and m is set as equal to (1+Steepness). From both steps 1152 and 1154 the process advances to step 1156.

In step 1156 a new variable, b, is made equal to (NRIL−1)(1+Yoffset−m<1+Xoffset>)/2. Similar to the variable m, b is a variable which defines the y-intercept of the transform line and its value is determined by variables determiner 1120. Also like m, b is used by data assignor 1122 in the manner detailed below.

From step 1156, the process advances to decision step 1160 in which variables determiner 1120 tests the ReverseIn value to determine whether it is asserted. If yes, the process advances to step 1162 and b is set equal to m(NRIL−1)+b, and m is set equal to (−m). If ReverseIn is not asserted, or after step 1162 resets the value of b and m, the process advances to decision step 1164.

In decision step 1164, variables determiner 1120 tests the ReverseOut value to determine whether it is asserted. If yes, the process advances to step 1166 in which b is set equal to NRIL− 1−b, and m is set equal to (−m). If ReverseOut is not asserted, or after step 1166 resets the value of m and b, the process advances to decision step 1170.

In decision step 1170, variables determiner 1120 tests whether m is equal to zero. If yes, the process advances to decision step 1172 at which point the variable "High" is set as equal to NRIL, and the variable "Low" is set as equal to (−1). Both High and Low were shown and described in conjunction with the discussion of FIG. 28. In the other hand, if m is not equal to zero, then the process advances to step 1174 and High is made equal to max {(NRIL−1−b)/m, (NRIL−1)}, and Low is made equal to max {(−b/m) , (NRIL−1) }, where "max {A,B}" is defined as being equal to the greater of A or B.

After the setting of the High and Low values in either step 1172 or 1174, the process advances to step 1176 in which b is set as equal to b(NIL−1)/(NRIL−1), m is set equal to m(NIL− 1)/(NRIL−1). It should be noted that this is the point of the process in which the number of input levels, NIL, assigned by imaging system 20, is factored into the shaping of the transform line. This number determines how raw input levels are transformed to adjusted input levels. In particular, the actual value of NIL will determine whether the raw input levels are transformed to a greater or lesser number of adjusted input levels.

Additionally, in Step 1176 "Top" is set as equal to NIL. Like the variables High and Low, Top was also shown and discussed in connection with FIG. 28. After step 1176, the process advances to step 1180 in which the values for m, b, High, Low, and Top are transferred to data assignor 1122, which is shown in FIG. 37.

It is notable that at this point of the process all of the variables which are needed for the purpose of translating RIL to IL have been produced by IAS 1020. In particular, for a monochrome imaging system, variables determiner 1120 has produced a set of variables which take account of the senses of the input and output devices, the number of input levels to be processed by the image processor, and the desired contrast and brightness of the output image. On the other hand, for a color system, variables determiner 1120 has produced a set of variables which take account of the senses of the input and output devices, the number of input levels to be processed by the image processor, and the desired saturation, luminance, and white balance control of the output image. Having computed these variables, IAS 1020 is now in a position to rapidly produce the variables which are inserted in adjust LUT 1130. This is accomplished in data assignor 1122.

Figure 38:
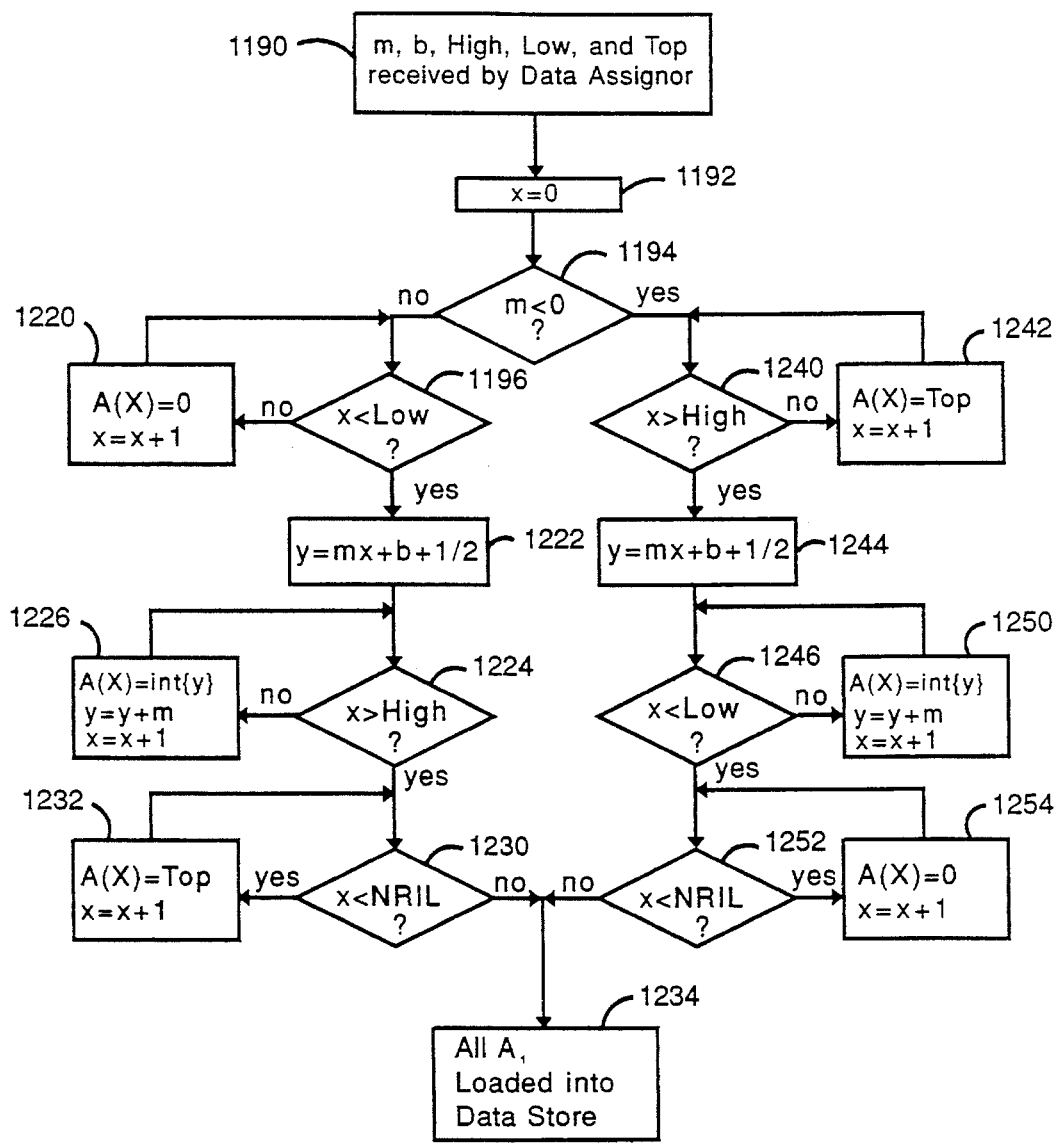
FIG. 38 is a flow diagram illustrating the process by which the data assignor of FIG. 37 generates the adjusted raw input levels and stores them in the data store of FIG. 37.
Figure 39:
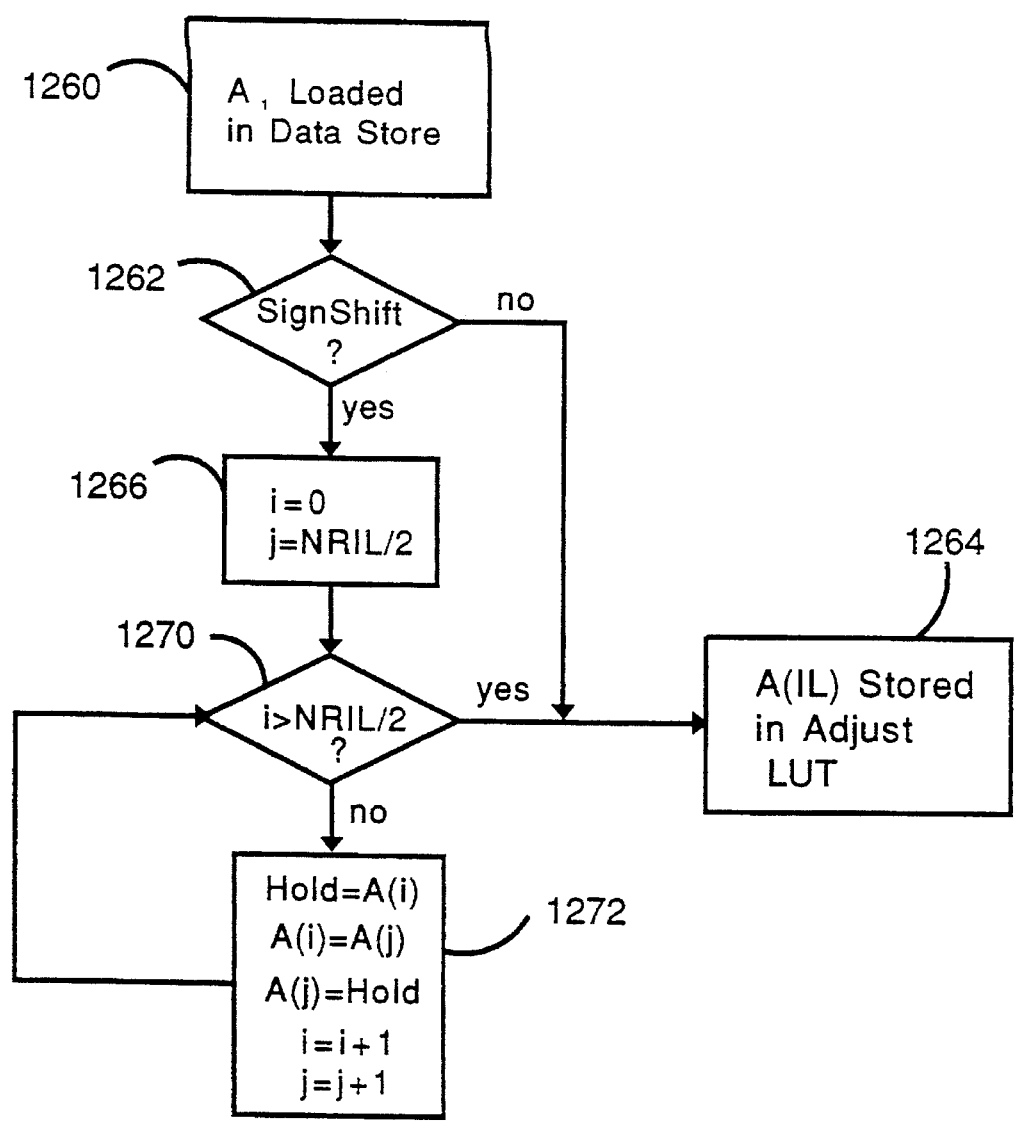
FIG. 39 is a flow diagram illustrating the process by which the sign convertor of FIG. 37 generates adjusted input levels and stores them in the adjust LUT of FIG. 37.

Referring now to FIG. 39, at the beginning of the process, step 1190 shows that signals corresponding to the values for m, b, High, Low and Top have been transmitted to data assignor 1122. The process then advances to assigning the value zero to the variable "x" in step 1192. After this, the process advances to decision step 1194 in which data assignor 1122 tests the value of m to determine if it is less than zero. As seen by looking at the flow diagram provided in FIG. 38, if m is not less than zero, then the process advances through the left branch of the flow diagram. If m is less then zero then the process advances through the right branch of the flow diagram. These two branches are separate, and do not reunite until the bottom of the flow diagram, therefore each complete branch will be discussed independently of the other.

If decision step 1194 is answered in the negative because m is not less then zero, the process advances to decision step 1196, at which point data assignor 1122 tests x to determine whether x is greater than Low. If not, then A<x>, which at this stage of the process is A<0>, is set equal to zero. In other words, referring back to FIG. 36, the address location 0 of data store 1124 is loaded with the value 0 by data assignor 1122. Additionally, x is incremented by one in step 1220.

From step 1220 the process returns to the test of decision step 1196. To the extent that x is incremented in step 1120 it may no longer be less than Low. If it is still less then Low, then the process will continue to cycle through steps 1196 and 1220. As long as the cycling continues, the various values of x will determine the address locations of data store 1124 at which a 0 value is stored. For example, if when x=1, it is still not greater than Low, then A<1> will be set equal to 0, or address location 1 of data store 1124 will have the value 0 stored therein. Also, if when x=2, it is not greater than Low, then A<2> will also be set equal to 0, and address location 2 will have the value 0.

Due to the incrementation of x, it will eventually be greater than Low. At that point, decision step 1196 will be answered in the affirmative, and the process advances to step 1222. In step 1222 the variable "y" is set equal to (mx+b+½).

After step 1222, the process advances to decision step 1224 in which data assignor 1122 tests the value of x to determine if it is greater than High. If x is not greater than High, then the process advances to step 1226 in which A<x> is set equal to int{y}. As discussed above, at this stage of the process, the actual value of int{y} is stored in the x address of data store 1124.

After the computation of the value of int{y} and the storage of that value in data store 1124, step 1226 further includes setting y equal to y+m, and x is set equal to x+1. After these settings the process cycles back to decision step 1224 to determine if x is greater than High. Until x is greater than High, the process continues to cycle back through step 1226 and the values of int{y} are stored in there corresponding address locations in data store 1124. Again, due to the incrementation in step 1226, the answer to decision step 1224 will eventually be in the affirmative, at which point the process will advance from decision step 1224 to decision step 1230.

In decision step 1230 data assignor tests x to determine if it is less than NRIL. If yes, the process advances to step 1232 in which A<x> is set equal to Top. As in the previous steps, 1220 and 1226, this value is stored in the x address of data store 1124. After the storage of that value, x is set equal to x+1.

From step 1232 the process returns to decision step 1230. The process continues to cycle through steps 1230 and 1232 until x is not less then NRIL, which must eventually occur as a result of the incrementation of x in step 1232. During this cycling, the address locations of data store 1124, A<x> are filled with the value Top.

When decision step 1230 is answered in the negative the process advances to step 1234 in which shows that all $A_1$ values have been loaded in data store 1124.

Returning to decision step 1194 on FIG. 38, if data assignor 1122 tests m to determine if it is less then zero and the answer is yes, then the process advances to decision step 1240 at which point data assignor 1122 tests x to determine whether x is greater than High. If not, then A<x> is set equal to Top, and x is incremented by one in step 1242. As previously discussed, the Top value is stored in the x address location of data store 1124.

From step 1242 the process returns to the test of decision step 1240. If x is still not greater than High, the process will continue to cycle through steps 1240 and 1242. During the cycling the corresponding address locations of data store 1124 are filled. Due to the incrementation of x, it will eventually test greater than High and decision step 1240 will be answered in the affirmative, advancing the process to step 1244. In step 1244 the variable "y" is set equal to (mx+b+½).

After step 1244, the process advances to decision step 1246 in which data assignor 1122 tests the value of x to determine if it is less than Low. If x is not less than Low, then the process advances to step 1250 in which A<x> is set equal to int{y}, and that value is stored in data store 1124. Then, y is set equal to y+m, and x is set equal to x+1. After these settings the process returns to decision step 1246 to determine if x is less than Low. Due to the incrementation in step 1250, the answer to decision step 1246 will eventually be in the affirmative, at which point the process will advance from decision step 1246 to decision step 1252. During the cycling, the address locations of data store 1124 are filled with values corresponding to int{y}.

In decision step 1252 data assignor tests x to determine if it is less NRIL. If yes, the process advances to step 1254 in which A<x> is set equal to zero, and that value is stored in data store 1124. Also, in step 1254 x is set equal to x+1. From step 1254 the process returns to decision step 1252. The process continues to cycle through steps 1252 and 1254 until x is not less then NRIL, which must eventually occur as a result of the incrementation of x in step 1254. During that cycling, the address locations in data store 1124 corresponding to A<x> are filled with the value 0.

When decision step 1252 is eventually answered in the negative the process advances to step 1234, discussed above, showing that all $A_1$ values have been loaded in data store.

Referring momentarily back to FIG. 36, sign converter 1126 is responsive to the signal for Sign Shift and NIL. In the event that Sign Shift is asserted, sign converter 1126 will shift the sign representation of all of the $A_1$ values transmitted to it by data store 1124.

Now referring to FIG. 39, a flow diagram is provided which describes the process by which sign converter 1126 operates. At the beginning of the process, step 1260 shows that the $A_1$ values are stored in data store 1224, shown on FIG. 36. From this step, the process advances to decision step 1262, which tests whether the Sign Shift signal is asserted. If no, then the signs of the values do not have to be converted, and the $A_1$ values effectively pass through sign converter 1126 unchanged. Thus, the process advances to step 1264, and the values A<IL>, which are the fully adjusted values, are stored in adjust LUT 1130.

On the other hand, if the Sign Shift signal is asserted, and decision step 1262 is answered in the affirmative, the process advances to step 1266. In step 1266 the variable "i" is set equal to zero, and the variable "j" is set equal to NRIL/2.

From step 1266 the process advances to decision step 1270 in which sign converter 1126 tests i to determine if it is greater than NRIL/2. If no, the process progresses to step 1272 in which the variable "Hold" is set equal to A(i), then A(i) is set equal to A(j), then A(j) is set equal to Hold, then i and j are each incremented by one. Through this step, sign converter 1126 is effectively swapping the values of $_1$ between memory locations. For example, during the first swap, the value at A<0> is swapped with the value at A<NRIL/2>. This is accomplished by first making Hold equal to the value at address location 0, then the value at address location 0 is made equal to the value at address location NRIL/2, and finally the value at address location NRIL/2 is made equal to Hold, which was the original value at address location 0.

After this, step 1272 returns to decision step 1270 in which i is tested to determine if it is greater than NRIL/2. If it is not, then step 1272 is repeated, resulting in the swapping two more values of $A_1$.

Given that i is incremented by one each time the process cycles through step 1272, i will eventually test greater than NRIL/2. At that point, all of the sign converted $A_1$ have been stored in adjust LUT 1264.

After the adjusted input levels are stored in adjust LUT 1264, they are input levels which can be processed by an image processor. More particularly, as shown on FIG. 36, adjust LUT 1130 is adapted for having the raw input level, RIL<x,y>, provided by the input device 22 shown on FIG. 25, operate as the address to adjust LUT 1130. Accordingly, RIL<x,y> will be transmitted to adjust LUT 1130, and in response adjust LUT 1130 will output a corresponding input level, IL<x,y>. Thereafter, IL<x,y> is processed by the image processors in the manner discussed above.

FIGS. 40A, 40B, 40C, and 40D provide illustrations of alternate embodiments in which an image adjustment system has been implemented in the image processors discussed above. In connection with each, there is shown an IAS, respectively numbered 1020a, 1020b, 1020c, and 1020d. Excepting only IAS 1020c, each IAS is shown to receive a signal which corresponds to a raw input level, RIL<x,y>, and responds to that signal by outputting a corresponding adjusted input level, IL<x,y>. With respect to IAS 1020c address/level generator 490 produces a raw input level, RIL, which operates as an address to an adjust LUT 1130 in IAS 1020c so that IAS 1020c outputs an input level, IL. As detailed above IL is then used by SMTVD 481 to provide signals to SMRTS 497. Other than this minor variation, IAS 1020c operates the same as the general IAS 1020 discussed above.

As seen in FIGS. 40A–40D, with IAS 1020 implemented in the four embodiments of the image processors discussed above, the adjusted input level, IL<x,y>, output by IAS 1020 would then be processed by the four different run time systems, in the manner described in connection with the detailed description of each of those systems.

G. Color Implementation

As discussed in the beginning of the detailed description, the embodiments of the above described image processors and image adjustment system were presented in the context of "levels", as opposed to "colors". This was to illustrate how these systems and image processing techniques are generally applicable bi-tonal, monochrome and color systems. On the other hand, another embodiment of the present invention can be readily adapted to an imaging system which specifically includes color systems of the luminance/chrominance, or RGB variety.

Figure 41:
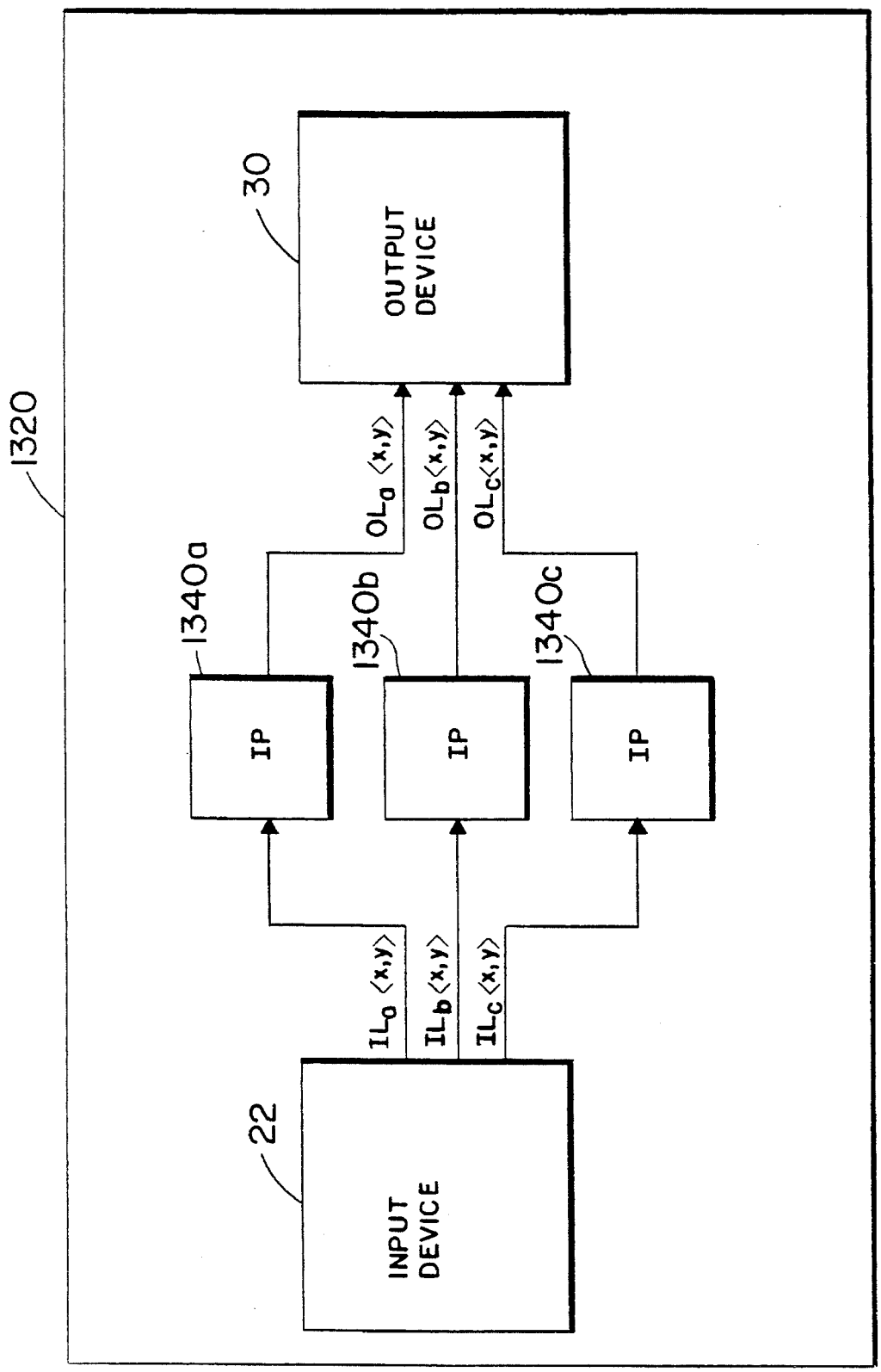
FIG. 41 is a block diagram of an imaging system, in accordance with an embodiment of the present invention, including an input device coupled to an output device through multiple image processors.

Referring now to FIG. 41, an embodiment of an imaging system 1320 which processes color images is provided. Imaging system 1320 includes input device 22 which registers an input image which is to be mapped to output device 30. Once again the objective of the embodiments of the present invention is to take the input levels and map them to the output levels. Typically, NOL will be greater than NIL; however, as stated above, it is also possible to use this system when NIL=NOL.

In the particular embodiment shown in FIG. 41, input device 22 registers three primary input levels: $IL_a$<x,y>, $IL_b$<x,y>, and $IL_c$<x,y>. For the purpose of illustration, the three input levels may be three color primaries, such as red, green, and blue (RGB), for example. In such an example, $IL_a$<x,y> could represent the level of the red color at the pixel address x,y; $IL_b$<x,y> could represent the level of the green color at the pixel address x,y; and $IL_c$<x,y> could represent the level of the blue color at the pixel address x,y.

In imaging system 1320 each of the three primary colors has multiple levels ranging from 0 to (NIL−1). In other words, just like the range of input levels discussed in connection with FIGS. 4 and 5, involving only one color, in this instance each of the three color primaries has its own range of input levels. For example, there may be multiple levels, or shades, of the colors red, green or blue. Moreover, the implementation of the imaging system 1320 does not require the three color primaries to have the same number of input levels as each other.

As shown in FIG. 41, the three input levels are each coupled with their own IP, respectively IP 1340a, IP 1340b, and IP 1340c. In imaging system 1320, each IP can be any one of the implementations of the IP devices discussed above. Namely, each IP 1340a, 1340b, or 1340c could be implemented using IP 40, 140, 440, 740, or the alternate embodiments of those image processors, such as IP 40a, 140b, 440c 740d, which include and image adjustment system. Additionally, as discussed in connection with IAS 1020, each image processor may be used together with an IAS 1020. Thus, for color images that are made up of multiple components, such as YUV or RGB, the image processors, such as IP 1340a, 1340b, and 1340c, could each include an IAS 1020 for each of the components of the color image, as discussed above. Finally, given that each IP operates independently of the others, they do not necessarily need to be the same type of implementation.

Although the specifics of the operation of the system will depend upon the particular implementation chosen, in general IP 1340a, 1340b, 1340c will each process and store dither template values and quantized values. And, consistent with the discussion provided above in connection with the implementation of each IP, the incoming address of a given input pixel and its corresponding input level will be used as an address by the image processor to output a corresponding output level.

For example, in FIG. 41 input device 22 transmits an input level $IL_a<x,y>$ to IP 1340a, or input device 22 could transmit $RIL<x,y>$ if an image adjustment system is used. In one implementation, this could be the level of the red color component of the input pixel at the given address, x,y. That input level is treated by IP 1340a in the same manner as has been described in connection with the image processors discussed above. Ultimately, IP 1340a outputs a corresponding output level, $OL_a<x,y>$, which is then sent to output device 30.

In this particular example, input device 22 would also output the input levels of the green and blue color components of the same input pixel at the same address, respectively $IL_b<x,y>$, $IL_c<x,y>$. Those input pixels are likewise processed by their respective image processors, IP 1340b and 1340c. And, each IP outputs a corresponding output level, $OL_b<x,y>$, $OL_c<x,y>$, to output device 30.

When the three output levels—RGB—are combined in the same output pixel in output device 30, the color of the output image will be reproduced with pleasing results, even if output device 30 has a narrower range of output levels for representing the three color primaries than input device 20.

One consequence of the approach described is that the dithered color image effectively has 3 dither matrices overlaid on top of one another. If the source image is in a highly correlated color space, such as RGB, and the number of output colors is small, then dithering with the same in-phase dither matrix can produce harsh patterns in neutral density (no chrominance) image areas.

These harsh patterns can be mitigated by offsetting the dither matrices slightly relative to one another. This is precisely the reason for the phase adjustment process through which the dither matrix values are adjusted by a phase adjuster, such as phase adjuster 98, shown in FIG. 7, or phase adjuster 798, shown in FIG. 20. It may be recalled, in connection with the discussion of FIGS. 7 and 20 in particular, the image processors received as one of the inputs a phase__x and a phase__y value. In one implementation, the user of the imaging system 20 may select the actual phase__x and phase__y values, provided:

$0 \leq phase\_x < M_{mm}$; and $0 \leq phase\_y < N_{mm}$.

Also, each pair of phase__x, phase__y values for a given color component should be different from the pairs for the other color components.

For example, with respect to RGB images, the following phase__x, phase__y settings work well for 8×8 dither matrices:

|  | Phase__x | Phase__y |
| --- | --- | --- |
| Red | 0 | 0 |
| Green | 3 | 3 |
| Blue | 0 | 3. |

Finally, although FIG. 41 shows three image processors linked to implement the color system, in other implementations any different number of image processors could be similarly assembled to link input device 22 with output device 30 depending on the number of colors to be represented in the imaging system 1320.

H. Summary

It will be clear to those skilled in the art that the embodiments of the image processing systems and techniques of the present invention can be implemented in either hardware or software. In other words, the embodiments discussed can be implemented using software code with a general purpose computing device to accomplish the processing of data to determine quantization and dither template values, as well as to determine the actual computation of the output levels. Additionally, more specialized computer hardware could be used to compute specific equations which yield the data necessary for the implementation of the embodiments discussed. As is well know in the computer art, there is constant tension between performing operations with specialized hardware, which increases the speed of the system, but requires valuable chip space, and performing operations in software, which takes up virtually no valuable chip space, but may take longer.

One of the significant advantages of the imaging systems discussed is that in certain implementations the hardware requirements are so minimal. Such implementations rely upon having memory devices, adders, comparators, and bit shifters. This type of hardware is commonly available in general computing devices.

The present invention in its broader aspects is therefore not limited to the specific details, representative apparatus. and illustrative examples shown and described herein. Departures hay be made from such details without departing from the spirit or scope of the invention.

What is claimed is:

1. An apparatus for translating input levels of an imaging system to corresponding output levels, said apparatus comprising:

memory means for storing dither template values, said memory means being responsive to an address of an input cell of an input device to provide a dither template value which corresponds to the address of the input cell, the input device having any number of input levels, provided the number is greater than two, and the input device being adapted for coupling with an output device in which the number of output levels is equal to two;

means for comparing an input level of the input cell to the dither template value produced by the memory means to provide an output level which corresponds to the input level wherein the dither template values are normalized by symmetrically distributing the dither template values between 0 and $\Delta_Q$, where $\Delta_Q = (NIL-1)/(NOL-1)$, NIL is the number of input levels, and NOL is the number of output levels.

2. The apparatus as in claim 1, wherein the normalized dither template values ($D<x',y'>$) are related to $\Delta_Q$; a $\Delta_d$; a dither template ($T<x',y'>$); and a number of template levels of the imaging system (NTL) by:

$\Delta_d = \Delta_Q/(NTL)$;

and $D<x',y'> = int\ \{\Delta_d(T<x',y'>)+0.5\}$.

3. The apparatus as in claim 2, wherein the dither template values are phase adjusted by spatially shifting the values within the dither template.

4. The apparatus as in claim 3, wherein the phase adjusted dither template values (d<x',y'>) are related to $\Delta_Q$; a $\Delta_d$; a dither template (T<x',y'>); a number of template levels of the imaging system (NTL); a phase value of the x,y address of an input cell (phase_x, phase_y); and the dimensions of said second memory means ($M_{mm}$, $N_{mm}$) by:

$\Delta_d = \Delta_Q/(NTL)$;

D<x',y'> = int {$\Delta_d$(T<x',y'>)+0.5};

and d<x',y'> = D<(x' + phase_x)modulo($M_{mm}$), (y' + phase_y)modulo($N_{mm}$)>.

5. The apparatus as in claim 4, wherein said comparing means provides an output level, OL<x,y>, which corresponds to an input level IL<x,y> on the basis of:

If IL<x,y> > d<x',y'>, then

OL<x, y>=1, else

OL<x,y>=0.

6. An apparatus for translating input levels of an imaging system to corresponding output levels, said apparatus comprising:
   Look Up Table (LUT) generator means for generating dither template values for the input levels of an imaging system, which has an input device which is able to represent any number of input levels provided that number is equal to or greater than two, and which has an output device in which the number of output is equal to two;
   memory means for storing the dither template values, said memory means being responsive to an address of an input cell of an input device to provide a dither template value which corresponds to the address of the input cell; and
   means for comparing an input level to the dither template value produced by said memory means to provide an output level which corresponds to the input level, wherein the dither template values are normalized by symmetrically distributing the dither template values between 0 and $\Delta_Q$, where $\Delta_Q$=(NIL–1)/(NOL–1), NIL is the number of input levels, and NOL is the number of output levels.

7. The apparatus as in claim 6, wherein the dither template values are phase adjusted by spatially shifting the values within the dither template.

8. An apparatus as in claim 7, further comprising an image adjustment system, said image adjustment system being responsive to a raw input levels produced by an input device to provide an input level to said comparing means.

9. An imaging system comprising:
   an output device in which the number of output levels is equal to two;
   an input device which is capable of producing a number of input levels, the number of input levels being any number which is greater than to two;
   an image processor, coupled between said input and output devices, for translating the input levels to corresponding output levels, said image processor including:
   Look Up Table (LUT) generator means for generating dither template values for the input levels of said input device, wherein the dither template values are normalized by symmetrically distributing the dither template values between 0 and $\Delta_Q$, where $\Delta_Q$= (NIL–1)/(NOL–1), NIL is the number of input levels, and NOL is the number of output levels;
   memory means for storing the dither template values, said memory means being responsive to an address of an input cell of said input device to provide a dither template value which corresponds to the address of the input cell; and
   means for comparing an input level of an input cell to the dither template value produced by said memory means to provide an output level which corresponds to an input level.

10. The imaging system as in claim 9, wherein the dither template values are phase adjusted by spatially shifting the values within the dither template.

11. The imaging system as in claim 10, further including a second image processor, and wherein the input levels of the input device are components of a color system.

12. A method of translating input levels of an imaging system to output levels, said method comprising the steps of:
   generating dither template values for the input levels of an imaging system, which has any number of input and two output levels, provided the number of input levels is greater than two;
   normalizing the dither template values by distributing the dither template values between 0 and $\Delta_Q$, where $\Delta_Q$=(NIL– 1)/(NOL–1), NIL is the number of input levels, and NOL is the number of output levels;
   storing the dither template values in a memory means, said memory means being responsive to the address of an input cell of an input device to provide a dither template value which corresponds to the address of the input cell;
   comparing the dither template value output by the memory means in response to an address of the input cell to an input level of the input cell; and
   outputting an output level which corresponds to the input level based on the results of said comparing step.

13. The method as in claim 12, wherein said generating step includes:
   phase adjusting the dither template values by spatially shifting the values within the dither template.

* * * * *